June 22, 1971  T. A. GRANGER ET AL  3,586,645

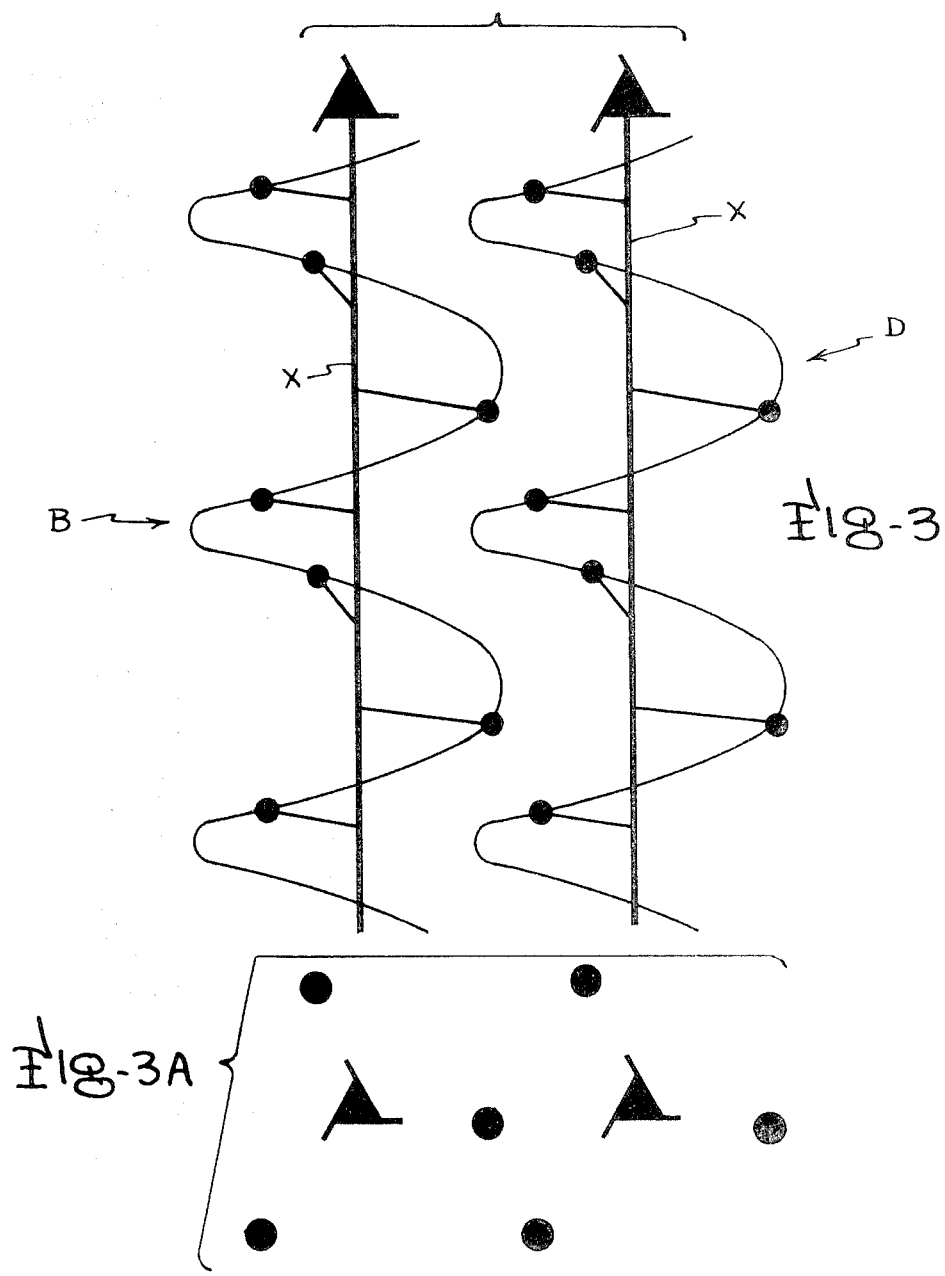

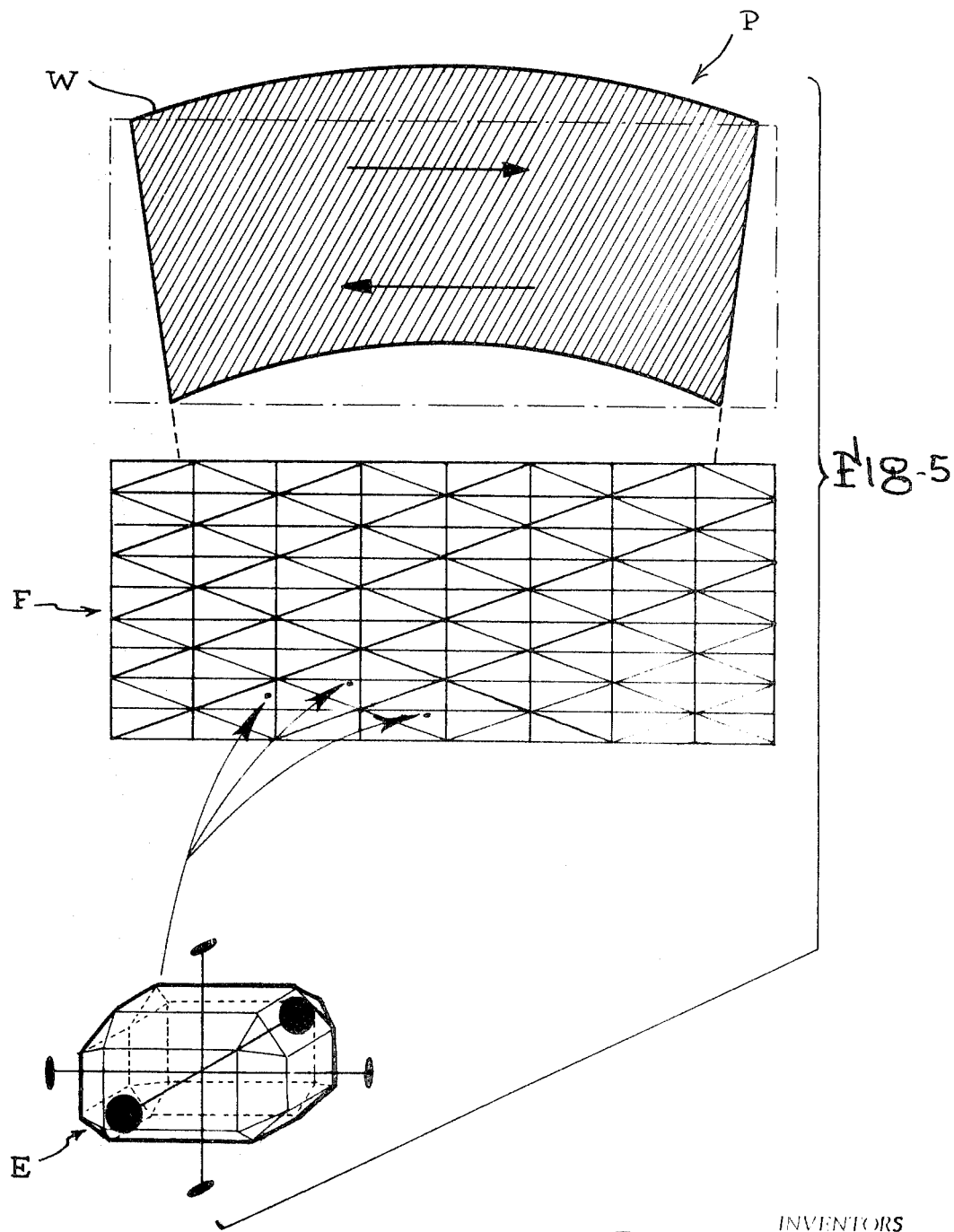

THERMOPLASTIC CELLULAR MATERIAL PROCESSES AND PRODUCTS

Filed Aug. 20, 1964  7 Sheets-Sheet 5

INVENTORS
CLAUDE R. NICHOLS JR
THEODORE A. GRANGER

BY
Mason, Fenwick & Lawrence
ATTORNEYS

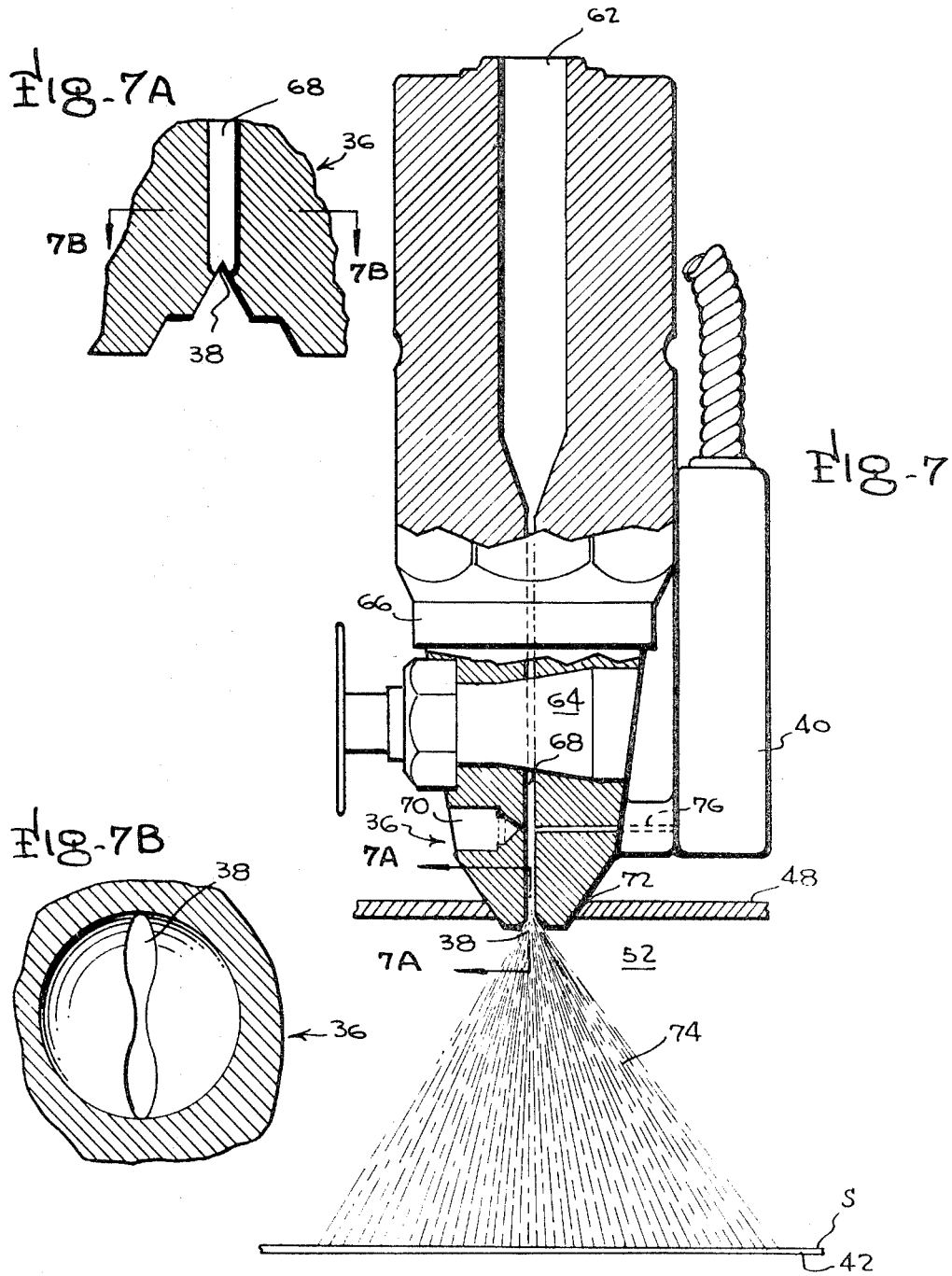

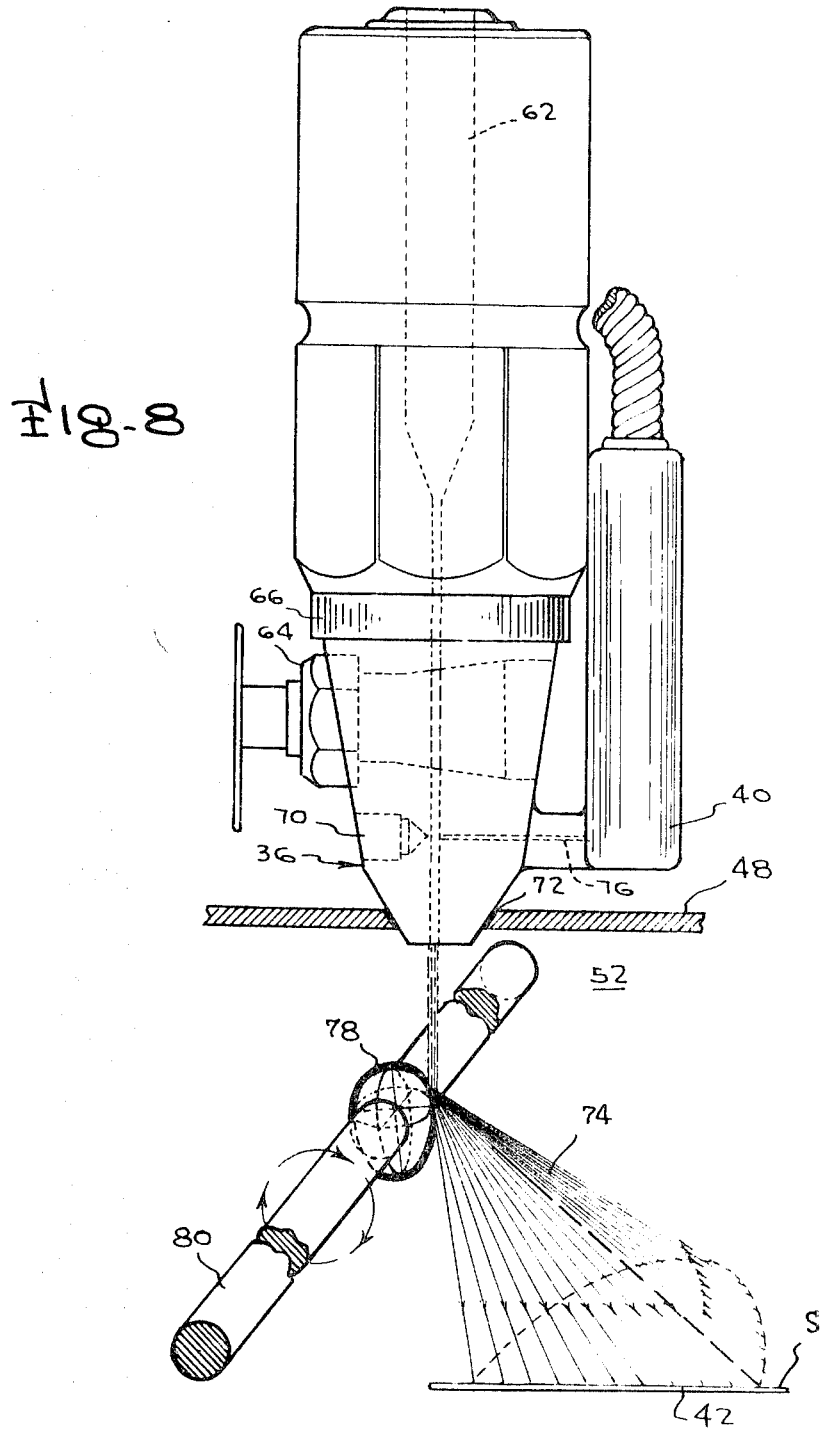

United States Patent Office 3,586,645
Patented June 22, 1971

3,586,645
THERMOPLASTIC CELLULAR MATERIAL PROCESSES AND PRODUCTS
Theodore A. Granger, Henderson, and Claude R. Nichols, Jr., Durham, N.C., assignors to Syndetic Research Associates, Inc., Durham, N.C.
Filed Aug. 20, 1964, Ser. No. 390,856
Int. Cl. C08f 47/00; B29d 27/00; C08g 53/10
U.S. Cl. 260—2.5
25 Claims

ABSTRACT OF THE DISCLOSURE

Cellular thermoplastic materials are prepared by heating the material to plasticity, applying a pressure thereto, ejecting the material under pressure through an orifice to form a multiplicity of discreet particles and coalescing the particles while in the initial expanding state. The product is useful for a variety of materials such as disposable diapers.

---

This invention discloses a novel cellular material formed from thermoplastic materials. The material is characterized by exceptionally high strength and low cost, and resembles bulk quantities of absorbent cotton in its appearance, but with great technical and economic advantage as compared to cotton. This material may be constructed from stereospecific high polymers of hydrocarbon origin, and processes are described herein for the preparation of this material with open cells in any bulk, as well as with open and closed cells in large bulk form. This can be achieved continuously at high speed, so that its technical and economic advantages can be made widely available after the material is fabricated into wide classes of non-durable consumer articles normally made from cellulose.

It is an object of this invention to produce a non-fibrous synthetic thermoplastic material cotton-like in its appearance and utility, but of outstanding advantage as compared to technical performance and comparative costs of material.

A further object is to prepare from this synthetic thermoplastic material non-durable consumer articles of manufacture commonly made from cellulosic fibers. Articles of this invention are much more highly fluid absorbent when made from our cellular material, than when made from cotton, and lower in cost, in addition to being technically advantageous. Additionally, wide classes of other kinds of non-durable articles commonly made from cellulose in fibrous form are advantageously made from this synthetic material by the processes we will describe.

Such articles include those of a sanitary nature; more specifically, toilet and facial tissue, tampons, and catamenial pads. It is also an object of this invention that these products be commode disposable and self-degradable. In addition, material application applies to articles of a surgical, hygienic, or filtration nature including bandages, surgical sponges, caps and gowns, bed pads, diapers, plastic surgery implants, and biological filters for radioactive isotopes and/or particles. Also, broad applications are made in the form of thermal and sound insulation, flotation items, cushioning, paper, and packaging.

The preferred materials of this invention are stereospecific hydrocarbon polymers or co-polymers thereof.

The processes described herein are of equal utility in preparing cellular structures from all classes of thermoplastic polymers, copolymers, whether linear, block, graft, or elastomeric, on a decreasing order of inherent mechanical strength from favored high strength stereospecific crystalline polymers. Utility extends advantageously down to relatively weak materials, such as ethylene, acetate and amorphous styrene, when used in preparing cellular materials.

Such thermoplastic polymers, even those of an amorphous nature, when being formed into cellular material, are subject to large thermoelastic stresses and physiochemical forces. These stresses have been the cause of great difficulty in preparing masses of large cross section, as is needed to make the benefits and advantages of such cellular materials widely available at reasonable cost.

The prior art is replete with examples of thermoplastic polymers prepared into cellular materials on a laboratory scale, either by processes of loading resin and blowing agent into a sealed metal ampoule to obtain needed parameters of speed and pressure, then heating until rupture; or by extruding such mixtures under pressure through a very small orifice of the order of ⅛ or 1/16 inch, or smaller. It is significant that under the prior art described, there is no method to our knowledge and belief, of translating the preparation of such thermoplastic materials from small laboratory samples to large commercial production cross sections, as by contrast are readily available with chemically reactive thermosetting urethane cellular structures.

Inherent and fundamental difficulties embrace thermoelastic and physiochemical stresses and forces within very short time parameters, of microseconds and milliseconds, stemming from the physical "change of state" dynamics as relationships between molecules are altered during the process of preparation of cellular materials from such thermoplastic polymers as have been described. The higher the degree of molecular order of a given polymer, the greater these dynamics and the more rapid these changes take place.

It will be apparent that as relative positions of molecules, (and in some instances atoms), are brought into closer proximity as a result of our process of preparing cellular structures from thermoplastic polymers, intermolecular and other physiochemical forces are greatly increased, and by the process of the invention, result in superior mechanical properties of the final cellular structure. However, under the prior art, these same forces prevented the economic commercial production of the thermoplastic cellular material in large cross section. In the process of cell formation these thermoelastic forces distorted such large cross sections to useless shapes. Present production methods severely restrict either the maximum volume of material capable of being processed into cellular structure, or the expansion thereof, and limit production to small cross sections when produced by continuous methods.

The processes of this invention surmount very great thermoelastic and physiochemical stress-strain-time-temperature forces, which hithertofore have prevented many excellent thermoplastic materials of a crystalline nature from being expanded into cellular structures of large cross section and low density (or mass of material per unit volume) commensurate with basic engineering and mechanical parameters of potential strength of such materials.

As relates to large cross sections, an exception in usage is the pressure-kettle method for the production of cellular polystyrene, a relatively weak amorphous material which has a longer period of plasticity as compared with much stronger crystalline materials. This method is not widely used and is limited to amorphous polystyrene. It is not considered within the object of this invention, a continuous method. Parameters herein are adequately described in U.S. Pat. 3,121,130, Fred E. Wiley et al., which attempts to overcome basic forces of distortion by restriction of unit size, i.e., preparation of a 2 x 6 inch polystyrene plank by making a multiplicity of very small extrusions of cylindrical shape and fusing them into the 2 x 6 inch plank.

Cellular structures made from amorphous polystyrene, despite the problems of large scale production and the inherent weakness of the basic material, are recognized to be of great economic importance.

Concerning continuous and large cross section, this invention will relate means to produce broad classifications of thermoplastic cellular polymers (a) such as may be obtained, for example, from hydrocarbons of the formula $CH_2=CHR$, wherein R, as an example, is a saturated aliphatic, an alicyclic, or an aromatic radical; copolymers of these hydrocarbons with each other; and copolymers of these hydrocarbons with at least one other monomer copolymerizable with such hydrocarbons; (b) any polymer forming a chain in such a manner as to possess or be capable of having produced therein some spatial regularity or non-random configuration in the same polymer chain, or (c) any thermoplastic synthetic polymer.

The term "stereospecific" as used hereinafter shall describe polymers consisting of molecules whose monomeric or basic structural units follow one another in a chain with their respective spatial configuration in some particular order. Specifically, the term "stereospecific" shall include isotatic, syndiotactic, and stereoblock polymers, and it is further intended that the term shall include any and all polymers, whether made from monomers within the formula $CH_2=CHR$, above, or outside, which have attained naturally or synthetically some spatial regularity or non-random configuration along the same polymeric chain.

Stereospecific polymers of the type with which this invention is in part concerned, as an example, are described in U.S. Pat. No. 3,112,300 to Natta et al. In particular, those polymers such as alpha olefins, for example, which are stereospecific have been found useful in this invention; however, any stereospecific thermoplastic crystalline polymer can be used successfully to produce a strong cellular product of low density and large cross section. Specific examples of stereospecific and crystalline polymers include: stereospecific isotactic syndiotactic, and stereoblock polymers of polypropylene and other olefinic polymers, such as butadiene, polybutylene, etc. and crystalline and stereospecific polystyrene.

Stereospecific polymers have been found to possess great inherent properties of strength, principally because of the spatial regularity of their side chains in relation to the axis of the main polymer chain. The regularity can be of the highest possible order, which is the characteristic of our preferred material. The present invention provides a novel process for circumventing such great properties of strength during processing and which heretofore have limited most of the preparation of cellular materials from such thermoplastics to profiles of small cross section. These counter forces are so great as to largely negate processes known under the prior art, while this invention provides for the efficient utilization of these same forces to degrees previously unknown in the final cellular product.

Simplified analysis is helpful to understand (a) why a cellular material constructed of polymers of an ordered nature has such great strength and is the preferred material of this invention and (b) why this novel process can utilize and incorporate this strength into a cellular structure advantageously.

By drawing imaginary lines through systems of atoms and molecules in electrostatic equilibrium with one another, three dimensional geometric shapes are established. These shapes, for clarity, are called unit cells. Unit cells of crystalline materials are found in most of the useful natural materials of the world. In a single thickness of a single cell wall of our synthetic cellular material, there may be from 400 to 2000 or more molecular layers throughout which there may be repetition of such unit cells many, many times. With repetition there results a crystal or crystallite structure, and these in turn when multiplied many times will form a spherulite. Spherulites may be of such size as to be perceptible, with special techniques, with electron microscopes of the highest resolution. Unit cell, as hereinafter used, refers to the geometric arrangement between two polymeric chains and not to a geometric relationship between atoms and molecules of a single given axis.

To visualize monomers as they are polymerized into polymeric chains with, for example, 500 monomers connected to form a single polymeric chain before chain termination, the chain can be likened to a short length of weak string. This string is long, as compared to being wide, and lacks stiffness or the ability to either establish or hold a shape or position of any kind.

As thousands, millions, billions of these fall onto one another during the polymerization process, they naturally, by random, end up as a tangled mass which, in total represents a thermoplastic resin.

Where one polymer chain crosses another within this tangled mass by chance, useful but comparatively weak van der Waals forces provide attractive force between the point of chance crossing. At the same time, equal van der Waals along the entire length of the polymer chains are not utilized, as there is no proximity for each to have mutual attraction of the other.

Utilized also are other more powerful orders of forces which include lattice forming forces, cohesive forces, steric hindrance, and others, each of which will be more fully described subsequently. Additionally, within the parameters of this invention, induced hydrogen bonding increases the magnitude of these attractive forces much to the benefit of the mechanical and engineering performance of the final cellular material.

It is, then, these forces inherent in crystalline matter which give a specific mass the ability to resist deformation from applied compressive or tensile stress. It is evident that heretofore these forces became powerful and dynamic counterforces preventing preparing highly crystalline thermoplastic materials of large cross section for significant commercial production of cellular material.

Previous practices consisted of "scaling down" to materials of inherent weaknesses, such as those of an amorphous nature, in order to lessen the magnitude of these forces and meet cross section dimension requirements on a scale necessary for commercial application.

In striking contrast to the prior art, it is most significant that this invention is not limited to the amorphous or non-crystalline thermoplastic materials in producing cellular material of large cross section, or of open cellular construction, regardless of the thermoplastic material used, but rather it is a fundamental object of this invention to include those polymers of the highest order of molecular regularity and crystallinity, as well as the amorphous thermoplastic materials.

Other objects and advantages of the present invention will become apparent to those skilled in the art from the following description when read in conjunction with the accompanying drawing, wherein:

FIG. 1 is an enlarged perspective view of the geometric and dynamic parameters of the processes by which entangled and disordered polymeric chains, as divided by approximately equal molecular concentrations of a highly compressed gas, are stretched at high speed over the surface of an expanding sphere formed by gaseous molecules without restriction against such expansion. Such stretching in three dimensions establishes high degrees of juxtapositioning of regularly ordered side chains, where they occur, and more parallel alignment of the main axes of polymeric side chains. This resulting geometric symmetry aids establishment of unit cells and periodicity between atoms and molecules of neighboring polymeric chains, thus inducing lattice forming forces within the cellular walls of the cellular structure.

FIG. 2 is a perspective view of the completed cellular structure of flat sided polygonal (multi-sided) cell walls, such cell walls shared mutually, resulting after construction of the spherical surfaces established as illustrated in FIG. 1. This is believed due to displacement of the nucleus of the hydrogen atoms along the polymeric chain in the direction of the electronegative oxygen atoms in proximity causing the spherulites to contract in a direction parallel to the axes of the polymer chains, thus contracting spherical cellular walls of FIG. 1 to flat walls, as illustrated in FIG. 2.

FIG. 3 is a schematic molecular arrangement of a geometrically and spatially ordered hydrocarbon polymer of the type of configuration preferred. An imaginary line, drawn through the outer extremities of side chains repeating themselves with periodicity spatially around the axis of the main polymeric chain, represents an imaginary spiral in three dimensions, which can be conveniently described as a screw axis in that it hypothetically revolves around the axis of the main polymeric chain. The descriptive term "screw axis" is merely one of convenience to simplify graphical representation and visualization of such ordered arrangements as they exist, or can be made to exist, on a molecular scale in three dimensions in space.

FIG. 3A is an end view of FIG. 3.

FIG. 5 is a schematic representation of the establishment of geometric and spatial periodicity of lattice points along and across ordered polymeric chains as components of three dimensional unit cells which, with repetition in high orders of frequency, comprise crystals or crystallites. Such crystallites agglomerate into structures of an ordered geometric nature known as spherulites. They are characterized by contraction on formation with transition of polymer from amorphous phase, at glass temperature, to crystallite forming phase as rapid cooling is induced by the Jules-Thompson effect. It has been explained that such contraction and intermolecular forces, induced by hydrogen bonding displacement, will yield flat, polygonal cellular walls.

Figure 6:
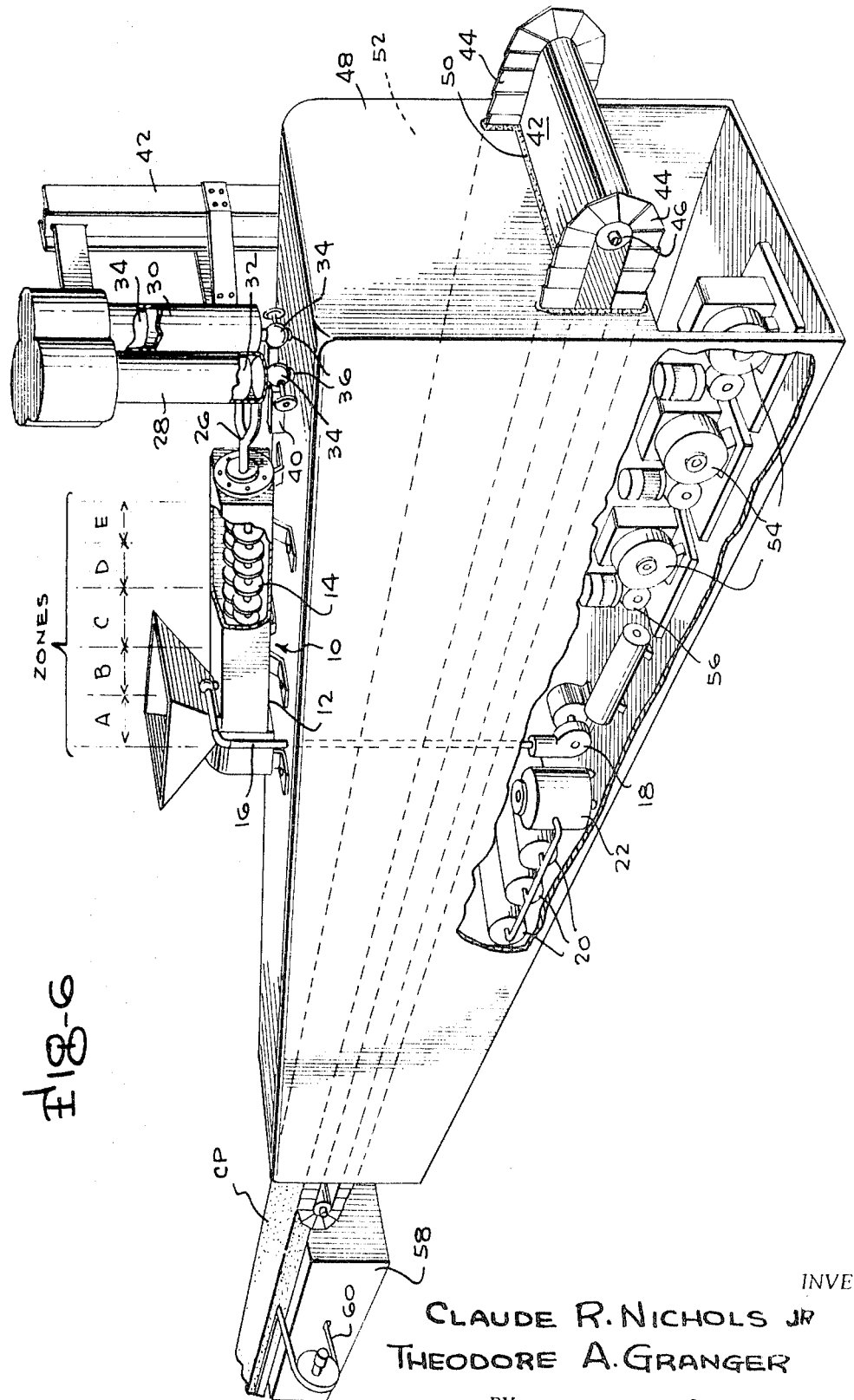

FIG. 6 is a cross sectional view of the apparatus and dynamic parameters in representative form, that are utilized in processing high performance thermoplastic materials, preferred materials of this invention, into large cross sections without dimensional size restrictions. By contrast, such lack of restriction is utilized advantageously with chemically reactive thermosetting urethane cellular materials, but is unknown under the prior art in regards to thermoplastic materials for cellular structure.

FIG. 7 is an elevational view, partly broken away, of the nozzle design utilized as a means of altering the geometry of fluid stream containing compressed gases, so that it is altered to comprise a series of successive laminar sheets. This alteration provides the means for preparing thermoplastic cellular materials with freedom from destructive distortion. The effect of alteration by this method is essentially achieved at the time the altered fluid stream leaves the orifice.

FIG. 7A is an enlarged cross sectional view, partly broken away, of the nozzle as viewed along line 7A of FIG. 7.

FIG. 7B is an enlarged end view of constricted nozzle opening of FIG. 7A, taken along lines 7B.

FIG. 8 is an elevational view of another means of altering geometry of the fluid stream by the use of convex and ellipsoidal surfaces to dissociate and alter geometry of the fluid stream. Power requirements are lowered by the utilization of shock energy forces by these means, essentially achieved after the fluid stream is ejected from the orifice.

CELLULAR CONSTRUCTION

The cellular construction forms a basic part of the present invention and from it stems the many unique properties which are characteristic of material having this construction. In the prior art, in cellular materials of amorphous polymers and materials of limited crystallinity in small cross section and comparatively high density, the polymeric chains are primarily of random arrangement and intertwined relative to each other. Bonding forces, upon which strength is dependent, consist merely of weak van der Waals forces established at infrequent random locations along the polymeric chains in proximity by chance or accident. According to the present invention, spatially oriented polymer side chains, as schematically shown in FIGS. 3 and 3A are related with regularity to a longitudinal axis which may be referred to as a screw axis X of FIG. 3. Prior to formation of the cellular product, in accordance with the method of the present invention, screw axes are not as shown in FIG. 3, but rather are randomly positioned. However, in accordance with the present method, these polymeric chains are stretched almost instantaneously around formed sphere P, as shown in FIG. 1, and this stretching over the curved boundaries, or surfaces of the sphere, as it is being formed causes at least partial straightening or alignment of the polymeric chains, so that at least portions of pairs of such chains are aligned in a manner as shown by the proximity of chains B and D in FIG. 3.

Figure 1:
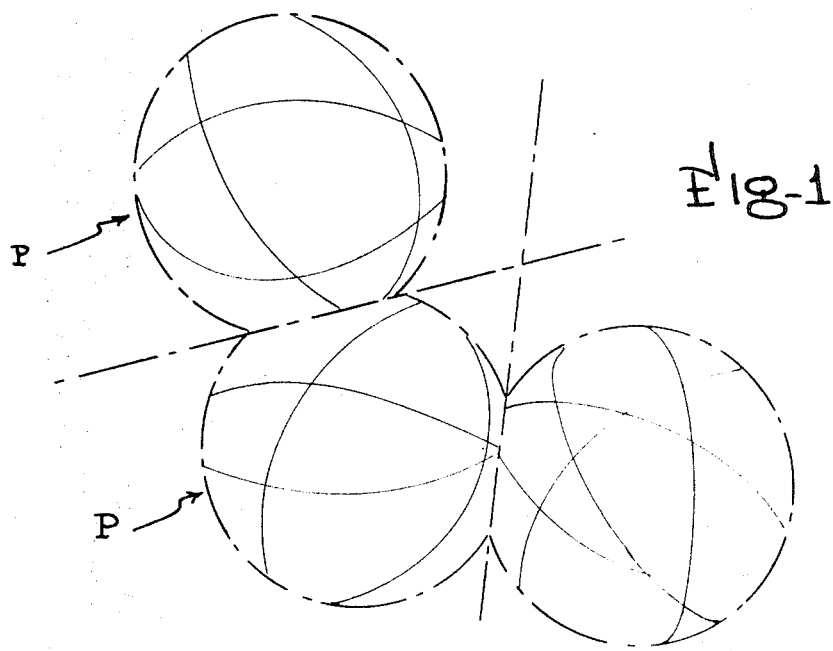
Figure 2:
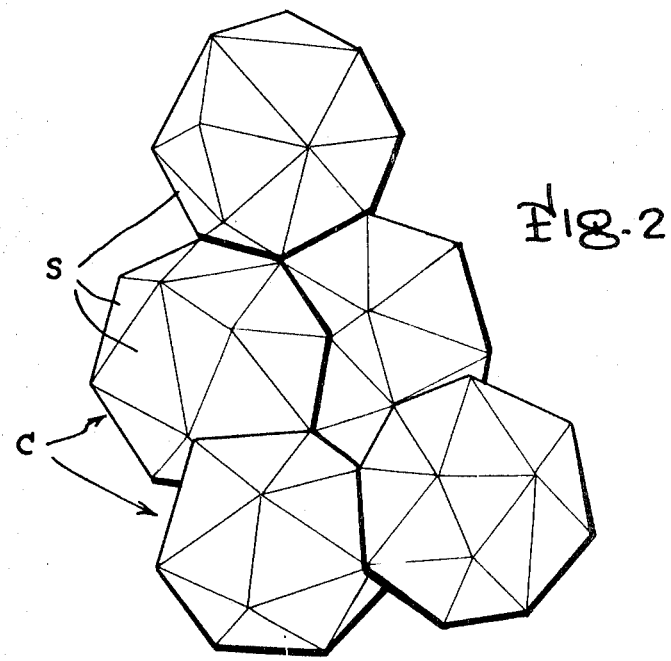

These partial spheres of FIG. 1 as they are being formed are each prevented from becoming a true sphere, due to the fact that upon crystallization, the polymer chains will contract along their longitudinal or screw axis, and thus it has been found that these partially formed spheres actually take final shapes shown by FIG. 2 in the form of hollow, essentially regular, polygonal cells C, which is an object of this invention, which have essentially flat sides S, also an object of this invention. Of these sides, at least four of the sides of each cell are shared with neighboring cells.

Microphotographs of these cells C, FIG. 2, show them to be contiguous and filling all voids in the cellular product. In other words, there are no voids or extended channels in the cellular material produced according to this invention. Essentially, all the cellular structure is composed of cells with mutually shared cell walls.

The final position of the polymers relative to each other as they form the walls of these polygonal cells is of significant importance, since many of the desirable strength and low density characteristics of the final cellular structure are based thereupon.

The alignment of adjacent polymeric chains within the walls of these cells C utilizes cohesive molecular forces between the chains, which thereby induces additional strength characteristics to the material. In order to explain the added strength resulting from this alignment, it is necessary to consider the atomic and/or molecular arrangement along the polymeric chain so aligned.

Figure 4A:
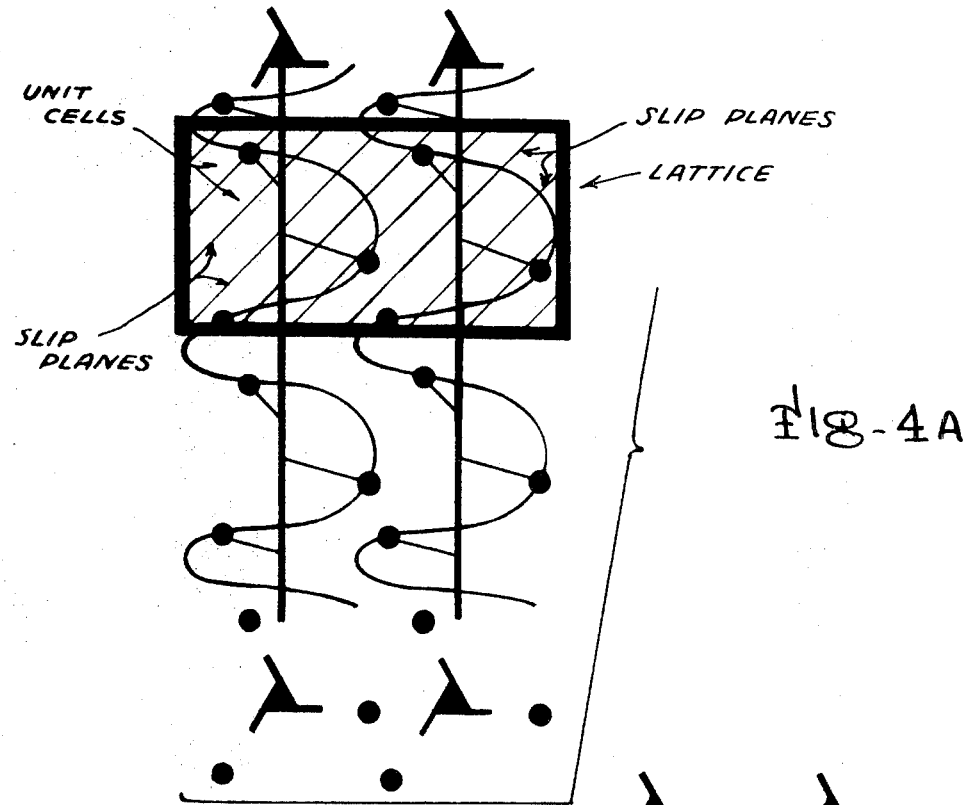
FIGS. 4A and 4B are a schematic representation of parameters of lattice rotation in tension.
Figure 4B:
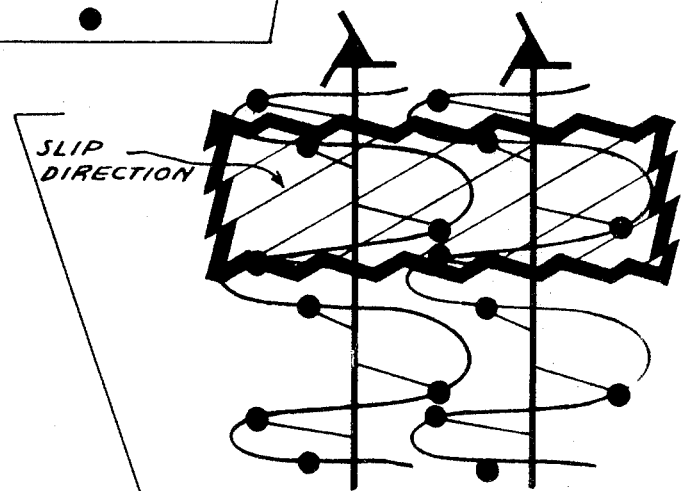

FIG. 4 illustrates progressive change in slip between unit cells with the establishment of slip planes (the surface between three dimensional unit cells) and slip directions (the direction the slip planes move to align themselves with the direction of a tensile stress. The drawing is a possible stereographic projection illustrating that with tensile stress on a crystal, as with deformation of cellular material of which the crystal (of which FIG. 4 is a small part) structure is a constituent, active slip direction aligns itself with the direction of this tensile stress and thus there is first resistance to deformation, then deformation, then recovery with release of tensile stress. With compressive stress, though not illustrated, the slip plane (the surface between three dimensional unit cells) set themselves in a direction normal and resistant to the direction of the compressive stress. Thus there is also first, resistance to deformation, then deformation, then recovery with release of compressive stress. The utilization of such forces, by establishing systems of polymeric order and organization within cellular materials by the means described herein, reflect with great advantage on the technical and economic parameters of cellular materials prepared by the processes of this invention.

In addition to high tensile strength to weight ratios, practical benefits of these structures in our cellular material include, for example, the absorption of shock and impact energy, due to the rotation and slippage of the planes. In the past such shock and impact would be destructive to both article and material, as in packaging utilizations. In the case of open cell material, according to the present invention, when compressive stress is applied, the absorptive volume present prior to deformation is retained, due to equivalent deformation in a tangential or substantially perpendicular direction.

As best shown in FIG. 4A, two polymeric chains, each as shown in FIG. 3, are depicted as passing through a lattice structure which relates to portions of both chains. Those portions of the chains which form the lattice structure include a plurality of unit cells, each unit cell embodying at least some of the atoms of both chains.

While the polymer chains are aligned with the result of great cohesion between the adjacent polymeric chains, an important factor of the present invention is that the aligned polymeric chains are geometrically distributed within three dimensional space lattices, which form unit cells of a crystal structure. As used hereinafter the term "space lattice" will refer to a three-dimensional indefinitely extended array of points, each of which is surrounded in an identical way by its neighbors as schematically illustrated in FIG. 5. The space lattice of the crystal is therefore the representation of the periodicity with which molecules and atoms are distributed within the cellular walls of the subject material. The space lattice is indicated from our present data to be $n$, orthorhombic in geometrical configuration for stereospecific polypropylene, as made up of symmetrical arrangements of atoms and molecules of the polymeric chain comprising unit cells of the space lattice. Different geometrical space lattices, such as cubic, tetragonal, trigonal, monoclinic, and triclinic, are also possible, and any such ordered geometrical arrangement of the atoms and/or molecules is useful, according to the present invention. With respect to polymers, since it is not important what the configuration of the space lattice is, but rather only that there be an ordered geometrical arrangement of atoms and molecules within the space lattice, such arrangements are most advantageous when the polymers are most highly ordered spatially. The formation of the space lattice, which is the basis of crystallinity in our cellular product, is important to the strength characteristics of the product, since it is known that the average force between portions of polymer molecules that are in a crystalline lattice is greater than that between portions not in a lattice. As shown in FIG. 5, E is a schematic drawing of an idealized $n$, orthorhombic crystal, showing representation of the positions of the geometrical arrangement of the atoms and groups of atoms within a representation space lattice F. In the crystal is also depicted the three unequal axes which are provided with round discs at their ends to portray the relative positions of these axes.

FIG. 5 shows schematically cell wall W of sphere P, shown in FIG. 1. The cell wall W is essentially spherical at the instant of its formation, continuing in this shape until cooled to glass temperature for the particular polymer. At such temperature there is contraction of the spherulites formed, which have been described. Such contraction forces, represented by the arrows in FIG. 5, induce tensile stress within the spherical wall segment illustrated, establishing the wall section as a flat section, rather than a spherical section, microseconds before complete thermal stabilization.

After formation of the cell, atoms and molecules of the highly crystalline polymer chains are found to be geometrically distributed within space lattices in crystallographic order, resulting in crystallities which in turn cluster into spherulitic structures. Spherulites are radially extending thin discs whose radii extend approximately within the plane of the wall of the polygonal cell.

The formation and identification of spherulites is known in the art (see "Polymer Single Crystals," by Phillip H. Geil, Interscience Publishers, New York, 1963). In this reference, as we have found, it is stated that spherulites approach spherical symmetry (circular symmetry with respect to growth in thin films) when crystallization is attained rapidly. Morphological studies of spherulites have indicated, according to Geil, variations in spherulite structure with different polymers and even with the same polymer, which is particularly true of polypropylene (pages 266–274 of Geil). Note particularly FIG. III–23, of page 213 of Geil, which shows a precise photograph of the spiral growth (spherulite) of polypropylene.

These spherulites are important to the present invention, since they contract the walls of the cells into the flat polygonal cell walls illustrated in FIG. 2, as we have explained. It has been found that these spherulites are composed largely of crystalline polymers which may extend into areas of random ordered side chains. It also has been found that since the spherulites are so important to the final characteristics of our cellular product, that the minimum amount of stereospecific polymer that must be present in the final product is .5%, while up to approximately 100% may also be present. For reasons of economy, the amount of the crystalline polymer is diluted with an amorphous polymer of the same monomer, or with a compatible polymer such as polyethylene, or polystyrene, or other thermoplastic polymer in amounts up to 99.5% of the total polymer present. The amorphous regions resulting will be dispersed between crystalline regions with the strong lattice structure, as described, supplying high orders of structural strength to the polygonal cells resulting from our polymeric construction.

Another of the important features of the spherulites is fibrils that produce a fibrillated surface on the sides of the cell walls. These give our subject cellular structure the "soft fell" texture characteristic of natural materials, such as cotton, which also have a surface covered with fibrils or microscopic fibers.

By reason of the fact that the polymeric chains are stereospecifically oriented, there is a spatial order or pattern to the atoms, molecules, or groups thereof, along the axis of each polymeric chain, and as such each polymeric chain can be in closer proximity with an adjacent chain, as represented in FIG. 3, wherein the polymeric chains of a stereospecific configuration are illustrated. This proximity is possible primarily because of the ordered and regular spatial nature of the polymeric side chains along the axis of the main polymeric chain, and therefore would not be found to any substantial degree with any amorphous portion of the polymeric chain.

In accordance with the present invention, the thermoplastic cellular product must contain at least .5% by weight stereospecific polymeric chains, and thus in such product the most closely adjacent polymeric chains forming pairs, such that the pairs project into at least two identical unit cells.

Atactic or amorphous polymeric chains, as the terms imply, characteristically possess random spatial orientation of side chains. Amorphous polypropylene polymers, for instance, possess such spatially disoriented side chains as would hinder their juxtapositioning even when brought into proximity with one another. However, it has been found that side chains along the axis of amorphous polymers, even though randomly oriented, will tend to orient to a slight extent, because of the dynamic forces of the present invention. Thus, even though no orientation is present initially, the linear rearrangement of the polymers improves intermolecular bonding forces to some extent between polymeric chains where only random van der Waals forces existed, as previously described. This consequently increases structural strength due to increasing bonding intermolecular forces.

Once the adjacent polymeric chains have achieved some juxtaposition along the ordered length of their axes, intermolecular bonding and lattice forming forces are inherently set up. When the two polymeric chains are brought close together—that is, less than about 1.5–10 angstrom units—the electrostatic fields set up by the moving electrons surrounding the atoms contained along the polymeric chain constrain the motions of the two polymeric chains, so that any movement is more or less in phase, as evidence of steric hindrance.

Another of these forces is the previously mentioned van der Waals forces. The attractive forces that result from the proximity of these polymeric chains vary as the inverse sixth power of the separation of the atoms so affected.

Another type of intermolecular force may be stated as being based upon the Quantum Theory of Cohesion, which was generally proposed by Born and Oppenheimer in 1929. Nuclei move within a cloud of surrounding electrons, depending upon the nuclear positions and cohesion resulting from the natural attraction between positive nuclei and the negative charged electron cloud surrounding the various nuclei. Thus, the closer the polymeric chains, the closer are the nuclei with their respective electron clouds.

It is preferred, according to the present invention, that the polymers used contain approximately .001% to 1% by weight oxidation addition. This oxidation, achieved particularly at tertiary hydrogens, if present, may be achieved most readily during the manufacture of the polymer by permitting the access of air. In order to control the amount of oxidation, it is desirable to utilize a mild antioxidant, such as 2,6-ditertiarybutyl and dilaurylthiodipropionate, in the amount of .01% to 1% by weight of the polymer, with .01% to .5% preferred. With the use of these antioxidants, slight orders of polymer oxidation occur within the above specified limits without perceptible impairment of physical properties or the actual initiation of chain scission. The desirability of this additional oxidation is that it provides a situs for hydrogen bonding.

It is to be understood that the heat stable oxidizing agents, to be described, added to amounts up to 8%, are not utilized for such hydrogen bonding, since they are not activated at the low heat levels used in manufacture of the cellular materials, but are only for degrading the polymers, as will be set forth hereinafter.

Via another mechanism, unique to our process of preparing cellular materials, where polypropylene is utilized, as an example, incorporated propylene oxide is another result of our inducing interaction between thermoplastic olefins and oxygen atoms.

Hydrogen, associated with the electronegative element oxygen, establishes asymmetric hydrogen bonds and is consequentially a major factor in establishing high orders of geometric symmetry, thus improving crystallinity between polymeric chains and thereby increasing the strength of the final cellular structure. Though of small magnitude relative to covalent forces, the strength of the hydrogen bond is greater than that of all other secondary bonds. The electronegative attraction of hydrogen by oxygen is in an asymmetrical direction toward the oxygen atoms along the polymer chain. Thus, as a result of oxidation, the agglomerated crystallites, or spherulites, are contracted in a direction tangential to their axis, and by such contraction form substantially flat walled polygonal cells from those previously spherically shaped surfaces. Such lack of wall curvature, or "flatness," allows each wall to be shared commonly with an adjacent cell, giving optimum utilization of material as opposed to cellular material prepared under the prior art.

The precise determinations of degrees of displacement of the nucleus of the hydrogen atom, as displaced by attraction of contained electronegative oxygen atoms attached to our preferred hydrocarbon polymers, can be determined with an order of accuracy extending to $\pm.00002$ of an angstrom unit ($3.9370079 \times 10^{-9}$ inches equals size of one angstrom) according to procedures as set forth in the technical paper by Smakula & Kalnajs, "Precise Determination of Lattice Constants by Geiger Counter and X-ray Diffraction," Technical Report 92, Laboratory for Insulation Research, Massachusetts Institute of Technology, February 1955.

These same procedures are of value in determining precise locations of unit cells as they extend to adjacent polymer chains.

It will be apparent from the following that the attainment of high orders of periodicity and proximity of atoms of adjacent polymer chains are an essential object of this invention.

METHOD OF CELL FORMATION

Herein we class thermoplastic cellular materials in either of two categories: (1) open, interconnecting, or intercommunicating cells, which have not been known heretofore, except with very high density materials; for example 18 pounds per cubic foot, made in a closed mold on a laboratory scale, and (2) closed cell. Generally, cellular structures will not be exclusively either open or closed cell, but rather contain some of each type of cell. For purposes of this invention, a cellular structure which has a majority of its cells of either category will be classed within such a category.

An evaluation of the prior art reveals that cellular thermoplastic structures are limited, basically, to four (4) types:

(1) Pre-expanded beads of a non-crystalline amorphous material, such as styrene, containing an incorporated cellular expansion agent, and heated in a closed mold to achieve post expansion.

(2) Combination of amorphous polymer, such as polystyrene, with cellular expansion agents in a pressure kettle, and preparation of cellular material with release of pressure and the use of devices to resist material deformation, as disclosed in U.S. Pats. 2,577,743 and 2,450,436.

(3) The utilization of extruders to prepare continuously, cellular thermoplastic cross sections which may be generally described as being limited to small cross sections of the order of ⅝ inch in diameter in low densities of 1½ pounds per cubic foot, to larger cross sections represented by an approximate order of 6 square inches and densities of 7 to 8 pounds per cubic foot, as with cellulosic acetate, for example. (See Modern Plastics, 1964, as reviewed by the Cellular Plastics Division of the Society of the Plastics Industry; also, see U.S. Pat. No. 3,121,130, previously mentioned.)

Generally, it is not made clear in technical literature that in the preparation of cellular thermoplastic materials, these serious limitations exist for commercial production in cross sections of satisfactory size and low density.

Low density thermoplastic cellular materials are limited, with the exception of a relatively weak amorphous material such as polystyrene, to very small sized laboratory samples, badly distorted from thermoelastic strains and physiochemical forces during the process of preparation. That is, these forces present the establishment of a regular and uniform exterior shape, so that useful articles can be prepared without tremendous waste.

When restrictive devices such as sleeves are utilized to prevent exterior shape distortion to uselessness of higher strength and very useful crystalline materials, there is rapid increase in density to limits that are quickly undesirable and uneconomical, even though cross sections are only a few inches in diameter and are not of a preferred size or density for fabrication into articles advantageously.

The thermoelastic stresses and physiochemical forces, which have heretofore seriously limited the useful application of thermoplastic polymers in cellular structures under the prior art, have also prevented the formation of open and interconnecting cellular structure in materials of desirable low density. The magnitude and complexity of these forces may be ascertained from the following references: (1) An Investigation of the Dynamic Mechanical Properties of Polyethylene, page 34, ASTM Special Technical Publication No. 336, 1963; (2) Stress-strain-Time Relationships for Idealized Materials, page 3, ASTM Special Technical Publication No. 325, 1962, and (3) Stress-Strain-Time-Temperature Relationships for Polymers, page 60, ASTM Special Technical Publication No. 325, 1962.

By the processes of our invention herein, these forces do not prevent us from making any form of cellular thermoplastic structure desired, as is true accordingly to the prior art methods, and further, they are used advantageously to contribute to the mechanical properties of the final cellular product.

In contrast, chemically reactive thermosetting cellular materials, which can be represented by well know urethane cellular materials, are prepared from chemical reactants and are thus relatively free from the thermoelastic forces which so severely restrict the commercial production of cellular themoplastics.

Summarily, the prior art of preparing cellular polymeric materials may be classified as follows:

(I) Thermosetting materials, such as urethanes, phenolics, and vinyl plastisols.
  (A) No limitations as to open or closed cell.
  (B) No practical limitation as to size of cross section.
  (C) Structural parameters limited by mechanical properties of elastomeric polymeric chain forces and/or van der Waals forces.
(II) Thermoplastic materials, such as polystyrene, polyethylene, polypropylene, etc.
  (A) Limited to closed cell.
  (B) Limited to small cross sections, except with relatively weak amorphous styrene by post expansion methods or kettle method.
  (C) Limited to laboratory samples for low density materials, although distorted in shape; also, extrusion of small cross section when stronger, higher crystalline polymers are used.
(III) By our new and novel methods disclosed herein, this invention prepares cellular structure material from thermoplastic polymers that have:
  (A) No practical limitation as to thermoplastic polymers utilized.
  (B) No practical limitation as to size of cross section, regardless of inherent strength of chosen polymer.
  (C) No practical limitation of open or closed cell, or the combination thereof.
  (D) Optium reflection of inherent strength in final cellular material.
  (E) Economical large scale commercial production for numerous and diverse commercial applications.

Broadly, the methods of the present invention comprise the following for using any thermoplastic material including stereospecific, crystalline, and amorphous polymers and mixtures thereof:

(I) OPEN CELL (A) For low density open cellular material less than approximately 10 in.$^2$ in cross section.
  (1) Heating polymers to plasticity.
  (2) Utilizing high pressures and mechanical mixing to distribute evenly, using a two-stage blowing agent system and other additives throughout the polymeric mixture plasticized by heat alone.
  (3) Placing the melt mixtures thus prepared under hydraulic piston pressures of from 500 to 100,000 p.s.i., with those in the range of 10,000 to 25,000 preferred.
  (4) Ejection of the mixture.
(B) For low density open cellular material greater than approximately 10 in.$^2$ in cross section, steps 1–4 of (A) above, and ejection at speeds greater than speed of sound.
  (5) Division of the polymer melt into a multiplicity of discreet particles.
  (6) Depositing the particles at isolated points which coalesce to form a lamina sheet withn a fan-shaped area.

(II) CLOSED CELL (A) For low density closed cellular material greater than approximately 10 in.$^2$ in cross section, same as (B) above, with only a single blowing agent in place of the two-stage blowing system of step 2.

In this application the following terms are defined as follows:

"Thermoplastic" polymer means a synthetic polymer which can be remelted and cooled time after time without undergoing any appreciable chemical change.

"Polymer" shall mean that material formed synthetically by the following means:

(1) Condensation polymerization
(2) Addition polymerization
(3) Free radical polymerization
(4) Carbonium ion polymerization
(5) Anionic polymerization
(6) Copolymerization
(7) Stereoregular polymerization
(8) Vinyl polymerization It is not essential within the overall parameters of this invention to form material within an evacuated chamber. However, it should recognized that an evacuated chamber does have many advantages in construcing a cellular material that has extreme low density, less than two ounces per cubic foot, while retaining a high degree of strength. Moreover, it has been found that the evacuated chamber provides improved results: (a) extending the alignment of the linear polymers by further stretching them over a gaseous spherical surface; (b) eliminating negative back pressure, thus producing maximum gain from the expansion of the blowing agent(s); and (c) establishing rarified or low density gaseous environments to receive the expanding cellular material, thus permitting propagation and pulsation of the expanding wave forces, described later herein, at higher than normal velocities through the low density medium within the evacuated environment.

It should be understood, moreover, that this invention is not limited to the precise sequence of steps as listed above.

CLOSED CELL FORMATION—SMALL CROSS SECTION

The method of forming the closed cell structure of less than 10 in.$^2$, according to the present invention, preferably utilizes polymers containing at least one-half of 1% stereo-specific polymers into which is mixed hydrocarbon blowing agents while the temperature is maintained at higher than the crystallization temperature of the polymer, or polymers, utilized, and under a pressure during mixture of at least 200 to over 6000 p.s.i., or more preferably, 1000 p.s.i. It has been found that alcohol heat sinks are not necessary to our invention and consequently it is immaterial whether or not they are used, since the high pressures utilized yield excellent Jules-Thompson effect in establishing cooling.

As pertains to closed cell material, any conventional blowing agent used for preparing cellular thermoplastic materials may be used in accordance with this invention, provided that it is compatible with the polymer or polymers used and otherwise conforms to the presently known properties of an ideal blowing agent. Preferred gaseous agents are those with high order of diluency within the polymeric structure to be expanded. Most efficient diluents for hydrocarbon derived polymers have been observed to be hydrocarbon blowing agents such as butane, benzene, propane, etc. Other agents which may be used include—but by no means are limited to—nitrogen, hydrogen, methyl chloride, carbon dioxide, dichlorodifluoromethane, dichlorotetrafluoroethane, halogenated alkanes, acetone, chloroform, and methyl dichloride.

Among the chemical blowing agents from which an expanded gas is generated in situ as within the matrix of the polymer, the azo compounds, particularly azobisformamide, are useful. Others within this group may be azobisisobutyronitrile, diazoaminobenzene, and the N,N'-dimethyl-N,N'-dinitrosoterephthalamide, N,N'-dinitrosopentamethylenetetramine, benzenesulfonyl-hydrazide, benzene-1,3-disulfonyl hydrazide, diphenylsulfon-3,3'-disulfonyl hydrazide, and 4,4' oxybis(benzenesulfonyl hydrazide).

In accordance with the present invention, the primary or sole blowing agent outlined herein may be from 2% to 350% of the total polymer by weight.

It has been found that it is desirable, though not critical, to the invention to immerse the stereospecific polymer, which may include a diluent polymer which is amorphous, such as amorphous polypropylene, in a liquid such as water; alcohol, such as methanol, ethanol, butanol, etc.; an organic solvent, such as benzene, toluene, etc., and all the higher alkanes which are normally liquid, such as gasoline or any petroleum distillates, or mixtures of any of these alkanes. In view of the fact that polymers are insoluble in these fluids, it is desirable, but again not necessary, to use head pressures of at least 100 p.s.i. for at least 8 hours. The purpose of this immersion of the polymer in the liquid is to effect maximum possible inner penetration of the liquid between the entangled linear polymer chains of the stereospecific polymer. In this manner the diluency of the liquid tends to minimize interaction between adjacent polymeric chains and facilitates essential relative movement, and more particularly, ultimate alignment of the polymeric chains to provide the basis for the strength of our final cellular material.

To establish property characteristics of materials and parameters of forces governing cellular structures, especially those relating to stress, strain, temperature, and speed, three laboratory apparatuses were constructed. Henceforth these will be called apparatus I, II and III. Apparatus III will be described later herein. Apparatus I and Apparatus II were designed with the purpose of obtaining data in the previously specified areas when: (a) extremely rapid ejection, in excess of Mach. ¼ (Apparatus II) and Mach. 1 (Apparatus I), and when essentially no restriction was being imposed by the apparatus on the material at the point material is forced from the apparatus, thereby allowing the expansion of the mass as a whole; (b) restriction of the mass by forcing it to pass through a ⅟₁₆ inch orifice, not unlike an extruder orifice.

More specifically, Apparatus I consisted of a steel block 6 inches by 6 inches by 6 inches, with a circular cavity of approximately 1¼ inches in diameter, fitted with a Teflon O ring seal around the perimeter of the wall of the cavity. Into the cavity from a vertical position a piston is thus tightly sealed to the wall of the cylinder within the steel block. The device has a ¼ inch port for the introduction of liquefied hydrocarbon gases into the cylinder by a high pressure pump suitable for the gases. A two-way acting air cylinder is attached to the piston by a rod so as to be able to deliver a pressure of 4500 p.s.i. to the resinous material within the steel block. The rod to the piston was fitted with sliding mechanical linkage, which made it possible for the two-way air cylinder to be momentarily disengaged while being reversed and activated to remove the piston from the cavity. This allowed momentum to be achieved in a withdrawal direction before engagement and thus allowed maximum speed of removal at an accelerating rate in excess of one-fourth of the speed of sound. High speeds are desirable—but not critical—to closed cellular material of this invention and thus may be as low as ¼ Mach. This is in contrast to open cellular formation which requires at least Mach. 1 with a two-stage blowing agent system. The steel block described is fitted with suitable electric heaters capable of maintaining a range of temperatures up to 500° F. throughout the block.

Apparatus II consisted of a three-eights inch cylinder with a follower arrangement driven by gas pressure to simulate a melt being forced through an orifice as by an extruder. The cylinder was surrounded by electric heating coils capable of maintaining 500° F. throughout the melt. A one-eighth inch gas port into the cylinder was connected to a suitable high pressure pump for the introduction of liquefied hydrocarbons.

The cylinder was fitted with a plate into which a one-sixteenth inch hole was drilled with tapered shoulders on the receiving side of the orifice plate.

For purposes of laboratory convenience, the entire apparatus was placed within a vacuum chamber to allow the evaluation of the preparation of cellular structures in either an evacuated, or partially evacuated, atmosphere, as desired.

EXAMPLE 1.—APPARATUS I

A synthetic material was prepared by admixing 1.5 grams of stereospecific polypropylene, with its characteristic steric configuration, and 1.5 grams of amorphous polypropylene. Admixture was accomplished on hot mixing rolls for a period of fifteen minutes at a temperature of 360° F.

The admixture was next immersed in water under a pressure head of 100 p.s.i. for a period of one week, in order to effect the maximum possible interpenetration of $H_2O$ between entangled linear polymers to minimize interaction between neighboring units. The prepared material was then inserted within the steel cavity of Apparatus I, previously described.

The device was closed under air pressure and with the high pressure pump a mixture of 5 cc. of butane and 5 cc. benzene-1,2-disulfonyl hydrazide was added. Through the integral heating coils the mixture was heated to a maintained temperature of 345° F. for a period of 1.5 hours, because of the absence of mechanical mixing. Recorded pressure of the blowing agent, because of vibrational energy, was 575 p.s.i. Air cylinder was then loaded to maintain a head of 4500 lbs./sq. in. against the polymeric melt, and pressure was held until melt had cooled to a temperature of 305° F. for ten minutes. The vacuum chamber surrounding the device was evacuated to one-half atmospheric pressure. When released at high speeds into this atmosphere, the cellular material was thus prepared without restriction.

The synthetic material prepared by the afore-mentioned means is of outstanding softness and high tensile strength, and snow white in color. Spherulites on the surface of its cellular structure show resolution into small fibrils, not unlike the fibrils in natural cotton. Cell count is 1,800,000 cells per cubic inch, density is four ounces per cubic foot, and resiliency is considerably in excess of that of high grade absorbent cotton. The attractive softness of the material in conjunction with other values is concluded to be both a function of the spherulite fibrous formations and the designed thin wall thickness of individual cells, this being of the order of 1250 molecular layers in this instance. It is commonly known that stiffness varies directly as the cube of the wall thickness, and in spite of the softness achieved for this synthetic material, it is apparent that with 1250 molecular layers of structural material remaining, according to the definitions of this invention, orders of much lower softness and density in terms of pounds per cubic foot are attainable within the architectural parameters by which this synthetic material is both designed and prepared.

Essential, of course, to the structural properties of this low density material is the degree of alignment achieved between constituent linear polymers to make maximum utilization of van der Waals forces and the hydrogen-bonded lattice-forming forces described previously. Percentage closed cell approximated 98%.

EXAMPLE 3.—APPARATUS I

The procedure of Example 1 was followed, except that the polymers in Example 1 were immersed in a mixture of 50% gasoline and 50% methanol for a period of two weeks under a pressure of 75 p.s.i., resulting in a density of 2.9 ounces per cubic foot, with similar polygonal cell structure approximating 2,600,000 cells per cubic inch.

EXAMPLE 3.—APPARATUS

The procedure of Example 1 was followed, except that 100% of the polymer constituted 95% stereospecific polypropylene and 5% amorphous polypropylene, while the same blowing agents were used, except that the amounts were doubled (the total weight of the polymers being the same as in Example 1) and the cellular product resulting was found to have a density of .8 ounce per cubic foot.

EXAMPLE 4.—APPARATUS II

Three grams of Hercules Powder Company Profax polypropylene containing approximately 98% stereospecific polypropylene was mixed with three grams of N-butane gas in the above described Apparatus II at 60° F. Temperature was raised to 350° F. after N-butane was added as a liquid, and this temperature maintained for one-half hour. Gas pressure at this temperature was 475 p.s.i. Temperature was then lowered to 305° F. and maintained at this level for one-half hour, and gas pressure reduced to 425 p.s.i. 1350 p.s.i. nitrogen pressure was applied to the piston-type follower and the resin was forced through the one-sixteenth inch I.D. orifice. Density was found to be 11.2 ounces per cubic foot, with 96% closed cell and 4% open cell. Cell wall thickness measured .000035 inch. Number of cells per cubic inch equalled 4,000,000. Diameter of cells in direction of extrusion, .0082 inch. Diameter of cells at right angles to direction of extrusion, .0089 inch.

EXAMPLE 5.—APPARATUS II

Procedure is the same as in Example 4, except that three grams of total polypropylene polymer containing 97% stereospecific and 3% amorphous structure was used, and the blowing agent, N-butane, was increased to 5.4 grams. Results showed a density of nine ounces per cubic foot; 95% closed cell and 5% open cell. Cell wall structure thickness—.0060 inch. Cells per cubic inch—900,000. Diameter of cells in direction of extrusion—.0160 inch. Diameter of cells at right angles to direction of extrusion—.0120 inch.

EXAMPLES 6.—APPARATUS II

Same as Example 5, without gas pressure on piston-type follower and using only contained gas pressure at 305° F., which in this case was 525 p.s.i. Product showed density of fourteen ounces per cubic foot. Open cell between only 4% and 6%. Cell wall thickness—.000030 inch. Number of cells—4,800,000. Diameter of cells in direction per cubic inch of extrusion in inches—.0082. Diameter of cells at right angles to direction of extrusion—.0079 inch.

OPEN CELLULAR FORMATION—SMALL CROSS SECTION

This aspect of the invention is concerned with the production of open cellular structured materials of cross section less than ten square inches from stereospecific polymers as described above; however, it must be understood that the products of this invention also extend to open cellular polymeric materials which are amorphous thermoplastic polymeric material. Such latter materials may include the amorphous polymers of the general class set forth above, as well as polyamides such as nylon, the condensation product of unsaturated ethylene amino acid, hydroxyalkyl-diamine cross linked polyamide, cellulose esters such as acetate, butyrate and propionate, and the like.

In accordance with this invention, open cells can be produced only with a two-stage blowing system which is able to overcome the inherent resistance of the thermoplastic materials to opening of the cells. These cells are made open (interconnecting) by dual gaseous wave fronts, the first delayed in time from the second.

When a thermoplastic polymer is used to form open cellular material in accordance with the two-stage blowing system processes of this invention, it is preferred that it contain at least .5% by weight of a stereospecific polymer; otherwise, the resulting product will not have the flat polygonal sides, as described previously, since no spherulites will be formed, but nevertheless it will possess the interconnecting cellular structure. It should be noted that when open cellular materials are produced, from essentially non-stereospecific polymers, a size uniformity results, wherein substantially any cell chosen from among 75% of the total cells has an internal volume such that the volume of substantially any cell in the remaining 25% is within 35% of the first mentioned volume.

Independent of the thermoplastic material used, the cross section of the open and closed cellular product will be generally limited to approximately below ten square inches, unless, in accordance with another aspect of the present invention, the polymer melt is divided into discrete particles when blown and subsequently coalesced, as will be described hereinafter.

In order to achieve an open cellular structure and overcome the resistant forces of the thermoplastic materials during processing, it has been found that the cells can be made intercommunicating by utilizing dual gaseous wave fronts, from novel two-stage blowing agents. These wave fronts present different velocities of the gaseous molecules which comprise each component of what may be termed a two-stage blowing system.

This two-stage system and the constituents thereof are defined as follows:

"Gas forming chemical"—the chemical material in gaseous, liquid or solid state from which evolves a volume of gas for blowing the polymers;

"Primary (blowing) agent"—a gas forming chemical which expands initially to evolve a "primary gas";

"Secondary (blowing) agent"—an entity of both a gas forming chemical and the structure used to encapsulate or otherwise hold or retard the gas forming chemical and the secondary gas from free expansion, so that it expands later than the initial expansion of the primary gas;

"Secondary gas"—the gas evolved from the gas forming chemical of the secondary blowing agent;

"Two-stage (blowing) agent (system)"—includes use of both the primary and secondary blowing agents.

The amounts of the gas forming chemicals of the secondary agent should be within 1–100% of the total polymer weight, with 10%–25% preferred. When encapsulated, the encapsulating material is 4–200% of the weight of the total polymer.

We prefer that the molecules, comprising the second stage of these blowing agents, be caused to travel at speeds greater than that of sound. Upon collision with the molecules comprising the gases of what is termed the first stage of these two-stage blowing systems, there are changes in pressure, density, temperature and velocity of the gases at a fast but finite rate.

Because an instantaneous change in these parameters is physically impossible, intital changes in state are due to encapsulating material which is gas impermeable, nonreactive with the materials used, and capable of withstanding a temperature above the melting or softening temperature of the polymer to be expanded (usually not less than 115° F.). It should be understood that it is not necessary that the encapsulating material be thick enough or strong enough to withstand the high pressure generated by the encapsulated gas forming chemical due to the temperatures used to melt resins being processed. The gas forming chemical, when encapsulated is added to a matrix of polymer melt under a supplied head of pressure. This head is over 100 p.s.i. and may extend to 6,000 p.s.i., and normally 1,000 p.s.i. in the apparatus mixing zone in which the polymeric mix is being prepared for expansion into a cellular material. This pressure is considerably higher in the compression zone of the ejection apparatus, to be described subsequently.

It has been found also, in this case, that the silicates and particularly the alkali metal silicates, such as sodium and potassium, can serve as gas impermeable encapsulation shells on a macroscopic scale; however, other anion encapsulating materials may be used, such as the borates, germanates, and stannates. It may be stated that any inorganic crystalline material meeting the previously stated requirements and which may be aggregated in solution can be useful as an encapsulating material.

SECONDARY BLOWING AGENT BY ENCAPSULATION

It is not intended that we be limited in our means of preparing the second stage of our two-stage blowing system. Herein it is essentially only that the gases contained within the secondary blowing agent be at a high state of vibrational energy, but be prevented by an external head of pressure from unrestricted expansion.

It is also essential that particles of a gas forming chemical, as one example, be contained within a gas impermeable shell, or, as another example, a gas forming chemical which is chemically bound as a volatile, crystalline or glassy complex or hydrate that retards expansion of the secondary gas for very short periods of time after external pressure is released by the necessity of having to first rupture or dissociate their encapsulating shells or chemical binding structure. The term "encapsulate" shall therefore include the means—physical, as a shell, or chemical, as the complex or hydrate— which effects the retardation of the expansion of the secondary gas.

The secondary agent is prevented from expanding in the polymeric melt within which it is contained before ejection, due to the high pressure head on the polymeric material. Also, when this external head of pressure is removed at high speed, it is further prevented from expanding until it has utilized the finite period of time required to rupture or dissociate its restraining means. It is then that it expands into the interior area of a particular cell, e.g., for example, as formed by the primary stage of these systems, and thus the gas molecules of the secondary gas travel, unrestricted, with very high velocity and energy.

When the secondary agent is in the form of a hydrate, the water utilized as the secondary agent is bound into the molecular structure of solid crystals such as silicates, borates, etc. We have found that the molecular structure of the silicate, i.e., is the means which encapsulates the water which is now an effective blowing agent, and that finite periods of time are required for the water to escape from its structure when released into a zone of maximum pressure drop. However, when it does escape, it does so at very high velocities on a macroscopic scale.

In usage, the discrete particles comprising second stages of these two-stage blowing agent systems are utilized as nucleating agents, over the surface of which gaseous molecules of the primary agents commingle, and thus, ideally, form a particulate cell with the particle containing the unexpanded secondary stage in the center of each cell. The delayed second stage agent then expands, completing the processes of heat exchange and open cell formation previously described.

Additionally, the second stage of two-stage systems is utilized advantageously as a vehicle or carrier for additives to the prepared cellular material, so that these may be distributed in even amounts as coatings over the interior surfaces of the cells thus prepared and impinged thereon and tightly bound, while these cells are in a plastic state. Some of the materials are those such as chelating agents, which we utilize in these cellular materials when prepared as biological filters, as will be explained. Others are macroscopically sized particles of activated charcoal, which are released at high speed from the nucleus of the second stage described, and deposited as a uniform coating of very small sized particles with interior pores purged and clean, as would not be the case otherwise. These particles are utilized as a "scrubbing" surface over the interior walls of the cells. Such small sized particles of activated charcoal absorb at very high rates of speed, because of their small size, and are thus many, many times more efficient than charcoal particles ordinarily used in filtration. This absorption rate varies as the square of the diameter of the particle size, with size differences here being of the order of 100 to 200 times less than particles ordinarily used, even in cigarette smoke filtration where they are considered small, but are in reality very large by comparison, and thus comparatively ineffective, as we have found.

The second stage of these systems can be conveniently utilized as carriers and as means of incorporating wide ranges of additives into the cellular structures prepared for special purposes, and which otherwise would be impracticable, either being lost within the mass of the resinous melt, contaminated, or their pores filled and rendered useless as absorptives when they represent this class of material.

We do not wish to be limited to the means by which we prepare the second stage of these described two-stage systems, nor to the means by which additives to the cellular material are incorporated with these second stages when this is done to utilize the prepared cellular material for special purposes, as these can be various, as illustrated by the examples which follow.

These methods embrace (a) the utilization of preparing various classes of silicates and incorporating additives intimately into these solid silicates, and (b) the encapsulation of discrete particles of solids capable of evolving gases when heated, with such encapsulation accomplished by inorganic gas impermeable shells of a macroscopic size, and which shells are conveniently and inexpensively provided by silicates in some instances.

Encapsulation methods utilized may be various and may include coating such particles with a silicate shell in an air stream, or the utilization of various deposition methods which will be described.

Electrophoresis is an efficient method of achieving encapsulation, of these macroscopically sized particles, for example. In some instances the material of the second stage may be liquid entirely, such as gaseous blowing agents in liquid form, and these may be encapsulated by the principles of coacervation, as described in U.S. Pats. 2,800,458 and 3,041,289.

It is possible to establish definite controls of time delays of rupture of the encapsulating shells or dissociation of the second stages of these two stage systems. This can be done by controlling the thickness and the physical properties of the inorganic encapsulating shells, or particles may be first encapsulated with polymeric materials which are elastic, although gas permeable, because of their large molecular structures, as compared to inorganic crystalline materials. They are then coated with gas impermeable materials, such as the silicates described. When exthe imparting of kinetic energy on collision of the gas molecules.

It is readily apparent that the rate of these changes is determined by the finite energy transfer per collision; macroscopically, infinite velocity and temperature gradients at the wave fronts represented, where molecules from gases of each blowing agent collide, are counteracted by the infinitely large viscous forces and rates of heat conduction which they respectively invoke.

Consequently, across these wave fronts at their points of intersection where they exist in each newly formed cell, there is increase in gas flow velocity due to the gas collision processes. It is this degration of directed kinetic energy of gas motion, into random kinetic or thermal energy of the molecules, which raises the state of the blowing agent gases, shocked by means which will be more fully explained, above that in an ordinary isentropic compression.

This process is irreversible and an increase in entropy consequently occurs across the shock fronts induced as a result of these two-stage blowing agent systems. The induced molecular collisions described can cause heats, on a molecular scale for periods of microseconds, exceeding 9000 degrees Kelvin. For these very short periods of time this is accompanied by dissociation of gases with the separation of free electrons.

These high heats described, which occur in each individual and particulate cell, just after geometric formation, yield tiny high velocity gas streams which induced interconnecting holes through cellular walls microseconds before their polymeric structures translate their physical state to a crystalline one, from an amorphous one, with the establishment of glass temperatures.

Recombination of the dissociated free electrons is an endothermic reaction requiring heat which is derived from the polymers comprising the walls of the cellular structure. Thus, there is high speed and almost instantaneous cooling as a result of the recombination of electrons comprising portions of the constituent gases of the two-stage blowing agents contained within the particulate cells. With the interconnection of cellular structure, there is further discharge of these gases from the cellular structure, at high speed, with additional cooling, thus firmly stabilizing the cellular material, and inducing uniform and small crystallite structure because of this rapid cooling.

To explain the utilization of our two-stage blowing system more completely, the gas comprising the first or primary stage of these two-stage systems, forms non-interconnecting or closed cells, from the hot polymeric material being utilized, by simple expansion, as is well known in the art.

By Jules-Thompson effect, with the expansion of this gas into a zone of maximum pressure drop, this is an expanding and cooling gas. Within this gas expansion pulses occur at a continually decreasing speed in the process of forming a particulate cell, for example. The polymers are stretched over a constantly increasing sphere, as relates to size, after dynamic forces of the expanding primary gas have been exceeded by resistant forces of the rearranged polymers. These polymers are now highly ordered with one another, particularly as pertains to the relative positions of their side chains, as shown best in FIG. 3.

Herein we have introduced the viscous polymer containing a primary blowing agent, considered the first stage of this system, into an evacuated atmosphere at a speed which is a translation of a piston pressure that may range from 500 p.s.i. to 100,000 p.s.i., but which we prefer to be of the order of 10,000 to 25,000 p.s.i., as being most convenient.

It is readily apparent that such pressures eject the viscous polymers at very high rates of speed, which are often at multiples of the speed of sound, which we shall consider to be 1080 feet per second.

Also contained within the melt of the viscous polymer is the second stage of our two-stage blowing agents.

The release of the dynamic energy of this second stage or secondary blowing agent is delayed from the beginning of the expansion of the primary gas by means which will be described, for finite periods of time which may range from nanoseconds (billionths) to milliseconds, after the particulate cell being described for purposes of illustration is at least 50% formed in relationship to its size. When the energy of the secondary blowing agent has overcome the restraints of pressure and encapsulation and/or other factors or means which have retarded its expansion so as not to form a wave front simultaneously with that of the primary agent, the molecules which comprise the former are then free to travel at supersonic velocity within the volume of the particulate cell containing the diminishing expansion pulses of the gas wave of the primary agent.

The unrestricted high speed of the molecules of the secondary gas cause them to overtake the more slowly moving molecules of the gases of the primary agent.

As has been described, with collision there is irreversible increase in entropy, very high heats resulting in ionization, as has been described, formation of intercommunicating cellular structure as this same procedure occurs throughout the cellular mass, and almost instantaneous electron cooling and change of state of polymers at glass temperature, or, from an amorphous phase to a crystalline one. Relative information on this subject may be found in The Shock Tube in High-Temperature Chemical Physics—A. G. Gaydon and I. R. Hurle, Reinhold Publishing Corporation, New York, 1963.

Since it is necessary to the production of open cell structure to produce a secondary wave front which creates heat and a high velocity gas stream, it is essential to retard for at least a nanosecond the initial expansion of the secondary gas until the primary gas has expanded the polymer to form cells as previously explained.

Although it might be expected that with injection into a zone of maximum pressure drop from a zone of high pressure, all blowing agents contained within the polymeric melt in a state of high vibrational energy will expand simultaneously, our invention provides means of preparation which will delay such simultaneous expansions.

As an example, a secondary blowing agent is restricted from expansion for a finite, although very short period of time, when encapsulated. It must overcome, first, forces of inertia that are encountered on an atomic level when matter is dissociated, which requires a finite period of time; secondly, modulus of elasticity of an inorganic encapsulating shell, for example, which requires a finite period of time, and thirdly, modulus of rupture of the same shell, which also requires a finite period of time. These combined totals of time lapse may extend from nanoseconds to milliseconds.

We have also discovered that primary agents do not expand instantaneously with release into zones of maximum pressure drop. Instead, there are also finite expansion times for primary agents within a gaseous two-stage system, though shorter than the secondary agent, by design. Similarly, the primary agent must first overcome atomic inertia, which requires a finite although very short period of time; then it must overcome the resistance to expansion of the molten polymeric material, in order to begin the process of cell formation which also requires a finite period of time in addition to the foregoing. (See "Flow and Rupture of Cubic Crystals from an Atomic Point of View," Pennsylvania State College, 1949.)

It may be stated that any convenient means for retarding the expansion of the gas forming chemical of the secondary agent until after the major (approximate one-half) portion of the primary agent has expanded, will meet the requirement of the present invention. It has been found that the retardation of the action of the secondary gas may be accomplished by encapsulation of the secondary gas forming chemical within a film of posed to the forces of rupture from the pressure of the gases within the capsules when previous restraining pressures have been removed, the elastic properties of the polymeric encapsulating shell cause resistance to rupture for finite periods of time measured in microseconds and which may extend to milliseconds. In these instances the purpose of the secondary encapsulating shell composed of silicates was to provide gas impermeability while the encapsulated entities where in a hot resinous melt, under a head of pressure, and thus in a high state of vibrational energy.

The particle size of the gas forming chemical of the secondary blowing agent should be between .25 and 15 microns, with 1–5 microns preferred. It should be noted that the larger sizes of this range are preferred when the gas forming chemical acts as a carrier for other additives, such as chelating agents, surface active agents, etc.

As is well known in the art (see Modern Plastics, 1964, page 367), the decomposition temperature of blowing agents such as azobisformamide can be regulated within a wide temperature range from 200° to 700° F., by the use of additives such as 2-ethyl hexoate, diethylene glycol, zinc oxide, vinyl stabilizers containing a metal such as lead, zinc and cadmium, and others. The amounts that can be used vary between ½% to 30% of the blowing agent. Other blowing agents having desirable (below 400° F.) gas forming temperatures such as the crystalline hydrates, complexes or aliphatic hydrocarbons, for example, do not require such additives.

Representative examples of the second stages, which we utilize in these two-stage blowing agents systems and of incorporated additives are as follows:

EXAMPLE 7

Part I

Azobisformamide dry blowing agent was separated into particulate size of approximately 2–3 microns, which were suspended in a matrix of 2-ethyl hexoate so as to provide a concentration of 2-ethyl hexoate of approximately 10% by weight of azobisformamide. The decomposition temperature of the resulting dry blowing agent particles was thus reduced to 275° F., as required by the processes of this invention.

Part II

A 12% solution of sodium silicate dispersed in water comprised the base materials of the following preparation:

| | Parts by wt. |
|---|---|
| 12% solution sodium silicate | 100.00 |
| Thickening and suspension agent, such as Carbopol 941 (B. F. Goodrich Chemical Co.) (a carboxy vinyl polymer) | .50 |
| Azobisformamide—2 - ethyl hexoate | 212.00 |
| Sodium hydroxide (10% solution) | 2.80 |

The above suspension demonstrated a Brookfield, 20 r.p.m., viscosity (c.p.s.) of 2040 and a pH of 8.8.

The above particle suspension was sufficiently fluid to be pumped through a spray nozzle at a pressure of 100 p.s.i. The particles were projected vertically into a heated chamber with a maintained temperature of 180° F. At the top of a vertical trajectory of eight feet, the discrete particles, thus coated with sodium silicate, arced with change of direction and fell to the bottom of the chamber where they were collected as particles of a fine dry powder and were thus made ready as the second stage of two-stage blowing agent systems used herein.

EXAMPLE 8

A 15% solution of sodium silicate, dispersed in water, comprised the base materials of the following preparation:

| | Parts by wt. |
|---|---|
| 15% solution of sodium silicate | 100.00 |
| Carbopol 940 (B. F. Goodrich Chemical Company) | .25 |
| Sodium Hydroxide (10% solution) | 1.90 |
| Stearylamine | .10 |
| Particulate particles of Part I, Example 7 | 195.00 |

The above prepared emulsion was dried in the drying tower described in Example 7 and the fine powder resulting was thus ready for usage as the second stage of a two-stage blowing agent system.

EXAMPLE 9

Apparatus consisted of a drying tower composed of a cylindrical stack six feet high and ten inches in diameter, equipped with a blower of 300 c.f.m. capacity, and two 1000 watt heating elements capable of maintaining 200° F. at the bottom of the tower. An atomizer was attached to a compressed air cylinder at the top of the stack. The atomizer was attached to a variable nozzle capable of producing droplets in a preferred approximate size of five microns. The reservoir to supply the suction stem of the atomizer was equipped with a mechanical stirring device.

Azobisformamide particles, prepared as in Part I of Example 7, were slurred in the atomizer reservoir with constant agitation to provide a uniform suspension.

Dispersed in the tower by atomization of the slurry, they passed through an air flow of 100% capacity of the blowers and a temperature of 150° F. The particles thus encapsulated with sodium silicate were collected in a pan at the base of the stack and were ready for utilization as the second stage of the two stage blowing agent systems utilized herein.

EXAMPLE 10

The encapsulation of particulate particles of solid blowing agents in this example were conducted exactly as in the preceding example, with the difference that drying tower height was increased to 24 feet, with proportional increase in blower capacity.

The particles collected at the base of the tower were of uniform size and showed good encapsulation. Thus prepared, they were ready for utilization as the second stage of two stage blowing agent systems described herein. The encapsulating material may be .5–200% of material encapsulated, and the latter being 1–100% of the total polymer weight.

Generally, the parameters of particle drying utilized herein are those customary in chemical engineering. Reference: Unit Operations of Chemical Engineering, McCabe and Smith, McGraw-Hill, 1956.

SECONDARY BLOWING AGENT—ENCAPSULATION—CRYSTALLIZING HYDRATE OR COMPLEX

We have found that water, as water of crystallization, can be utilized as a second stage blowing agent and thus as a crystalline hydrate is easily dispersed in a resinous melt. It is well known that water uncontained does not lend itself to ready miscibility. Also, decomposition of these crystalline hydrates is prevented in the resinous melt by external pressures on the particulate entities, of orders as low as 200 p.s.i., which are much less than the pressures supplied by the primary blowing agents during heating while resinous mixtures are being processed for expansion into cellular materials.

Additionally, when the crystalline hydrates are released into a zone of maximum pressure drop, there is delay in periods of microseconds, before the water of crystallization is released, as is required for second stages of two-stage blowing agent systems to be effective. Then the water as gaseous vapor is discharged into the volume of the cell formed by the primary agent at extremely high and almost explosive velocities. Also, we have found the cooling effect of the usage of water as a second stage blowing agent very effective in the absorption of heat from the thermoplastic structure, so as to achieve rapid stabilization.

Hydrates which are useful as primary or secondary blowing agents are those which (a) are crystalline, (b) evolve gas at temperatures at which polymer is expanded or blown—usually 220° F. to 525° F., and (c) are capable of evolving gas from the hydrate in an amount of at least .1% of weight of hydrate.

EXAMPLE 11

Sodium silicate $(NaO)_x \cdot (SiO_2)_y \cdot (H_2O)_3$ was ground into discrete particles approximately 1.5 microns in diameter. Thus prepared, it was ready for utilization as the second stage in a two-stage blowing agent system as used herein. Decomposition temperature of the prepared silicate, with release of water of crystallization, was below 285° F.

EXAMPLE 12

Herein sodium tetraborate dechaydrate $$(Na_2B_4O_7 \cdot 10H_2O)$$

ground into discrete particles .5 micron in diameter, was evaluated as a secondary blowing agent, as in the preceding example, and found satisfactory; first, holding water of crystallization when released into a zone of maximum pressure drop; then, releasing all of it at high velocity as a gaseous vapor, after a delay of microseconds.

EXAMPLE 13

In the subject example the following crystalline or glassy hydrates were prepared as the second stage of two-stage blowing agent systems in the particle sizes described:

| | Particle size, microns |
|---|---|
| Magnesium sulfate heptahydrate ($MgSO_4 \cdot 7H_2O$) | 2 |
| Ammonium magnesium phosphate hexahydrate ($NH_4MgPO_4 \cdot 6H_2O$) | 3 |
| Lithium sulfate mono hydrate ($Li_2SO_4 \cdot H_2O$) | 5 |
| Magnesium ammonium carbonate tetrahydrate ($MgCO_3 \cdot CO_3(NH)_2 \cdot 4H_2O$) | 4 |
| Magnesium oxalate dihydrate ($MgC_2O_4 \cdot 2H_2O$) | 6 |
| Sodium sulfate 4.75 hydrate ($Na_2SO_4 \cdot 4.75H_2O$) | 3 |
| Calcium chloride acetone ($CaCl_2 \cdot (CH_3)_2CO$) | 7 |
| Calcium chlorine acetone complex ($CaCl_2 \cdot 2(CH_3)_2CO$) | 5 |
| Calcium chloride methyl amine complex ($CaCl_2 \cdot 2(CH_3NH_2)$) | 2–10 |

It is our conclusion that many compounds that may be described as crystalline or glassy hydrates have useful application as the second stage blowing agents of two-stage blowing agent systems as we utilize them herein in the preparation of thermoplastic cellular structures. Also, other complexes of a similar nature, involving alcohols, ether, or other volatile materials, are equally applicable, provided there is delay with release into a zone of maximum pressure drop, even though measured in periods of microseconds or less, and the gaseous portions of the complex are almost totally released at high velocity similar to that of molecules in an explosive wave front but different in that expansion is merely that of a simple expanding gas with Jules-Thompson effect and ordinary gas dynamics—unlike an exploding gas—which embraces forces of detonation which are not desired within these parameters, even though on a macroscopic scale. The weights of these hydrates or complexes used should be within 2–175% of the weight of the polymer, with 20–100% preferred.

EXAMPLE 14

1% of ethylenediaminetetraacetic acid relative to weight of dry silicate was intimately mixed into the sodium silicate during preparation of the latter, which had been reduced to particles of a diameter of 4 microns. The particles thus prepared were ready for utilization as the second stage of two-stage blowing systems. Upon decomposition of the silicate, the metal chelate described is impinged upon the cellular walls of prepared cellular structures as a chelating agent for the biological filtration of gases scrubbed upon these surfaces by the spherical venturi turbulence imparted to gases drawn through these structures for biological filtration.

EXAMPLE 15

1% solution of ethylenediaminetetraacetic acid was forced under a pressure of 100 p.s.i. into the porous structure of Norit SGH activated washed charcoal derived from peat (American Norite Company, Inc.). The charcoal was divided to a selected particle size of 1.5 to 1.75 microns. By milling in a ball mill, it was commingled over the surface of particles of dry blowing agent, as prepared in Part I of Example 7.

The material thus prepared was next encapsulated, as illustrated in Example 8, with a thin gas impermeable shell of sodium silicate. When utilized as the second stage of two-stage blowing systems and the activated charcoal is impinged at high velocity over the surface of the cells of cellular structures being prepared as biological filters, there was no clogging of the pores of the activated charcoal, this having been prevented by the contained liquid ethylenediaminetetraacetic acid which purged the pores leading to the surface with release of pressure. Cellular structures, thus prepared as biological filters, comprised a multiplicity of interconnecting polygonal cells with interior surfaces coated with many finely divided particles of activated charcoal, as a scrubbing surface presented to turbulent gas flow of mainstream gases subjected to the dynamics of the multiplicity of spherical venturis thus prepared and extending to several million per cubic inch when required. Metal chelates are thus lodged both within the pores and also upon the surface of the charcoal particles which provide a scrubbing surface.

EXAMPLE 16

Filtration is accomplished in this example exactly as in Example 15 preceding, with the following exceptions:

Herein particulate size of the dry blowing agent of Part I of Example 7 was prepared in a diameter of 5 microns. Absorptive materials comprised a mixture of 30% activated charcoal, as described above, and 70% crystalline alumino-silicates Type 4A, Linde Company, Union Carbide Corporation, commonly called zeolites.

The crystalline-alumino silicates of this specification demonstrate the capacity to absorb molecules or particles larger than 10 angstroms in diameter which gives them ample capacity to chelate or to absorb radioactive particles of smoke or other substances which ordinarily are of a mean diameter much smaller than this, as contrasted with activated charcoal by itself which is characterized by a large percentage of very small pores and is thus rendered largely ineffective in many instances.

Herein both the activated charcoal and crystalline alumino silicates were saturated with the metal chelate of the previous example under a pressure of 100 p.s.i. and this mixture of both absorbents was commingled by ball mill rolling, with approximately even distribution of particles over the surface of the dry blowing agent particles and then encapsulated as has been explained. In this example the particle size of the crystalline alumino-silicates was reduced to a mean size of approximately 1.5 microns.

Thus by these means a surface possessing characteristics of physical "scrubbing" effect, and absorptive, adsorptive, and chelating capabilities is provided on the interior surfaces of each particular surface of each cell.

EXAMPLE 17

In this example sodium hexametaphosphate was utilized as a sequestering agent for radioactive isotopes and was supplied to the cellular structure as illustrated in the example preceding, as a constituent of a secondary blowing agent of a two-stage system.

APPARATUS AND METHOD FOR PRODUCING THERMOPLASTIC CELLULAR MATERIAL IN LARGE CROSS SECTION

In order to produce our thermoplastic cellular material in large cross section (greater than 10 square inches), it has been found necessary to divide the stream of polymer and melt into a multiplicity of discrete particles, by ejecting the stream at a speed greater than one-half the speed of sound, and then depositing the particles at isolated points which coalesce to form a laminar sheet within a fan-shaped area.

In order to achieve the results of large cross sectional cellular material in accordance with the above procedure, Apparatus III was designed.

Numerous experiments with Apparatus I and Apparatus II, in addition to our knowledge of the prior art, confirmed the unavailability under the prior art, of large cross sections of desired size, of cellular thermoplastic low density materials on a continuous basis.

Apparatus III was designed as an example of a large scale, high speed, high volume apparatus with components capable of withstanding great pressures and translating polymer melt into a multiplicity of discreet particles of expanding material which (a) expand in isolation from each other when expanding simultaneously, and (b) expanding at different time intervals when adjacent each other.

As referenced to FIGURE 6, the apparatus and process illustrated herein is that utilized for the continuous production of large cross sections of cellular materials of thermoplastic polymers whether or not they are amorphous or highly crystalline, without severe distortions because of thermoelastic and physio-chemical forces.

The extruder 10 includes a barrel 12 which houses twin or multiple screws 14, 14, principally utilized for heating, mixing, and transport of the material, continuously, to cooling zones within the barrel, before material is subject to extreme high pressure prior to expansion. The first zone A, within the extruder, has heating means (not shown) and receives the polymers to be heated above their crystalline temperatures. The second zone B also has heating means (not shown) and herein hydrocarbon and gaseous blowing agents are introduced through line 16 from high pressure pump 18. Cylinders 20 contain both hydrocarbon blowing agents and, when desired, polymers dispersed in wet gaseous mixtures just as they are found after the completion of the polymerization process and removal of the catalyst, and without further separation. The gases and solids in these cylinders 20 are connected to pressure-type mixing vessel 22, which is prepared to receive solid additives additionally, so as to keep all solids suspended within liquid gaseous blowing agents. Thus all components are introduced to high pressure pump 18 for introduction to the mixing extruder at zone B through check valve 24. By adequate baffles and utilization of back pressure, zone B is made gas tight and holds dispersed gases without leakage.

Zones C, D and E of extruder mixing barrel are fitted with both heating and cooling means (not shown) and screws 14 are caused to feed prepared material through Y connection 36, which distributes feed to either ejection cylinder 28 and 30 as pistons 32 and 34 contained therein are either beginning or ending cycles and receiving ports in cylinders are either open or closed, depending upon the relative positions of the pistons 32 and 34.

In general terms, the processes of the present invention are carried out by admitting the polymers to a conventional mixing extruder which may contain one or more screws. It is emphasized that herein extruders are used to merely mix and transport melt to piston-type cylinders able to deliver the high nozzle pressures preferred, these being beyond the parameters of extruders as they are known commercially. It should be further understood that any compatible mixing means able to accomplish the same described purposes is satisfactory as a feed source.

The precompression nozzles 36 of special design are illustrated in FIGS. 7, 7A, 7B and 8, as is true of nozzle orifices 38 and electromagnetic relays 40. The steel ejection cylinders 28, 30 with related hydraulic driving mechanisms able to deliver an effective force of the order of 30,000 p.s.i. on the nozzle of each cylinder, are strongly connected and braced to a floor mounted support 42.

Conveyor belt 42 is of wire cable and rubber coated, preferably with polychlorotrifluoroethylene, as are the lenticulated sides 44 of the belt. These lenticulated sides are of rubber covered steel construction and are shown 18 inches in height, and may be any height desired down to ¼ inch for higher speeds. Lenticulation permits the sides to travel over conveyor rollers 46 at each extremity of the belt system which, as illustrated herein, is 6 feet wide and 45 feet long. The conveyor belt 42 enters housing 48 through a slip seal 50, which is an air guard, as housing 48 encloses a chamber 52 which can be made largely evacuated when desired in spite of the continuous emergence of the cellular material within the width and height of the conveyor belt and its lenticulated sides.

The opposite extremity of the housing 48 encloses a chamber 52 which can be made largely evacuated when desired in spite of the continuous emergence of the cellular material within the width and height of the conveyor belt and its lenticulated sides.

The opposite extremity of the housing 48 encloses three air locks and seals (not shown) which permit passage of the cellular product, without interruption, into the atmosphere. The air seals provided there, which include low pressure air rollers (not shown) substantially seal the irregular surface of the cellular product so as to minimize air leakage and accomplish satisfactory—if not perfect— seals against air leakage, permitting evacuation of the vacuum chamber 52 down to orders to ⅛ atmosphere and holding this degree of evacuation against air leakage described. Vacuum pumps 54 are connected in tandem with air receivers 56 of which there are also three. Pumping system runs continuously, thus drawing off any air leakage that passes air seals with the continuous emergence of cellular product CP, which is illustrated here as 18 inches high and 6 feet wide and of continuous length.

Cellular product is received by vacuum table 58, which is equipped with a multiplicity of smooth-edged bandsaw blades 60, which cut cellular product formed, in this large bulk size, horizontally into smaller sizes for fabrication into articles. The bulk stock so split is wound, when applicable and desired, upon take-up reels. The split stock may be further reduced by verticle sawing to prepare it into profiles for heat forming into contoured and shaped articles of manufacture.

The process has been found economical and well suited to preparing disposable articles, to be described hereafter, in large volume at high speed. The cross section of the material being prepared may be readily adjusted to its end application by appropriating engineering revisions of the parameters illustrated herein, in some cases only the speed of the conveyor belt.

All metal parts of the equipment illustrated herein are equipped with heating facilities, where there is contact with the polymeric base materials before completion of formation of the cellular product, so that ambient temperatures may be obtained in critical areas, as will be more fully described.

FIGS. 7 and 8 illustrate the general body construction of the high pressure nozzles 36 that are utilized in this invention. The fluid polymer is transported to the nozzle under hydrostatic pressure through passage 62, and held under such pressure by precompression valve 64 and then is diverted and translated geometrically by orifice 38 which is illustrated, as representative or typical design, at a larger scale as the subject of FIGS. 7A and 7B.

Heater band 66 is utilized to maintain nozzle temperatures at the same ambient temperatures as that of the polymeric materials prepared for expansion into cellular structures, and these temperatures may be varied to correspond closely with the various temperatures needed for different combinations of base materials. Bore 68 of the nozzle as shown is of 3/32 inch diameter, but may range from 3 inches to .01 inch in diameter. The bore is of relatively great length (3/8 inch to 14 inches) to effect preliminary organization of polymers before expansion is permitted.

The precompression valve 64 is characterized by a very strong seating arrangement and, when in open position, has a diameter equal to the diameter of the bore of the nozzle. Thermocouple wall 70 is provided at the extreme edge of the nozzle to effect accurate control and adjustment of nozzle temperature with ambient temperature of the fluid stream, it being preferred that they be equal. Temperature differences at interfaces can rapidly alter the physical change of state of the polymers.

The main body of nozzle 36 is fitted into the top section of housing 48, and thus vacuum chamber 52 is utilized for preparation of cellular materials with permanent vacuum-tight seals 72.

A representation of alteration of geometry of fluid stream is represented by fan-shaped pattern 74 of nozzle 36. Bore hole 76, approximately .01 inch in diameter is a strain gauge which translates diminishment of fluid stream pressure in nozzle bore 68, at end of cycle, to electric multiplier and relay box 40, mounted on side of nozzle. Relay box 40 activates electromagnetic linkage (not shown) opening identical precompression valve on duplicate nozzle (see FIG. 6) and cylinder assembly. Approximate opening and closing times, to full open or full shut, of precompression valves 64 is of the order of two milliseconds with proper electromagnetic linkages. Thus, approximately a millisecond before termination of fluid stream in passage 62, the impending termination is indicated on the strain gauge 76 by fractional decrease in the high pressure in bore 68. As the pressure drop is sensed by the strain gauge, it is translated to the precompression valve on the duplicate nozzle, causing it to open. Since the valve restrains polymeric melt hydrostatically compressed, flow is practically instantaneous. Thus, prior to complete termination of the fluid stream/ in a discharging nozzle, there is continuation of the stream by the duplicate nozzle. The process is of such high speed with such closely coordinated interchange as relates to closing and opening of nozzles that, even though two separate cylinders are utilized as the most efficient means of producing the required high pressures, material delivery is practically continuous and interchange is essentially indistinguishable from one cylnder to its duplicate counterpart.

While one cylinder is being discharged, the cylinder previously emptied, as described, is filled and the piston, timed to a preferred cycle by conventional means, compresses the received material hydrostatically and is thus readied for ejection from the activation of the pressure sensing devices 40 and 76, on the adjoining nozzle at the end of its cycle, or, more accurately, just before the end of its period of discharge by an interval of approximately one millisecond.

Alteration takes the form of translation of a cylindrical jet stream of liquid resin into a laminar sheet of the same liquid resin dispersed over the opposing surface of the vacuum chamber which may be closed or open.

Translation of geometric shape follows basic mechanics of division of the 3/32 inch wide fluid stream into a multiplicity of divided and unstable particles of liquid which break down into a series of drops of uniform diameter, which coalesce again in an altered geometric pattern of fan shape.

Because the liquid particles are divided by design and directed to the surface Sf of the belt 42, the direction of growth of the laminar sheet resulting after initial particle coalescence and recombination is primarily towards the nozzle, with only slight lateral growth.

Dynamics are very much like those found in preparing cellular urethane materials which are readily made in large bulk sizes of any diameter, because cellular expansion takes place from the surface of a laminar sheet at dispersed locations or points, when such expansion is simultaneous; otherwise, at separate intervals of time, no matter how small these intervals, when locations of points are adjacent. Expansion process continues from the bottom of the mass upwards almost without force in any other direction, because of the nature of the time intervals of the expansion process as distributed throughout the geometric mass of the material.

FIG. 7B is an enlarged section of nozzle 36, as shown in FIG. 7A. The nozzle bore 68 in FIG. 7A is squeezed at its extremity and formed into the shape of 38 shown in FIG. 7B, which is a greatly enlarged illustration of the shape of the extreme end 1 of the nozzle. It is this translation of the nozzle bore 68, although only of the order of 3/32 inch in diameter into a configuration 38 representing the intersecting double ellipses shown in FIG. 7B which results in the geometric division of the fluid stream ejected from the nozzle bore into a multiplicity of divided particles which are uniformly distributed over a fan-shaped area that extends across the surface Sf of the conveyor belt 42. Continuous travel of the belt receiving the continuous fan-shaped discharge results in the production of the described cellular material CP in deep thicknesses as laminar sheets of the fluid material are deposited upon one another. The multiplicity of such layer so imposed can be determined by adjusting the rate of travel of the conveyor belt, thus thicknesses may range widely from 1/8 inch, produced at extremely high rates of conveyor speed, to thickness of 18 inches or more, produced at lower speed limits. Widths likewise may range from narrow dimensions to widths of 6 feet or more.

FIG. 8 represents an alternate means of effecting the necesary geometrical translation of the fluid stream by the novel means of utilizing the impingement of the high speed stream upon any convex surface 78 from an oblique direction at the point of impact on the surface, angle $\alpha$, so that there is dispersion and distribution of the component parts of the stream into particles over a fan-shaped area 74 similar to that described above. The convex surface 78 may be ellipsoidal, parabolic, spherical, or any other curved (non-flat) surface.

The spherical surfaces thus utilized as described are combined with a multiplicity of radii, so that the final structure is an ellipsoid. Made from tungsten based alloys or other hard materials, it must be able to withstand ablation over long periods from a high speed fluid stream which its surface deflects. Slight rotation of the tungsten-carbide target around its long axis provides efficient means of altering the direction and shape of the deflected and dispersed fluid stream, as desired. The target, or ellipsoid, is an integral part of the strong mounting shaft 80 that provides both for its support and its rotation, as required. This shaft is heavily constructed and strongly mounted, so as to absorb vibration as the fluid stream, which deflects from the ellipsoidal surface 80, is often travelling at speeds of several thousand feet a second.

We have found that the achievement of fluid stream division by described targets are with unsuspected beneficial result in accomplishment of irreversable translation of energy to the polymers within the fluid stream resulting in increase molecular weight and other desirable effect. The inducement of shock waves at speeds greater than the speed of sound, by these means and within these visco-plastic mediums, is beneficial in final cellular products. Explanation of the translation of such energies may be found in "Propagation of Stress Waves in a Rate Sensitive Plastic Medium," P. Perzyna, Institute of Basic Technical Research Polish Academy of Sciences, Warsaw, Poland. Research Associate, Division of Applied Mathematics, Brown University, 1962.

CLOSED CELL PRODUCT.—EXAMPLE 18

The apparatus illustrated in FIG. 6, and consisting of high pressure pump, dual screw mixing extruder, split feeds into dual ejection cylinders with 30,000 p.s.i. pressure delivery at orifices, available from the hydraulic and piston assemblies of each cylinder, independently of each other, and special nozzle designs illustrated, with precompression valves fitted into each nozzle, is utilized in this example. Additionally, extruder barrel Y feed line, ejection cylinders, and nozzles are fitted with thermocouples at distances of not more than 8 inches apart and on a diminishing scale down to distances of 4 inches as tip of nozzle is approached. We have found that good temperature control is essential, and thus operation is not conducted until ambient heats on a decreasing scale are established from zone A at the mixing extruder, as illustrated in FIG. 6, and throughout all parts of the metal equipment extending to the interior surfaces of the nozzle bore at its tip, which is point of emergence of fluid stream and where geometric division occurs, at this instant, where division is accomplished by means of the nozzle design illustrated in FIGS. 7, 7A and 7B. Ambient temperatures are established and held in zones, as desired, by utilization of both heating and cooling means, sometimes simultaneously, until rates of heat exchange are balanced as desired. Cooling, not illustrated and where not jacketed as throughout the barrel of the extruder, is by supplementary cooling coils utilized where required.

Production rate of subject equipment, by vari-drive adjustment and line balancing, was lowered 400% to a feed rate of 250 pounds of polymeric material per hour for the purposes of this example.

The subject apparatus is for the purpose of making thermoplastic cellular structures in large cross section in spite of inherent forces of thermoelastic strains and those resulting from rapid physiochemical change, which have been illustrated as distorting to uselessness even small laboratory sized cross sections prepared by means other than those utilizing the principles incorporated in the subject apparatus.

We know of no way to make large cross sections of our preferred materials as required to meet commercial needs, in low densities, except by the parameters disclosed herein.

Thus, all samples prepared on Apparatus III are in large cross section and long in length, the procedure being a continuous one. Because this is also a high speed process, it is more difficult to produce less of the subject material than it is to produce more on our apparatus. Also, throughout the following examples, there will be interchange without specific reference thereto, of nozzle design and method of altering geometry of the fluid stream. In all instances, however, method of division and subsequent recombination of fluid stream is essential. In all of the following examples it is to be noted that the speeds are in excess of Mach 1, unless otherwise noted.

For the purposes of the following examples, process rate of 250 pounds per hour utilized herein is reduced to relative parts by weight of component materials utilized in preparing the cellular material described, and relative proportions of materials are thus expressed in this way, by relative weight, rather than in terms of pounds per hour, and this should be understood.

To the afore-mentioned apparatus we added a solid resinous polymer consisting of polypropylene and comprising 98% stereo-specific structure and 2% amorphous structure, and which comprised 100 parts by weight of the mixtures utilized.

Gaseous blowing agent, in liquid form from tanks under pressure, was introduced into the secondary zone of the mixing extruder, identified as zone B, under a pressure of 1000 pounds per square inch. Parts by weight comprised 250 and additionally, liquid blowing agent was caused to contain .5 part by weight of Union Carbide Tergitol, which was introduced into liquid gaseous blowing agent via the pressure mixing vessel described and through which the liquid blowing agent was passed, and thence into the high pressure pump, and then into zone B of the extruder barrel.

Ambient temperatures of zone A of barrel was 368 degrees F.
Ambient temperatures of zone B of barrel was 365 degrees F.
Ambient temperatures of zone C of barrel was 343 degrees F.
Ambient temperatures of zone D of barrel was 320 degrees F.
Ambient temperatures of zone E of barrel was 305 degrees F.
Ambient temperatures of Y feed was 305 degrees F.
Ambient temperatures of cylinders was 300 degrees F.
Ambient temperatures of nozzles was 300 degrees F.

Vacuum chamber of apparatus was evacuated to emptiness or a pressure less than 1/8 atmospheres, which is satisfactory and advantageous for these purposes. Cellular material was prepared as has been described previously and under a pressure at the orifice, as delivered by the pistons, of 25,000 p.s.i., with the resinous material compressed, additionally, hydrostatically. With opening of the precompression valves, the cellular product resulting was found to have a density of .8 of an ounce per cubic foot and to comprise 40% open cell and 60% closed cell.

Sample prepared was 12 inches thick, 6 feet wide, and 115 feet long continuously as was necessary in clearing the apparatus, this being in the nature of a minimum material charge for the subject apparatus.

The sizes of the samples as regards their thickness and lengths is of course a function of rate of discharge of the fluid stream, after and with geometric alteration, upon the conveyor which, with its lenticulated sides, acts as a forming box establishing a regular shape to the width and sides of the cellular product. Some unevenness characterizes the top surfaces of the cellular mass thus expanded without restriction, on the conveyor belt, but this convex irregularity is of relatively small order and the top surface described is trimmed to a level surface with the smooth edge band saw blade which has been described. The irregular material, sawed free, is then reprocessed, being, by nature, thermoplastic.

Many variables control thickness of the cellular product prepared upon the conveyor belt and rate of preparation, these being functions of pressure, rate of travel of conveyor system, and feed rate of mixing extruder.

Due to the expansion factors, quantities of base materials utilized are relatively small compared to the volume of the cellular product.

The apparatus is capable of extensive variations of control and this should be recalled as pertaining to the following examples which utilize the apparatus.

All of the following examples produce size of cellular material at least 10 in.$^2$ and follow the procedure of Example 18.

EXAMPLE 19

| | Parts by wt. |
|---|---|
| 100% amorphous polypropylene | 100 |
| Butane blowing agent | 175 |
| Either Union Carbide Tergitol 15–S–9 nonionic nonyl phenyl polyethylene glyocl ether) or 15–S–3A (sodium heptadecyl sulfate) (optional) | .5 |
| Zone A melt temperature, ° F. | 310 |
| Nozzle and stream temperature at point of dispersion, ° F | 280 |
| Percent vacuum (atmosphere=1) | Less than 1/8 |
| Piston pressure, adjusted to orifice diameter, p.s.i. | 15,000 |

EXAMPLE 19—Continued

|  | Parts by wt. |
|---|---|
| Percent closed cell | 95 |
| Density, ounces per cubic foot | 2.5 |

EXAMPLE 20

|  | Parts by wt. |
|---|---|
| 20% polypropylene and 80% polyethylene (polyallomer) | 100 |
| 80% butane blowing agent, 20% propane | 100 |
| Sodium silicate (optional) | .5 |
| Zone A melt temperature, °F | 340 |
| Nozzle and stream temperature at point of dispersion, °F | 295 |
| Percent vacuum (atmosphere=1) | Less than 1/8 |
| Piston pressure (adjusted to orifice diameter) | 12,000 |
| Percent closed cell | 97 |
| Density, ounces per cubic foot | 4 |

EXAMPLE 21

|  | Parts by wt. |
|---|---|
| Stereospecific isotactic polystyrene | 100 |
| Butane blowing agent | 25 |
| Union Carbide Tergitol 15-S-9 | .2 |
| Zone A melt temperature, °F | 440 |
| Nozzle and stream temperature at point of dispersion, °F | 395 |
| Percent vacuum (atmosphere=1) | Less than 1/8 |
| Piston pressure (adjusted to orifice diameter) | 20,000 |
| Percent closed cell | 96 |
| Density, ounces per cubic foot | 1.7 |

EXAMPLE 22

|  | Parts by wt. |
|---|---|
| 20% amorphous polystyrene and 80% crystalline polyethylene | 100 |
| 1,2-dichlorotetrafluoroethane (blowing agent) | 33 |
| Union Carbide Tergitol 15-S-9 | .5 |
| Zone A melt temperature, °F | 305 |
| Nozzle and stream temperature at point of dispersion, °F | 290 |
| Percent vacuum (atmosphere=1) | Less than 1/8 |
| Piston pressure (adjusted to orifice diameter) | 20,000 |
| Percent closed cell | 94 |
| Density, ounces per cubic foot | 3 |

EXAMPLE 23

|  | Parts by wt. |
|---|---|
| Type 6 nylon (polyamide) | 100 |
| 50% dimethyl oxalate, 50% Freon 11 (blowing agent) | 40 |
| Tergitol 15-S-9 | .2 |
| Zone A melt temperature, °F | 430 |
| Nozzle and stream temperature at point of dispersion, °F | 390 |
| Percent vacuum (atmosphere=1) | Less than 1/8 |
| Piston pressure (adjusted to orifice diameter) | 25,000 |
| Percent closed cell | 96 |
| Density, ounces per cubic foot | 4 |

EXAMPLE 24

|  | Parts by wt. |
|---|---|
| Polyamide derived from cyclohexanebis (methylamine) | 100 |
| 30% Freon 11 (blowing agent) | 35 |
| Tergitol 15-S-9 | .5 |
| Zone A melt temperature, °F | 480 |
| Nozzle and stream temperature at point of dispersion, °F | 455 |
| Percent vacuum (atmosphere=1) | Less than 1/8 |
| Piston pressure (adjusted to orifice diameter) | 20,000 |
| Percent closed cell | 93 |
| Density, ounces per cubic foot | 8 |

CLOSED CELL PRODUCT

| Example | (1) Parts by weight | Base material | (2) Melt temp. (°F.) | (3) Blowing agent | (4) Parts by weight | (5) Additives | (6) Parts by weight | (7) Additives | (8) Parts by weight | (9) Temp. at nozzle (°F.) | (10) Percent vacuum, atm.=1 | (11) Closed cell | (12) Piston pressure (p.s.i.) | (13) Density (oz./cu./ft.) |
|---|---|---|---|---|---|---|---|---|---|---|---|---|---|---|
| 28 | 100 | 50% isotactic polypropylene and 50% amorphous. | 350 | Butane | 200 | Union Carbide Tergitol 15-S-9 | .5 |  |  | 290 | 1/8 | 95 | 18,000 | 1.2 |
| 29 | 100 | 100% polyethylene, low density | 290 | do | 75 | Sodium silicate | .5 | Dicumyl peroxide | 2 | 265 | 1/2–1 | 95 | 12,000 | 22 |
| 30 | 100 | 100% high density polyethylene | 300 | do | 125 | do | .5 | Dimethyl-2,5-di(tert-butyl peroxy)hexane-3. | 3 | 280 | 1/2–1 | 96 | 12,000 | 29 |
| 31 | 100 | do | 305 | Propane | 50 | Potassium metasilicate | 1.5 | Potassium metasilicate | 1.5 | 270 | 1/8 | 98 | 20,000 | 2.5 |
| 32 | 100 | Amorphous polystyrene | 310 | do | 20 | Union Carbide Tergitol 15-S-9 | .2 |  |  | 290 | 1/2 | 95 | 15,000 | 4 |
| 33 | 100 | 50% amorphous and 50% isotactic polystyrene. | 430 | 65% butane, 35% propane | 20 | do | .2 |  |  | 385 | 1/8 | 96 | 20,000 | 6.5 |
| 34 | 100 | Type 6/6 nylon (polyamide) | 465 | 50% Freon 11, 50% methyl stearate. | 30 | Tergitol 15-S-9 | .5 |  |  | 410 | 3/4 | 96 | 25,000 | 8.5 |
| 35 | 100 | Type 6 nylon (polyamide) | 430 | 50% Freon 11, 50% dimethyl terephthalate. | 20 | do | .2 |  |  | 385 | 3/4 | 95 | 25,000 | 21.5 |
| 36 | 100 | Cellulose acetate butyrate | 320 | Azobisformamide with 5% diethylene glycol. | 5 | do | .2 |  |  | 290 | 1/8 | 96 | 18,000 | 14 |
| 37 | 100 | Cellulose propionate | 330 | do | 8 | do | .2 |  |  | 290 | 1/8 | 95 | 18,000 | 17 |
| 38 | 100 | Vinylidene chloride | 290 | Azobisformamide with 10% diethylene glycol. | 20 | do | .5 |  |  | 280 | 1/8 | 95 | 15,000 | 18 |
| 39 | 100 | 80% high mol. wt. polypropylene and 20% polycarbonate. | 515 | 50% butane, 50% benzene | 175 | do | .2 |  |  | 570 | 1/8 | 96 | 25,000 | 9 |

NOTE.—Examples 25 through 27 appear in column 33.

OPEN CELL PRODUCT

| Ex. | (1) Parts by wt. Base material | (2) Melt temp., °F. | (3) Blowing agent | (4) Parts by wt. | (5) Additives | (6) Parts by wt. | (7) Additives | (8) Parts by wt. | (9) Additives | (10) Parts by wt. | (11) Temp. at nozzle °F | (12) Percent vacuum, atm.=1 | (13) Percent open cell | (14) Piston pressure (p.s.i.) | (15) Density oz./cu.ft. |
|---|---|---|---|---|---|---|---|---|---|---|---|---|---|---|---|
| 53 | 20% isotactic polypropylene and 80% amorphous. 100 | 350 | Propane | 175 | Union Carbide Tergitol 15-S-9 | .5 | See Note 1 | 20 | Trialkoxy stearate | 20 | 290 | ¼ | 95 | 20,000 | 5 |
| 54 | 100% amorphous polypropylene. 100 | 305 | Propylene | 200 | do | 1.0 | See Note 2 | 25 | Sodium stearate | 20 | 260 | ⅛ | 90 | 18,000 | 6 |
| 55 | 50% isotactic polypropylene and 50% amorphous. 100 | 350 | Pentane | 100 | do | .5 | See Note 3, chlorosulfonation | 20 | do | 20 | 300 | ⅓ | 90 | 18,000 | 5 |
| 56 | 98% isotactic polypropylene, 2% amorphous. 100 | 360 | Hexane | 100 | do | .5 | See Note 2 | 15 | Sodium lauryl sulphate | 15 | 310 | ⅓ | 98 | 15,000 | 4 |
| 57 | 98% isotactic polypropylene and 2% amorphous. 100 | 355 | Benzene | 75 | do | .5 | See Note 4 | 15 | Sodium stearate | 35 | 300 | 1 | 96 | 15,000 | 14 |
| 58 | 100% amorphous polypropylene with 20% ethylene-propylene polymer. 100 | 295 | Propane | 150 | Silica SiO₂ | 1.5 | See Note 5 | 15 | Sulphur | .5 | 260 | ½ | 98 | 18,000 | 13.5 |
| 59 | 20% polypropylene and 80% polyethylene (polyallomer). 100 | 335 | Benzene | 100 | Sodium silicate | .2 | See Note 3 | 18 | Sodium lauryl sulphate | 12 | 280 | 1 | 95 | 12,000 | 12 |
| 60 | 100% high density polyethylene. 100 | 300 | Propylene | 125 | Union Carbide Tergitol 15-S-9 | .5 | See Note 5 | 20 | Trialkoxy stearate | 20 | 270 | ⅓ | 98 | 12,000 | 8 |
| 61 | do. 100 | 310 | Butane | 200 | do | .2 | See Note 4 | 15 | do | 15 | 280 | 0 | 94 | 18,000 | 4 |
| 62 | 20% polypropylene and 80% polyethylene (polyallomer). 100 | 335 | do | 50 | Potassium metasilicate | 1.5 | See Note 6 | 5 | Sodium lauryl sulphate | 5 | 295 | ½ | 60 | 20,000 | 22 |
| 63 | Amorphous polystyrene. 100 | 300 | Methyl chloride | 33 | do | 1 | See Note 4 | 15 | do | 12 | 270 | ¼ | 92 | 20,000 | 6 |
| 64 | Ethylenic polyamide (cocondensation of unsaturated ethylene amino acid). 100 | 210 | 30% methanol, 40% methylamine, 30% Freon 11. | 35 | Benzoyl peroxide | 3 | See Note 7 | 10 | Ethylenediamine tetraacetic acid | 8 | 180 | ⅜ | 96 | 20,000 | 15 |
| 65 | Cellulose acetate butyrate. 100 | 315 | Azobisformamide with 5% diethylene glycol. | 5 | Tergitol 15-S-9 | .5 | See Note 1 | 15 | Sodium stearate | 15 | 280 | 0 | 98 | 18,000 | 12 |
| 66 | Cellulose propionate. 100 | 325 | do | 10 | do | .5 | See Note 2 | 20 | Trialkoxy stearate | 4 | 290 | 0 | 98 | 18,000 | 10 |
| 67 | 80% high mol wt. polypropylene and 20% polycarbonate. 100 | 520 | 50% Butane, 50% benzene. | 175 | do | .2 | See Note 1 | 18 | Sodium stearate | 8 | 580 | ⅓ | 92 | 25,000 | 4.5 |

NOTE 1.—Two stage blowing agent, as in Example 7.
NOTE 2.—Two stage blowing agent, as in Example 8.
NOTE 3.—Two stage blowing agent with chlorosulfonation, as in Example 78.

| Other additives | Part by Weight |
|---|---|
| A — Encapsulated chlorine and benzenesulfonylhydrazide | 12 |
| B — Magnesium oxide | .3 |
| C — Sulphur | 1 |
| D — Depentemethylene thiuramtetrasulfide | .5 |

NOTE 4.—Two stage blowing agent, as in Example 10.
NOTE 5.—Two stage blowing agent, as in Example 11.
NOTE 6.—Two stage blowing agent magnesium sulfate heptahydrate, in Example 13.
NOTE 7.—Two stage blowing agent, as in Example 12.

EXAMPLE 25

| | Parts by wt. |
|---|---|
| Cellulose acetate | 100 |
| Azobisformamide with 5% diethylene glycol (blowing agent) | 10 |
| Tergitol 15-S-9 | .2 |
| Zone A melt temperature, °F. | 325 |
| Nozzle and stream temperature at point of dispersion, °F | 300 |
| Percent vacuum (atmosphere=1) | 1 |
| Piston pressure (adjusted to orifice diameter) | 18,000 |
| Percent closed cell | 96 |
| Density, ounces per cubic foot | 34 |

EXAMPLE 26

| | Parts by wt. |
|---|---|
| Urethane elastomer (thermoplastic) | 100 |
| Azobisformamide with 10% diethyl glycol (blowing agent) | 25 |
| Tergitol 15-S-9 | .5 |
| Zone A melt temperature, °F | 290 |
| Nozzle and stream temperature at point of dispersion, °F | 275 |
| Percent vacuum (atmosphere=1) | Less than 1/8 |
| Piston pressure (adjusted to orifice diameter) | 18,000 |
| Percent closed cell | 96 |
| Density, ounces per cubic foot | 11 |

EXAMPLE 27

| | Parts by wt. |
|---|---|
| 65% polytetrafluoroethylene and 35% styrene | 100 |
| 1,2-dichlorotetrafluorethane (blowing agent) | 40 |
| Sodium silicate (optional) | .5 |
| Zone A melt temperature, °F | 330 |
| Nozzle and stream temperature at point of dispersion, °F | 290 |
| Percent vacuum (atmosphere=1) | Less than 1/8 |
| Piston pressure (adjusted to orifice diameter) | 20,000 |
| Percent closed cell | 98 |
| Density, ounces per cubic foot | 10 |

Procedure for the examples listed below is the same as followed in Example 18 on Apparatus III, with the addition of the following:

EXAMPLE 39A

As references in the description of FIG. 6, the pressure-type mixing vessel 22 was utilized to receive solid additives and/or blowing agents. The solid particles are suspended within the liquid gaseous blowing agents, primary agents in the following examples, and are introduced to high pressure pump 18 for introduction to mixing extruder at zone B. The solid agents in these examples are the previously described secondary blowing agents of our unique two-stage system. Thus, all the following examples are of open cellular material and all the products are of a cross section greater than 10 in.².

EXAMPLE 40

| | Parts by wt. |
|---|---|
| 98% isotactic and 2% amorphous polypropylene | 100 |
| Propane blowing agent | 175 |
| Sodium lauryl sulphate | 20 |
| Secondary agent—Example 16 | 25 |
| Union Carbide Tergitol 15-S-9 | .5 |
| Zone A melt temperature, °F. | 365 |
| Nozzle and stream temperature at point of dispersion, °F. | 290 |
| Percent vacuum (atmosphere=1) | Less than 1/8 |
| Piston pressure (adjusted to orifice diameter) | 20,000 |
| Percent open cell | 98 |
| Density, ounces per cubic foot | 2 |

EXAMPLE 41

| | Parts by wt. |
|---|---|
| 50% isotactic and 50% amorphous polypropylene | 100 |
| Butane blowing agent | 150 |
| Ethylenediaminetetraacetic acid | 5 |
| Secondary agent—Example 15 | 20 |
| Union Carbide Tergitol 15-S-9 | 1 |
| Zone A melt temperature, °F. | 340 |
| Nozzle and stream temperature at point of dispersion, °F. | 300 |
| Percent vacuum (atmosphere=1) | 1/3 |
| Piston pressure (adjusted to orifice diameter) | 18,000 |
| Percent open cell | 96 |
| Density, ounces per cubic foot | 3.5 |

EXAMPLE 42

| | Parts by wt. |
|---|---|
| 50% amorphous polypropylene with 50% isotactic polybutadiene | 100 |
| Butylene blowing agent | 125 |
| Additive: sodium dodecyl sulfate (surface active agent) | 10 |
| Secondary agent—Example 16 | 20 |
| Sodium silicate | .2 |
| Zone A melt temperature, °F. | 305 |
| Nozzle and stream temperature at point of dispersion, °F. | 265 |
| Percent vacuum (atmosphere=1) | Less than 1/8 |
| Piston pressure (adjusted to orifice diameter) | 12,000 |
| Percent open cell | 95 |
| Density, ounces per cubic foot | 4.5 |

EXAMPLE 43

| | Parts by wt. |
|---|---|
| 100% polyethylene, medium density | 100 |
| Propane blowing agent | 75 |
| Additive: Trialkoxy stearate | 15 |
| Secondary agent—Example 10 | 20 |
| Sodium silicate | .2 |
| Zone A melt temperature, °F. | 300 |
| Nozzle and stream temperature at point of dispersion, °F. | 265 |
| Percent vacuum (atmosphere=1) | 1 |
| Piston pressure (adjusted to orifice diameter) | 12,000 |
| Percent open cell | 96 |
| Density, ounces per cubic foot | 14 |

EXAMPLE 44

| | Parts by wt. |
|---|---|
| 100% polyethylene and ethylacrylate copolymer | 100 |
| Benzene blowing agent | 60 |
| Additive: Sodium lauryl sulphate | 5 |
| Secondary agent—Example 12 | 18 |
| Union Carbide Tergitol, Anionic 15-S-3A | .2 |
| Zone A melt temperature, °F. | 280 |
| Nozzle and stream temperature at point of dispersion, °F. | 260 |
| Percent vacuum (atmosphere=1) | Less than 1/8 |
| Piston pressure (adjusted to orifice diameter) | 20,000 |
| Percent open cell | 97 |
| Density, ounces per cubic foot | 5 |

EXAMPLE 45

| | Parts by wt. |
|---|---|
| Stereospecific isotactic polystyrene | 100 |
| Butane blowing agent | 40 |
| Secondary agent—Example 15 | 10 |
| Sodium silicate | 2 |
| Zone A melt temperature, °F. | 435 |
| Nozzle and stream temperature at point of dispersion, °F. | 390 |
| Percent vacuum (atmosphere=1) | Less than 1/8 |
| Piston pressure (adjusted to orifice diameter) | 25,000 |
| Percent open cell | 96 |
| Density, ounces per cubic foot | 4 |

EXAMPLE 46

| | Parts by wt. |
|---|---|
| Acrylonitrile-butadiene-styrene terpolymer | 100 |
| Propane blowing agent | 50 |
| Additive: Ethylenediamine tetraacetic acid | 8 |
| Secondary agent—Example 13—magnesium oxalate dihydrate | 12 |
| Tergitol 15-S-9 | .2 |
| Zone A melt temperature, °F. | 345 |
| Nozzle and stream at point of dispersion, °F. | 295 |
| Percent vacuum (atmosphere=1) | Less than 1/8 |
| Piston pressure (adjusted to orifice diameter) | 25,000 |
| Percent open cell | 96 |
| Density, ounces per cubic foot | 4 |

EXAMPLE 47

| | Parts by wt. |
|---|---|
| Type 6 nylon (polyamide) | 100 |
| 50% ethyl-benzoate (blowing agent), 50% Freon 11 (blowing agent) | 15 |
| Additive: Trialkoxy stearate | 2 |
| Secondary agent—Example 13—calcium chloride acetone | 15 |
| Tergitol 15-S-9 | .2 |
| Zone A melt temperature, °F. | 435 |
| Nozzle and stream temperature at point of dispersion, °F. | 390 |
| Percent vacuum (atmosphere=1) | Less than 1/8 |
| Piston pressure (adjusted to orifice diameter) | 20,000 |
| Percent open cell | 92 |
| Density, ounces per cubic foot | 5.5 |

EXAMPLE 48

| | Parts by wt. |
|---|---|
| Hydroxyalkyl-diamine cross-linked polyamide | 100 |
| 50% suberic acid octamethylene diamine, 50% Freon 11 (blowing agent) | 10 |
| Secondary agent—Example 13—magnesium sulfate-hepta-hydrate | 12 |
| Tergitol 15-S-9 | .5 |
| Zone A melt temperature, °F. | 510 |
| Nozzle and stream temperature at point of dispersion, °F. | 480 |
| Percent vacuum (atmosphere=1) | Less than 1/8 |
| Piston pressure (adjusted to orifice diameter) | 20,000 |
| Percent open cell | 95 |
| Density, ounces per cubic foot | 7 |

EXAMPLE 49

| | Parts by wt. |
|---|---|
| Cellulose acetate | 100 |
| Azobisformamide with 5% diethyl glycol (blowing agent) | 10 |
| Additive: Sodium lauryl sulphate | 2 |
| Secondary agent—Example 7 | 18 |
| Tergitol 15-S-9 | .5 |
| Zone A melt temperature, °F. | 320 |
| Nozzle and stream temperature at point of dispersion, °F. | 290 |
| Percent vacuum (atmosphere=1) | Less than 1/8 |
| Piston pressure (adjusted to orifice diameter) | 18,000 |
| Percent open cell | 96 |
| Density, ounces per cubic foot | 10 |

EXAMPLE 50

| | Parts by wt. |
|---|---|
| Vinyl chloride-acetate | 100 |
| Azodicarbonamide with 3% zinc oxide (blowing agent) | 18 |
| Additive: Trialkoxy stearate | 2 |
| Secondary agent—Example 8 | 18 |
| Tergitol 15-S-9 | .5 |
| Zone A melt temperature, °F. | 310 |
| Nozzle and stream temperature at point of dispersion, °F. | 290 |
| Percent vacuum (atmosphere=1) | Less than 1/8 |
| Piston pressure (adjusted to orifice diameter) | 15,000 |
| Percent open cell | 90 |
| Density, ounces per cubic foot | 22 |

EXAMPLE 51

| | Parts by wt. |
|---|---|
| Urethane elastomer (thermoplastic) | 100 |
| Azobisformamide with 10% diethylene glycol (blowing agent) | 35 |
| Additive: Trialkoxy stearate | 15 |
| Secondary agent—Example 10 | 15 |
| Tergitol 15-S-9 | .5 |
| Zone A melt temperature, °F. | 295 |
| Nozzle and stream temperature at point of dispersion, °F. | 275 |
| Percent vacuum (atmosphere=1) | Less than 1/8 |
| Piston pressure (adjusted to orifice diameter) | 25,000 |
| Percent open cell | 92 |
| Density, ounces per cubic foot | 6 |

EXAMPLE 52

| | Parts by wt. |
|---|---|
| 65% polytetrafluoroethylene and 35% styrene | 100 |
| 1,2-dichlorotetrafluorethane (blowing agent) | 40 |
| Additive: Sodium stearate | 10 |
| Secondary agent—Example 13—ammonium magnesium phosphate hexahydrate | 20 |
| Tergitol 15-S-9 | .5 |
| Zone A melt temperature, °F. | 325 |
| Nozzle and stream temperature at point of dispersion, °F. | 300 |
| Percent vacuum (atmosphere=1) | Less than 1/8 |
| Piston pressure (adjusted to orifice diameter) | 20,000 |
| Percent open cell | 94 |
| Density, ounces per cubic foot | 10.5 |

Procedure for the examples listed below is the same as that for Examples 40 to 52 preceding.

In addition to the examples preceding, which illustrate methods of preparing interconnecting cells in the very strong walls of thermoplastic cellular materials, we also utilize other means, as illustrated in the following examples for producing an open cellular structure.

EXAMPLE 68

| | Parts by wt. |
|---|---|
| 99% isotactic polypropylene | 100 |
| Propane blowing agent | 150 |
| Sodium lauryl sulphate | 5 |
| 92% azobisformamide, 8% cadmium 2-ethyl-hexoate (decomposition temperature —400° F.) | 15 |
| Tergitol 15-S-9 | .5 |
| Zone A melt temperature, °F. | 360 |
| Nozzle and stream temperature at point of dispersion, °F. | 290 |
| Percent vacuum (atmosphere=1) | Less than 1/8 |
| Piston pressure (adjusted to orifice diameter) after induction heating | 18,000 |
| Percent open cell | 94 |
| Density, ounces per cubic foot | 4.5 |

In the following example the solid material, cadmium 2-ethyl-hexoate, in combination with the azobisformamide, upon being blown with the polymer, lodged in the walls of the substantially closed cells of the polymeric material. The inductive cadmium 2-ethyl-hexoate permits heating by the deep penetration of induction heating at motor generator frequencies of 8000 c.p.s., though in the broadest aspects of the invention, any material which will not decompose at ejection temperature (which may be 200-600° F.), yet can be made to decompose by induction heating at temperatures above 600° F., can be used to substitute for azobisformamide. The cadmium 2-ethyl-hexoate used in the example, when heated inductively, assists the decomposition of the azobisformamide and leaves clear passageways between adjacent cells, so that the structure was almost completely interconnected. Any material which can be heated inductively can be substituted for the cadmium 2-ethyl-hexoate. Among those are the metals, iron, aluminum, magnesium, beryllium, zirconium, and alloys thereof; carbon, etc.; oxides, such as iron oxide, sodium nitrite, and numerous other materials. The decomposing material, such as azobisformamide, may range from 5–200% of the weight of the polymer, while the inductively heated material ranges from .1–20% by weight of the decomposing material, with 5–10% preferred.

EXAMPLE 69

|  | Parts by wt. |
|---|---|
| 50% isotactic and 50% amorphous polypropylene | 100 |
| Butane blowing agent | 125 |
| Ethylenediaminetetraacetic acid | 5 |
| 85% azodicarbonamide, 7% colloidal carbon, 8% iron oxide (decomposition temperature—450° F.) | 12 |
| Sodium silicate (water glass) | .8 |
| Zone A melt temperature, ° F. | 340 |
| Nozzle and stream temperature at point of dispersion, ° F. | 300 |
| Percent vacuum (atmosphere=1) | ⅓ |
| Piston pressure (adjusted to orifice diameter) | 18,000 |
| After induction heating at 5000 c.p.s., percent open cell | 92 |
| Density, ounces per cubic foot | 5.2 |

EXAMPLE 70

|  | Parts by wt. |
|---|---|
| 50% amorphous polypropylene, 50% polybutadiene | 100 |
| Butylene blowing agent | 115 |
| Sodium dodecyl sulfate | 5 |
| Commingled flake aluminum powder and sodium nitrite in 4 micron particle size | 15 |
| Zone A melt temperature, ° F. | 305 |
| Nozzle and stream temperature at point of dispersion, ° F. | 265 |
| Percent vacuum (atmosphere=1) | Less than ⅛ |
| Piston pressure (adjusted to orifice diameter) | 12,000 |
| After induction heating percent open cell | 94 |
| Density, ounces per cubic foot | 4.8 |

In the following example motor generator induction heating was utilized to heat to 700° F. aluminum particles, lodged in cellular walls in intimate contact with sodium nitrite. At this temperature there was combination of the aluminum with the oxygen of the sodium nitrite to form aluminum oxide and great exothermic heat.

In the above example, the exothermic heat of formation of the aluminum oxide produces, for about a millisecond, a flash of heat up to about 5500° F., which easily melts the polymer walls locally to leave holes forming the open cellular structure having passageways of a mean diameter of .01 inch.

The metals that may be substituted for aluminum are not limited, except that they must be able to combine exothermically. In addition to aluminum, magnesium, beryllium, zirconium, and alloys of these metals also combine rapidly with oxygen from any convenient source to yield the oxide and heat. Cerium and many rare earths and red phosphorus may also be used. While oxidizing agents such as sodium nitrate may be used, any other solid material source of oxygen is suitable, such as set forth in cols. 49–50 of this application. It should be understood, however, that it is not necessary to form an oxide to release the necessary heat from the reaction, and accordingly it can be stated that according to this invention, any solid material reactants can be used successfully which (a) are stable at the temperatures of formation of the closed cell structure, (b) include an inductive material, and (c) can be heated inductively to combine at least two of the reactants, one of which may be the inductive material, to form a compound with exothermic heat higher than 1000° F.

These reactants should be in small particle size of about 1–10 microns, with about .5 to 5 microns preferred. In such manner the opening to be melted into the cell wall can be controlled. The amounts of the reactants should be about 5–65% by weight of the polymer, with 10–30% preferred. The relative amounts of each reactant used depends upon the relative number of mols required to form one mole of the compound produced in the exothermic reaction.

It has also been found that open cellular thermoplastic material can be produced if a closed cell material is formed in which soluble materials are embedded within the cell walls. The soluble material and the solvents used may vary considerably; however, it can be stated that the soluble material must have (a) a particle size at least twice the thickness of the cell wall, so that there is a minimum of coverage of the particle by a thin film of plastic which would tend to insolubilize the particle; (b) a hardness and stability to retain its integrity and withstand the mechanical forces and temperatures to which the polymer is subjected; (c) complete compatibility with the polymer, and (d) a suitable solubility rate in a common solvent.

Suitable water soluble materials include sodium chloride, borates such as aluminum borate, starch, methyl cellulose, etc. These materials may be present in the amount of 18 to 300% per weight of the polymer, with about 75 to 175% preferred. Water heated to boiling is the most suitable to remove these particles within 1 to 20 hours. Mineral acids such as sulfuric acid may be added to the water for use as a solvent.

The following example is illustrative:

EXAMPLE 71

|  | Parts by wt. |
|---|---|
| 100% polyethylene, medium density | 100 |
| Propane blowing agent | 75 |
| Trialkoxy stearate | 8 |
| Regenerated cellulose powder, 2 micron particle size | 18 |
| Sodium silicate | .2 |
| Zone A melt temperature, ° F. | 300 |
| Nozzle and stream temperature at point of dispersion, ° F. | 265 |
| Percent vacuum (atmosphere=1) | 1 |
| Piston pressure (adjusted to orifice diameter) | 12,000 |
| After solvent action: open cell | 90 |
| Density, ounces per cubic foot | 14 |

The cellular material described above was submerged in solution of 70% sulfuric acid for a period of fifteen hours, with this solution circulated by a stream of nitrogen. The cellular material was then washed with fresh 70% acid followed by water. The cellulosic additive described above was found to have been removed, leaving an interconnecting cellular structure, soft and resilient, and highly fluid absorbent.

EXAMPLE 72

|  | Parts by wt. |
|---|---|
| 100% polyethylene and ethylene-ethyl acrylate copolymer | 100 |
| Benzene blowing agent | 60 |
| Sodium lauryl sulphate | 4 |
| Aluminum borate (2Al$_2$O$_3$·B$_2$O$_3$·3H$_2$O) | 18 |
| Tergitol, anionic 15–S–3A | .2 |
| Zone A melt temperature, ° F. | 280 |
| Nozzle and stream temperature at point of dispersion, ° F. | 260 |
| Percent vacuum (atmosphere=1) | Less than ⅛ |
| Piston pressure (adjusted to orifice diameter) after solvent action | 20,000 |
| After solvent action: percent open cell | 96 |
| Density, ounces per cubic foot | 5.8 |

The cellular material in the above axample was submerged in boiling water for a period of one hour and thirty minutes. This dissolved out boric acid from the aluminum borate residue.

INCREASING THE STEREOSPECIFICITY, CRYSTALLINITY, AND MOLECULAR WEIGHTS OF POLYMERS IN PREPARING THERMOPLASTIC CELLULAR MATERIALS

By the processes of this invention, the high mechanically induced pressure, generally exceeding 20,000 ft. lbs./min./lb. polymer, aided by the high energy levels contributed by the preferred hydrocarbon blowing agents, increase the molecular weight of the polymers used. As previously explained, at extreme high temperatures of the order of 9000° Kelvin, these energy levels, induced for very short periods of time when wave fronts intersect, cause partial ionization of the contained hydrocarbon gases in each formed but thermally unstable cell. Hence, dissociation of the hydrocarbons into free hydrogen and carbon with free electrons occurs for very short intervals of time. It is their necessary recombination with endothermic heat requirements which aids in stabilizing the cellular structure almost instantly. Also, these conditions of ionization appear to result in attachment of atoms of hydrogen and carbon to the polymer chains which are reached by these energy conditions. It has been found that when at least .5% by weight of the polymer is stereospecific and prepared into a cellular structure using at least 20,000 ft. lbs./min./lb. polymer and using secondary blowing agents to produce at least a temperature of 9000° K., any amorphous polymer present, at least in part, will be changed to crystalline form. Specifically, the following results are noted:

(1) Increase in molecular weight of the combined amorphous and crystalline polymers used initially.
(2) Crystal structure induced in amorphous polymers used initially.
(3) Extension of the stereospecificity or spatial order of the side chains along the axis of the main polymer chains.

The same polymers of the base material are thus given improved physical characteristics in the final cellular material by the mechanical forces used in these processes by themselves; or by the levels of ionization energy induced by wave front intersection when two-stage blowing agents are utilized; or by these two means used in combination, which is often the case.

In other words, low grade (amorphous) materials used as base materials to form these cellular products are transformed to comparatively high grade (crystalline) materials in the completed cellular products.

To further explain, because of the processes of this invention, mixtures of the beginning amorphous and crystalline polymers end as less amorphous and more crystalline than initially.

Or, beginning mixtures of comparatively low average molecular weight, or mixtures of polymers from different origins and of low quality, as represented by very low grade amorphous materials, appear in the final cellular product as uniform, high molecular weight polymers of improved quality and improved mechanical performance, which is, of course, reflected in the increased mechanical performance of the final cellular material.

The processes of polymerizing stereospecific polypropylene, with Ziegler-type catalysts, from alpha-olefines in the broad sense, and separating the polymerization product from other gaseous derivatives of ethylene such as butene-1, pentene-1, hexene-1, styrene, and so on by various stages of the usual fractionating processes is familiar to those in the art and is disclosed by U.S. Pat. No. 3,112,300, to Giullo Natta. The product polymerized from propylene is partially isotactic, syndotatic, stereoblock, or atactic, which descriptive terms are well known as representing relative spatial order or non-order of side chains as related to the main polymer axis. The preferred or highly crystalline portions of this polymerization product, to be usable in prior art, are isolated by dissolving out more soluble fractions with ether, boiling heptane, acetone, etc.

As illustrated in the foregoing examples of this invention, by utilizing isolated crystalline polypropylene, and isolated amorphous polypropylene; heating them so as to permit diluency of a wide range of preferred hydrocarbon blowing agents; and then processing them to make cellular material as described; we are really reestablishing conditions that existed early in the process of preparing the resin—that is, recombining amorphous and crystalline polypropylene, which previously required expense and effort to separate. Substantially, this is the phase just after polymerization by a solid phase Ziegler catalyst and its removal, leaving a wet polymerization product diluted by gaseous derivatives of ethylene. The hydrocarbon gases found when the polymers are manufactured, and which were previously thought necessary to remove, now have been found to serve as blowing agents in making our cellular material.

We have found that by tanking these mixtures of wet amorphous and crystalline polypropylene polymers and hydrocarbon gases under a high pressure head essentially as they are, without further processing or separation, or drying, or solvation, and by adding them to at least .5% stereospecific polymers, unless already present to aid in the dynamics of cell formation, excellent highly crystalline closed cellular material results because of the high pressure and high speed processes of this invention for preparing cellular material.

Since the molecular weight of polymers in the final cellular product is higher than the sum total of the average molecular weight of the additives and/or unsaturated hydrocarbon blowing agents, it is apparent these two ingredients undergo polymerization to some degree also. It is also observed that isotactic orders or spatial configurations of side chains along the main polymer axes are continued, even though the source of the added carbon and hydrogen groups was from amorphous fractions and unsaturated hydrocarbons in the wet gaseous derivative of ethylene.

It is believed that the reason for the continuation of stereospecificity is due to the ordered crystalline or lattice forming forces first induced by crystalline, solid-phase type Ziegler catalysts whose molecules forced the side chains of the olefin to present themselves in a specific geometric spatial pattern. Once stereospectific order and crystallinity is present in the polymer, the dynamic processes of high pressure and ionization of this process result in additional translations along the polymer chain with the same order as the established stereospecificity.

Herein, inherent "before and after" viscosity of the polymers was used as a measure of physical and chemical changes which took place from a point in time just prior to mixing to a point in time just after the completion of preparation of the cellular material. Molecular weights described are relative, and their purpose is to show relative decrease or increase within the stated processing limits. The techniques utilized for determining molecular weight are those based on inherent viscosity, using the Staudinger equation (molecular weight=$2.445 \times 10^4 \times$ inherent viscosity). These concepts are fully discussed in U.S. Pat. No. 2,825,721.

Translations of fractions of amorphous polymers "beginning" to crystalline polymers "ending" were determined by solvating out these fractions "before and after." These substantiated molecular weight determinations as reported. The stereospecificity of these translations is concluded from X-ray defraction data and computations from molecular weight derivations indicating this with a reasonable degree of certainty.

EXAMPLE 73

Apparatus utilized is that described in Example 40, with identical operation.

Materials and operating parameters of pressure and temperature include the following:

| | |
|---|---|
| 50% isotactic, parts by wt. | 50 |
| 50% amorphous polypropylene, parts by wt. | 50 |
| Melt temperature, ° F. | 350 |
| Pentane, parts by wt. | 100 |
| Tergitol 15–S–9 additive, parts by wt. | .5 |
| Two-stage blowing agent of Example 10, parts by wt. | 20 |
| Temperature at nozzle, ° F. | 305 |
| Piston pressure, p.s.i. | 21,000 |
| Resulting cellular material: | |
|    Open cell, percent | 97 |
|    Density, oz./cu. ft. | 3.5 |
| Beginning average molecular weight of polymers | 51,000 |
| Ending average molecular weight of polymers | 59,500 |

EXAMPLE 74

Procedure was same as that above, except that two-stage blowing agent was omitted and closed cell resulted.

Beginning polymeric material was composed of 50% amorphous polypropylene and 50% isotactic polypropylene collected from five different sources of origin and comprising 50% of the melt in equal parts.

Resulting cellular material:

Closed cell—96%
Density—3 oz./cu. ft.
Beginning average molecular weight of polymers—52,500
Ending average molecular weight of polymers—62,000

EXAMPLE 75

Procedure utilized was same as that described in Example 73, except that starting resin was reground material of various characteristics previously processed by polypropylene injection molding processes. It was combined with 50% amorphous polypropylene, so that mixture total 100 parts by weight of the mixture described in Example 73.

Resulting cellular material:

Open cell—95%
Density—3.8 oz./cu. ft.
Beginning average molecular weight of polymers—49,200
Ending average molecular weight of polymers—62,000

EXAMPLE 76

Procedure was the same as that utilized in Example 73, with the following exceptions:

Starting base material was 10% by weight of the 100 parts by weight mixture utilized in the formulation described in Example 73. This 10% was comprised of 98% isotactic polypropylene and 2% amorphous polypropylene.

The remaining 90% of the needed 100 parts by weight was composed of a wet propylene mixture which had been tanked under pressure directly from the polymerization column just after removal of the solid catalyst and substantially without any further processing to the wet mixture. It comprised, essentially, the following constitutent parts:

20 parts by weight of a polymerized isotactic fraction
25 parts by weight of a mixed stereoblock and syndiotactic fraction
35 parts by weight of an amorphous atactic fraction
20 parts by weight of wet propylene and other mixed ethylenic derived gases The quantity of pentane blowing agent utilized in Example 73 could have been omitted, but was reduced from 100 parts by weight to 50 parts by weight, because of the incorporation of hydrocarbon gases in the aforementioned wet mixture, by not having been separated out at the polymerization column. In accordance with the amounts previously stated, the primary or sole blowing agent should be about 2–350% of the weight of the polymer, all of which could be obtained from the incorporated gases which often are present in the amount of 60% by weight of the polymers utilized. The secondary agent, when used to form open cells, should be present in amounts from 1–100% of the polymer.

The cellular material resulting was of the same quality as that described throughout these examples and comprised 94% open cell, with a density of 2.9 ounces per cubic foot. It was light, tough, white in color, and soft and pleasant to the touch, like the surface of high grade absorbent cotton.

Beginning average molecular weight of the beginning resin, plus the wet propylene mixture, plus the mixed ethylenic derived gases, including unsaturated hydrocarbons, was calculated and determined as 41,500.

Ending average molecular weight of the polymers, comprising the material of construction of the completed cellular material, was 59,800.

CROSS LINKING OF POLYMERIC CHAINS IN THERMOPLASTIC CELLULAR MATERIAL

Preferred materials of this invention are highly crystalline stereospecific polymers. However, special applications for products indicate the usefulness of properties of elasticity and resiliency, which are beyond the basic ability of this low density material to resist deformation and to recover from applied stresses of tension and compression.

It has been found that a small percentage of the crystalline polymer contributes great proportionate strength to low density structures. Additionally, the incorporation of large fractions of the same polymer in amorphous form will yield better properties of elasticity and resiliency if cross linking of these amorphous polymers is accomplished.

Cross linking transforms the amorphous polymers into a non-crystalline three-dimensional network with a very drastic change in physical properties. These altered physical properties depend on the size of the loops which are the cross links of the polymeric structure. When the loops are large, as is accomplished by this invention, and the chains are flexible, rubber-like properties are produced in our cellular structure material.

The ready availability of combinations of amorphous and crystalline fractions make it unneccessary to break up crystal structure in order to form an elastomer. Thus, relatively small amounts of chlorination are required.

Sulfonyl chloride is well known in establishing crosslinks in solid polymeric materials, and it is competently described in U.S. Pats. 2,640,048; 2,212,786; and 2,405,-971. It is believed unknown in the prior art of thermoplastic cellular materials, however, because of the heat required to expand a resinous melt into a cellular product, both activates and degrades the highly reactive sulfonyl chloride. This activation and degradation takes place before the cellular product can be formed with loss of desired results in final cellular product.

British Pat. No. 939,778 achieves some resiliency on a limited scale with a laboratory procedure for mixing amorphous polymers with vulcanizable polymers and sulphur only. Vulcanizing is at a higher temperature than that at which the cellular material was formed, in a small, closed mold. Only closed cell structure is reported as related to the laboratory samples thus produced.

The use of peroxides such as dicumyl peroxides; 2,5-dimethyl-2,5-di (tert.-butylperoxy) hexane, and 2,5-di-(tert.-butylperoxy) hexyne-3 are known as cross-linking agents for olefins in the prior art, but these react before such expansion takes place and act largely as a counterforce to desired cellular expansion and severely limit the expansion of the cellular material. Therefore, efficient crosslink frequency is severely limited and objectives only partially achieved.

Within the concepts of this invention, cross-linking and cure is effected substantially after the completion of cell formation and thus very high crosslink density and high states of cure are achieved. The cellular material with flexible chains and large crosslink loops is snow white in color, very light, resists deformation or degradation from temperatures higher than those needed for washing, sterilizing with steam, or drying in household dryers, and is rubber-like in its mechanical properties.

It should be understood that this invention is not directed to a particular cross linking agent, nor in its broadest aspects should it be limited to sulfonyl chloride or materials which combine to form sulforyl chloride; but rather to any means of cross linking and vulcanizing polyolefins within the scope of this invention, where thermoplastic polymers are to be expanded into a cellular product. It is meant to include all previously known agents, including those which were reactive but were caused to degrade before the initiation of the cell formation process, thus limiting the attainment of objectives of cross linking in cellular products, regardless of range densities. The cross linking agents, such as sulfonyl chloride, chlorosulfonic acid, sulfur, and peroxides mentioned previously, should be present in amounts from 1 to 20% by weight of the polymer, with 1 to 3% preferred. When sulfonyl chloride is formed as the cross linking agent, the amount of available sulfonyl chloride should be at least 1% and up to 10% by weight of the polymer.

As will be apparent in the following examples, an objective is to provide at least 75 and preferably several hundred cross-linking sites along the polymeric chains of the amorphous polymers by fixing sulfonyl chloride groups to the chain at these points as reactive sites. Another objective is to keep sulfonyl chloride non-reactive until the cell formation process is largely completed. Another object is to provide .2–10% sulphur per weight of polymer and .1–10% chlorine per weight of polymer, so that they are available to form these reactive sites when needed. Another objective is to provide .1–5% metal oxides per weight of polymer, such as MgO, PbO, ZnO, which are sources of divalent metal ions, since they play a well known dual role in curing reactions in that they are both cross link agents and acid acceptors. In some instances accelerators, such as dipentamethylene thiuramtetrasulfide, are added, although they are not essential.

It will be recalled that this is a high speed process, as previously described, with two-stage blowing agents novel in this process and resulting in both ionization and temporary dissociation, with free electrons, of participating elements. Although periods of time are in microseconds only, these reactive elements recombine after dissociation, to form the sulfonyl chloride groups desired along the polymeric chains. Cross linkages and vulcanization to a rubber-like cellular material is thus accomplished at a high rate of speed and is carried to a satisfactory state of completion almost instantaneously, although periods of a few minutes are allowed for this, because this much time is required for the conveyor system utilized to move the cellular material out from the vacuum chamber in which it was prepred. In all instances where vulcanization is being accomplished, pressure in this vacuum chamber is raised to one-third atmosphere or more.

The apparatus used is that described in FIG. 6, and in every instance a modified form of our novel two-stage blowing agents is utilized to accomplish multiple purposes that will be apparent from the following examples:

EXAMPLE 77

Herein, 2 - chloro-1-methylbenzene (o-chlorotoluene) dissolved in benzene with the latter used as a blowing agent, is utilized as a source of chlorine available when required for crosslinking, but inactive until required for this purpose. This compound is highly suited to compatibility with the methyl groups along the propylene polymeric chain.

Also, in this example, sulphur, zinc oxide, and a solid blowing agent (azobisformamide) are combined and encapsulated with a sodium silicate encapsulating shell. As explained previously, these shells are the second stage of two-stage blowing agents, and they remain intact until completion of cell formation by the first stage of such two-stage systems. The shells then rupture at high speed, releasing their contents into the newly formed cells individually, cell by cell, for various designed purposes. In this instance it is to provide interconnecting cellular structure and also to release sulphur and zinc oxide for combination with the free chlorine ionized at the same time, thus providing reactive sulfonyl chloride groups, crosslinking, and vulcanization as desired.

In this example essential components utilized may be described as follows:

| | Parts by wt. |
|---|---|
| Stereospecific isotactic polypropylene | 5 |
| Amorphous polypropylene | 95 |
| Butane blowing agent | 75 |
| Benzene blowing agent | 60 |
| 2-chloro-1-methylbenzene [1] | 18 |

[1] Soluble in benzene and dissolved therein. Then mixture added to butane and combined mixture added to polymeric resin under 1500 p.s.i. of pressure, as in Example 40, Zone B.

The following materials comprised the second stage of the two-stage blowing agent system used herein:

| | Particle size, microns | Parts by weight |
|---|---|---|
| Sulphur | .25–.5 | .7 |
| Zinc oxide | .25–.5 | .5 |
| Azobisformamide | .5–.75 | 10 |

Substantially 4 particles of the above were encapsulated, as has been illustrated in a general way by previous examples of encapsulation, as discreet entities with two of the particles representing azobisformamide and one each representing sulphur and zinc oxide. The encapsulating shell was film-forming polyvinylmethylethermaleic anhydride copolymer. The art utilized was that disclosed in U.S. Pat. No. 3,041,298, which embraces the encapsulation of discreet and macromolecular size particles in desired combinations within encapsulating shells of film-forming polymeric materials.

Thereafter these shells were again encapsulated individually with inorganic sodium silicate to provide a gas impermeable shell around the minute capsules for the reason that polymeric membranes or films are gas permeable, the encapsulation being carried out as disclosed in Example 10 within this patent.

Thus, these especially prepared encapsulated materials were introduced into the butane-benzene blowing agent, as explained in description of FIG. 6 and as used in Example 40.

Temperature of melt was 305° F.
Temperature of melt at nozzle was 285° F.
Piston pressure was 18,000 p.s.i.
As throughout, vacuum chamber pressure equalled ⅓ atmosphere.

No vulcanization period was allowed, but when material was examined after approximately three minutes, it was highly resilient and rubber-like, indicating a high degree of effective cross linking in combination with good cell structure.

Density was 4.5 ounces per cubic foot
Cell structure was 70% open and 30% closed Hysteresis tests were conducted by compressing the material up to 50% for a period of five minutes at room temperature of approximately 72° F. Throughout these tests were carried out on an Instrom dynamometer, Instrom being a registered trademark.

Percent residual deformation was of the order of less than 1% under the above conditions and is considered too negligible to be of significance. The material indicated excellent dimensional stability at high temperatures and remained snow white in color after repeated washings and dryings on household laundering and drying equipment with commonly used detergents. These characteristics indicated usefulness as a bulk material for brassiere padding and so forth, wherein padding materials that cannot withstand dryer heat are commonly used, and must be removed before garments are laundered.

EXAMPLE 78

In this example hydrogen chloride was bubbled through an aqueous solution of methyl cellulose under ultra-violet light to effect photolysis. The quantity of methyl cellulose in solution is not critical and is conveniently adjusted to permit bubbling of the gas through the solution. After a period of 72 hours, the cellulose was centrifuged, heated, and dried to a fine white powder with a chlorine content of 18 parts by weight. With a mean particle size of .25 to .5 micron, encapsulation was effected in combination with p,p'-oxy-bis-(benzenesulphonylhydrazide) of approximately the same particle size. Encapsulation was as in Example 77 in the ratio of one particle of chlorine combined cellulose and three of benzenesulfonylhydrazide. After polymeric encapsulation, further encapsulation was effected with gas impermeable sodium silicate.

Thus, essential components may be described as follows:

| | Parts by wt. |
|---|---|
| Encapsulated chlorine and benzenesulphonylhydrazide | 15 |
| Isotactic polypropylene | 10 |
| Amorphous polypropylene | 90 |
| Butane blowing agent | 100 |
| Magnesium oxide | .5 |
| Sulphur | 1 |
| Depentamethylene thiuramtetrasulfide | 1 |

Pressures and temperatures utilized were the same as in Example 77.

Cellular structure was 80% interconnecting and 20% closed. Density was 5.2 ounces per cubic foot. Material was highly resilient and percent residual deformation was considered negligible under the same conditions described in Example 77.

EXAMPLE 79

In the subject example chlorosulfonic acid is utilized as the chlorosulfonating agent to effect the cross linking desired within the cellular material described herewith. This very corrosive liquid fumes in air, causes severe burns, and has a pungent odor, to illustrate its high reactivity in establishing cross link sites along the polymeric chain. Reduced to a powder by conventional laboratory methods, it must encapsulated by a film-forming polymer suspended in a solution other than water, as there is decomposition with explosive violence when it is dropped into water. In this instance particles of the order of .5 micron and less were dispersed in non-reactive protective oil, such as mineral oil, and these oil covered discreet particles after straining were then dispersed in an aqueous solution of polyvinylmethylethermaleic anhydride copolymer and were encapsulated by the procedures taught in U.S. Pat. 3,041,289 for the encapsulation of droplets of oil. Thereafter, as disclosed herein in Example 77, these minute capsules were made gas impermeable with sodium silicate, as done in the previous examples.

In any event, great care must be exercised with chlorosulfonic acid, because of its high reactivity, and these encapsulating procedures illustrate the usefulness and versatility of these methods, whether as taught in the afore-mentioned patent or as disclosed herein. In this instance the highly reactive chlorosulfonic acid was contained within its encapsulating shell, although in the form of droplets of microscopic size, and although dispersed within a resinous melt at a temperature of 305° F. The continuous pressure head of 1500 p.s.i. maintained, prevented rupture while the acid was at a high state of vibrational energy from the heat of the melt. With the release of pressure in accordance with the cell-forming process, the encapsulating shell ruptured as desired and the reactive sulfonyl chloride groups were released to establish cross linking sites along the polymer chains of the base resinous materials used herein.

In this example the following materials represent cross linking and vulcanization agents utilized and added directly to the melt. However, by these processes they were inactive until the cell-forming process was substantially completed, thus not restricting dynamics of processes which form cellular materials within the concepts of this invention.

| | Parts by wt. |
|---|---|
| Encapsulated chlorosulfonic acid (sulfuric chlorohydrin) | 4 |
| Isotactic polypropylene | 3 |
| Amorphous polypropylene | 97 |
| 50% benzene—50% propane blowing agent | 75 |
| Magnesia, MgO | 1 |
| Silica, $SiO_2$ | 2 |

The above material was prepared exactly as in Example 77 and resulting cellular material was 92% closed and 8% open or interconnecting cell. Density was 3.1 ounces per cubic foot, with excellent rubber-like properties strongly evidenced by the final cellular product.

EXAMPLE 80

Example 80 described herein was prepared and processed exactly as Example 77, with only distinguishing difference being the utilization of p-chlorotoluene (4-chloro-1-methylbenzene) in the amount of 18 parts by weight substituted for o-chlorotoluene, as utilized in Example 77, and dissolved in benzene as a means to keep it non-reactive until required for combination with released sulphur, to form sulfonyl chloride cross link sites along the amorphous polymer chains.

No discernible difference was noted between the rubber-like cellular product produced as a result of the ionization levels and resultant reactions from cross link and vulcanization agents induced in Example 77 under the parameters of this novel process for producing large cross sections of highly resilient rubber-like cellular materials, and between the parameters of this example utilizing 4-chloro-1-methylbenzene, indicating the conclusion that cross linking achieved almost throughout is at high levels of efficiency, as would also be true of vulcanization, in spite of the short periods of time allocated to the vulcanization process. Even with very short vulcanization periods, those of two minutes or less, results appear to be excellent.

The product of these examples possesses a minimum of 75 sites, having —$SOCl_2$ attached thereto for .5% of the polymer chains comprising the cellular structure.

(VI) CONTROLLED AND INTENDED DEGRADABILITY

Many articles prepared from the subject synthetic base cellular material are those of a sanitary and hygienic nature, such as represented by tampons, catamenial pads, toilet tissue. Unlike cellulose in chemical structure, although similar to cotton and cellulose light-weight tissues in appearance, it is an object of this invention that degradability of these articles, when discarded into sanitary systems, be accomplished by means other than dependence upon the feeding of aerobic bacteria contained within the activated sludge of municipal disposal systems and household septic tank systems.

The U.S. Public Health Service, Department of Sanitary Engineering, regards the maintenance of satisfactory oxygen levels, in both types of systems, as critical to the maintenance of adequate means of disposing of human waste, which is a problem essential to national health and well-being. These matters are competently described in the publication, Manual of Septic Tank Practice, published by the Public Health Service of the U.S. Department of Health, Education, and Welfare; Elements of Water Supply and Waste-Water Disposal, Fair and Geyer, John Wiley & Sons, Inc., 1961.

The necessary degradation of cellulose $(C_6H_{10}O_5)_n$, when discarded into such systems, requires the feeding of aerobic bacteria which are able to derive some needed oxygen from this feeding and are thus able to feed upon protein as a constituent of human waste, degrading this solid matter into sludge, as is essential in keeping up, even at minimum levels, with human waste disposability.

It is an important object of this invention to provide hygienic articles for better control of human waste and fluids, and that these articles, when disposed into sanitary systems, will supply oxygen thereto automatically, for the benefit of propagating growth of aerobic bacteria contained therein, thus maintaining high levels of activity adequate to the expeditious disposal of solid human waste by the feeding of these bacteria upon such human waste only, instead of requiring them to destroy, also the solid articles which have been introduced along with human waste.

The stereospecific isotactic polymers which are the preferred materials of the subject cellular material have the general formula, if desired:

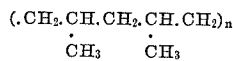

For example, oxidation occurs at the tertiary hydrogen atom—that hydrogen connected to the carbon atom which is also linked to the methyl side chain. Free radicals (R·) are formed. These react with oxygen to form peroxide radicals (ROO·). The peroxide radicals abstract hydrogen atoms from the polymer and form hydroperoxides (ROOH), and additional free radicals. The hydroperoxides decompose under the influence of certain metals to form carbonyl groups with corresponding chain scission.

We introduce very small amounts of oxygen initially, of the approximate order of .1% to .001%, but preferably of the order of .008% of the weight of the polymer, permitting auto-oxidation in these quantities at time of polymer formation. Thereafter further oxidation is restrained by the utilization of antioxidants, such as 2,6-ditertiary-butyl para cresol and dilaurylthiodipropionate in appropriate quantities which are usually below the order of .5% of polymer weight. These antioxidants are advantageous, because, when desired, it is possible to overcome their properties of preventing significant oxidation so that, as predetermined, the process of destructive oxidation will be resumed automatically when the hygienic and sanitary articles are discarded into the acid environment of sanitary systems, ordinarily in the range of pH 5.5 to 6.5.

This is accomplished by adding to the polymeric melts, prior to cell formation, various organic and inorganic oxidizing agents that are heat stable at the melt temperatures utilized, stability at temperatures about 425° F. usually being sufficient, except with special high polymers. Antioxidants and catalysts can be added at the same time.

Any oxidizing agent capable of losing electrons to the polymer, in the usually weakly acid environment of a sanitary system, may be utilized if heat stable at resin melt temperatures.

Agents that can be utilized are those such as sodium potassium dichromate, chlorate, perchlorate; copper salts; lead tetraacetate; oxide of silver, selenium, manganese, mercury, iron; heat stable hypochlorite; aromatic diacyl peroxides; ketone peroxides; diperoxyesters, and similar compounds prepared to be heat stable at processing temperatures at which utilized.

The quantities of such oxidizing agents utilized for this purpose may vary widely, extending from .001% to 8% of the weight of the polymer with which incorporated, considering the weight of the available oxygen contained within the oxidizing agent utilized. Usually, however, we find quantities of the order of .01% adequate.

With the discarding of these classes of sanitary articles into the weakly acid environments of the sanitary systems, there is oxidation reaction beyond the capabilities of the contained antioxidants, as designed, and the results of this oxidation, in combination with metals also contained as catalytic agents, results in the formation of the carbonyl groups described with the initiation of chain scission and polymer degradation.

Preferred metal ions utilized to catalyze these desired reactions are those of copper and iron and these can be supplied to the polymer, before formation of cellular structure, as cupric chloride, cuprous chloride, or ferrous sulfate. Again, quantities are not critical, and we utilize weight ranges, as compared to the polymer, from .1% to .001%, with .007% preferred usually. Also, other metal ions can be utilized to the same effect, and these may be found in the salts of lead, zinc, and silver, although ions of copper and iron are found to be perfectly satisfactory.

The oxidation process is, of course, an exothermic one which accelerates degradation, although speed here is not an essential matter. Periods of days or weeks for the achievement of degradation is not critical, and the utilization of even months is often preferred. By various adjustments, however, degradation into sludge, of our hydrocarbon based cellular material, with constant evolution of oxygen for the benefit of the aerobic bacteria within the sludge of such sanitary systems, can be effected from periods of days to those of several months duration. The duration of this period is considered unimportant.

It is noteworthy that the process of cellular material degradation into sludge is partially a mechanical one, involving shearing and torsional forces, because of the "memory" of the polymers of their original relative positions as regarding one another before being organized and order into lattice-forming positions within the cellular walls of the synthetic material. The material being largely open cell, there is extensive flooding of the cellular structure by the water of the sanitary systems (usually at a pH below 7) with disposal into these systems. The combination of chemical reaction, heat evolvement, relaxes lattice forming forces through the material on a molecular scale, necessarily, with chain scission.

With such relaxation, molecular insistence on returning to original relative positioning induces additional torsional twisting, and shearing forces, as mechanical forces, which wring the material on this molecular scale, thus accelerating and enhancing complete degradation into microscopically sized particles contained within the normal sludge and effluent of sanitary systems, whether privately owned household or public type septic tank systems.

The considerable quantities of oxygen introduced into these systems, automatically by these means, are very beneficial in maintaining high levels of activity by contained aerobic bacteria, with the advantage of more efficient and continuous digestion of protein-comprised products of human waste by these bacteria.

SURFACE ACTIVE AGENTS AID TO ABSORBENCY

The art of surfactancy is well known. However, within the parameters of our invention, new and novel applications are made. Reference is made to the following: Surface Chemistry, Theory and Industrial Applications, American Chemical Society Monograph Series No. 153, Reinhold Publishing Corporation, 1962, Lloyd I. Isiprow.

The source of the polar groups utilized in activating the surfaces of this structural material described may be from wide classes of available surface active agents, such as disclosed in "Surface Activity," by Moilliet, Collie & Black, edited by Bunbury, 2nd edition. Broadly, the surface activations include the nonionic surface activating agents, such as the sulphonic acids and their salts, such as alkyl naphthalene; sulphonic acids, such as the sodium salt of diisopropyl naphthalene sulphonic acid alkane sulphonates salts of sulphonic acids, which may be classed as (a) aliphatic sulphonates, (b) sulphonates of aliphatic-aromatic hydrocarbons, (c) ester sulphonates, (d) amide sulphonates, and (e) miscellaneous sulphonates. The aliphatic sulphonates are represented by the formula, $$RSO_3Na$$

wherein R may be a straight chain or bracket, saturated or unsaturated paraffin chain, or cyclo aliphatic radical, such as sodiumtetradecane sulphonate, sodium octadec-9-ene sulphonate, and sodiumethylcyclohexane-p-sulfonate.

Sulphonates of aliphatic-aromatic hydrocarbons, such as 1-chloronaphthalene - 5 - sulphonic acid, 1,3-dichlorobenzene sulphonic acid, and 3-phenyldodecane sulphonate.

The ester sulphonates, such as the sulphoethyl ester of oleic acid and sulphosuccinic diesters, the amide sulphonates, which contain a carboxyamide linkage, or the sulphonamide linkage interposed between a sulphonate group and the hydrophobia residue, such as the sodium salt of oleyl-N-methyltaurene.

Anionic surface activators, particularly the aliphatic sulfates, have been treated by Moilliet et al., on page 403, et seq., and include sodium docecyl sulfate, sodium cetyl sulfate and sodium-4-ethylheptyl-2-sulfate.

The cationic surface activating agents, on page 445, et seq., of Moilliet, include cetyltriethylammonium iodide, distearylethylenediamine.

The nonionic surface activating agents, on page 465, such as the ethyleneglycolpolyethers, such as the monostearic acid ester of triethyleneglycol.

It has been found that high energy levels can be induced on the surface of the basic structural material by the addition of compounds containing polar groups in quantities ranging from .1 to 100% and higher of the weight of the basic material utilized. Preferably, the range of the compound containing polar groups and utilized for these purposes should range from .5 to 20% of the weight of the polymers incorporated in the basic structural material.

Such polar-group containing compounds may be added to the basic structural material in various ways:

(1) Where they are heat stable or free from degradation at the temperatures of the thermoplastic polymer during processing they can simply be added to the polymeric mixtures and a satisfactory percentage of the polar groups desired will result on the surface of the basic structural material in the final form of the cellular articles being prepared.

(2) Surfactants that are attached to long hydrocarbon chains may, for convenience, be described as having a negative end at the location of the polar groups along the chain, and a positive end at the location of the hydrocarbon groups at the opposite end of the long chain structure described. With the addition of such surfactants to the polymeric melt, there is immersion of the long chain molecule within the mass of the hydrocarbon polymeric material comprising the walls of the cellular structure. Within periods of 18 hours or less, however, there is migration, or what might be called rejection, of the polar end of the long molecule to the surface of the hydrocarbon material, thus supplying the surface energy desired. At the same time, the hydrocarbon end of the long molecule remains within the polymeric mass, just below the surface of the walls comprising the cellular structure.

(3) Another convenient means of addition is suspension in an aqueous solution which is then utilized to flood the cellular structure by compressing the structure mechanically, displacing air, and then letting it re-expand so that the aqueous mixture is forced into the cellular voids. With drying and evaporation of the aqueous portion of the mixture under vaccum, the surfactant remains as a coating upon the surface of the cellular walls.

(4) When desired, the surfactant may be made a part of the water of crystallization of sodium silicates and are thus deposited upon the cellular walls with great force, and are thus impinged, when such crystals are heated under pressure, and pressure is then released suddenly, as has been disclosed in the foregoing description of novel two-stage blowing agents. Also, these surfactants may be encapsulated by various means described herein, and similarly deposited upon the cellular wall surfaces with release of restraining pressures.

Thus, many convenient and novel means are available to supply polar molecules, with strong electromagnetic fields, upon the wall surfaces of the subject cellular material, so that there is rapid and efficient absorption of polar fluids, merely with impingement and contact, and without mechanical force or change in physical properties of the fluid absorbing matrix, or loss in strength when wet rather than dry.

ABSORBENCY

The most common variety of material utilized to absorb body fluids and household aqueous solutions is some form of woven or unwoven fabric, usually of cellulosic origin. The utilization of carded cotton fibers as an absorbent matrix ranges from use as surgical dressings to catamenial pads and tampons, and along with woven fabrics have a time honored position as absorbents. More recently cellulosics other than cotton fibers have been utilized as aiding in the absorption af aqueous body fluids. However, cellulosic materials are the prevalent ones now in use, and of this type, cotton and wood fibers are the most commonly noted in absorbent materials. Carded cotton fibers and wood fibers are well known as the absorbent medium in sanitary articles for the absorption of water, fluids, and especially body fluids which may comprise protein complexes as in menstrual fluid and blood. These untwisted cotton fibers are comprised of cellulose and contain an abundance of highly polar bonds which are a part of the internal structure of the fiber itself. In carded cotton articles the structural shape of the adsorbent matrix is dependent upon the stiffness of the dry fibers. Linters or short length fibers are merely commingled and this basically comprises the adsorptive structure of the carded cellulose fibers comprising catamenial articles.

When such a mass of fibers adsorbs a body fluid, such as menstrual fluid, there is no absorption of fluid within the mass of the fibers. Instead, there is a combination of the fluid with the hydroxyl groups of each fibril which is twisted with other fibrils to comprise one short fiber. Setting aside one fiber as an example, we have the following factors which are relevant. The impinged fluid may be said to move between the short fibrils as a product of its surface tension. The principal result of the fluid movement into the fibrils is that the fluid causes the fiber to swell and thus change its structural shape. With the swelling there is untwisting and loss of the structural form of the one subject fiber. With this process repeated in all the neighboring fibers as occurs when such a mass of fibers is used to absorb body fluids, there is a resulting deterioration of the dry structure with localized viscous pooling of loose floating fibers. This leads to "rolling and bunching" of fibers which further distort the wet article from its former dry structural form. Such saturation, with resulting loss of structural properties and poor fluid distribution, is common with cellulosic catamenial articles.

Absorbent woven fibers, although an improvement due to structural strength and form, attain this advantage at relatively great expense. Nevertheless, the comparatively inefficient absorption of the individual fibers involved, since they must swell by actual incorporation of fluid into the body of the fiber, makes the woven fibrous article essentially inefficient when compared to total volume of fiber material and the economic problems involved in such large mass. Also, as in any fibrous material, the breaking off or loss of fibers often leads to living tissue irritation, if the particular article is concerned with sensitive mucuous membranes, or if the fibrous article is used within the body spaces or body cavities.

Our subject absorbent synthetic cellular material is cotton-like in its snow-white appearance, its soft feel, and other similar characteristics, as compared to high quality absorbent cotton. At the same time, it is a highly efficient absorbent matrix without the loss of structural form in wet strength, which is the true standard of utility and purpose.

Composed of very small interconnecting cells with flat walls shared mutually with adjoining cells, these walls are very thin, of the order of a few hundredth thousandths of an inch, thus there is little mass to interfere with the volume of fluid capable of being absorbed without mechanical force, such as squeezing and then permitting expansion, which is not practicable with many absorbent articles of a sanitary nature. Intrinsically, the structural mass of the material is largely composed of methyl groups of very low surface free energy, of the order of 21 dynes per square centimeter, so that there is no practical wetting or combination with fluids to effect a decrease of wet strength over dry strength when the cellular structure loads itself, throughout its volume, with water and body fluids, i.e., menstrual fluid and blood.

The science of contact angles between liquids and solid surfaces is well known, as is the science of contact angle hysteresis. It is known that rise of liquids depends upon the contact angle and the curvature or diameter of the tube-like reservoirs within the cellular material which, in this instance, is very small and being in very large number and interconnected so that, as one is filled, fluid flows to an empty reservoir. It is also apparent that such interconnection provides for displacement of air as these reservoirs are filled with fluid, without mechanical force, and independently of forces of gravity.

Herein the combination of high wet strength and equivalency with dry strength is achieved by the addition of surface-active molecules on the surface of the walls comprising the polygonal flat sides of the individual cells of the subject synthetic cellular material. These surface-active molecules are characterized by the presence of both polar and non-polar groups.

The polar or active portion of the molecule is surrounded by a strong electro-magnetic field and exhibits a high affinity for other polar groups such as those in water, body fluids, blood, etc. Thus, by the introduction of such molecules, the surface of the synthetic material described herein is caused to have high orders of surface energy, resulting in impinged fluids being drawn into the cellular reservoirs at a rapid rate, distributed throughout any open reservoirs within the cellular material and held in place therein by agents described hereinafter.

DISPOSABILITY

The inability to dispose of soiled cellulosic catamenial pads via a conventional water closet or commode is a source of inconvenience for menstruating women. The problem of disposability of the cellulosic pads is due to these articles having an average mean specific gravity of the order of 1.25 and higher, which, of course, causes the articles to sink in the waste water of a water closet. The modern sanitary conveniences or water closets commodes, as found in the United States, have waste water passageways leading from the commode ranging in diameter from 1⅞ inches to 2⅝ inches, the more common being approximately 2½ inches in diameter.

If such saturated fibrous article should pass the commode trap, in spite of its bulky mass being one-fourth times heavier than water, the chance of its blocking up some aspect of the gravity run-off sewage disposal line is highly probable. It is therefore not feasible to dispose of cellulosic fibrous catamenial pads via commode and existing sewage systems.

By contrast, the catamenial pads prepared from our absorbent subject synthetic materials are of very high adsorbency and much more efficient in fluid loading, making possible a pad which allows for increased utilization of physiologic and anatomic principles, especially concerning body movement and posture change. Catamenial pads made of our cellular material do not require great bulk to absorb and retain a large amount of fluid, as compared to catamenial articles as they are known under the prior art. The specific gravity of the base material comprising the walls of the interconnecting cell structure, from which these pads are made, has a specific gravity less than 1.0. This is compared to 1.25 or more in the cellulosic pads. Additionally, for example, between five and seven percent of the cells in the synthetic pad are closed by intention. This allows for a specific gravity of the articles as a whole as being somewhat less than .70, and even with complete and total saturation, whether by absorbed body fluids or by closet waste water, there is always positive flotation. Furthermore, diameters of these articles are always less than that of the sewage disposal passageways. Thus, articles are expeditiously carried through the sanitary disposal systems, on even minimum downgrade run-offs, as is commonly noted in sewage disposal systems of large cities.

GEL-FORMING AGENTS FOR ABORBENT CELLULAR STRUCTURES

An object of this disclosure is to provide absorbent cellular structures into which impinged fluids are drawn and maintained. The maintenance of the fluid, within the absorbent structure, is best effected through various thixotropic agents which have been impinged as particles throughout the walls of the cellular structures. The thixotropic agents form lattice-like gel forming bonds throughout the absorbed fluids.

As an example, gel-forming agents are added to the resinous mixture, by compounding, before cell formation, so that they appear as discreet particles in the cellular walls which can be readily contacted by fluids being absorbed, and gels thus produced. The quantities of these materials utilized may range from 1% to 100% of the weight of the base polymer; however, weights of 5 to 10% are preferred.

As examples of the gel-forming materials that can be used, the following are representative, but by no means should be considered limiting:

(1) gelatinized starch
(2) gelatin
(3) agar-agar
(4) clays, such as hydrated silicate of alumina attapulgite, and the like
(5) silicate gel
(6) fatty acid soaps, such as the alkali salts of aliphatic acids having preferably at least 8 carbon atoms, such as sodium palmitate and sodium stearate
(7) polyvinyl alcohol
(8) carboxy methyl cellulose
(9) carboxy vinyl polymer Since the catamenial articles and the diaper described herein are both basically absorbent reservoirs for body fluids, much of the technology involving thixotropics, bacteriostatics, deodorants, and surfactants is the same for these various articles, with slight modification.

Ammonia dermatitis, well known as common diaper rash of infants and babies, is the result of bacteria breaking urea into ammonia, the free ammonia then causing the troublesome and painful ammonia dermatitis. The use of thixotropics and bacteriostatics to bind the urine in the enclosed spaces of our absorbent material, while at the same time preventing bacterial growth, controls such breakdown and free ammonia production.

Many of the articles described herein are to be used in intimate contact with human tissues, especially the skin and mucous membranes of the body. The base polymers used in our cellular material have had prior in vivo testing when used as suture material within the human body, and demonstrates such non-reactive tissue response that it is recommended and is now in usage within the body as an unabsorbable suture material. (Reference: JAMA 1962, March 10, page 782).

CATAMENIAL ABSORBENT PADS.—EXAMPLE 81

A polymerization product of propylene, comprising 50% amorphous and 50% stereospecific isotactic polypropylene, was allowed to oxidize in the polymerization column to an extent representing .005 part by weight of oxygen, as compared to the weight of the polymer, both amorphous and isotactic. Antioxidant 4,4'-butylidenebis (3-methyl-6-t-butylphenol) was then added in the proportion of .09 part by weight of the combined polymers.

The above product then comprised 100 parts by weight of the following resinous mixture, plus additives:

| | Parts by wt. |
|---|---|
| Product as described above | 100 |
| Butane blowing agent | 150 |
| Second stage blowing agent as in Example 7 | 20 |
| Sodium dichromate (oxidizing agent) | .1 |
| Sodium dodecyl sulfate (wetting agent) | 10 |
| Cupric chloride (degrading catalyst) | .001 |
| Tergitol 15–S–9 (optional) | .5 |
| Hexachlorophene (deodorizer—optional) | .25 |
| Gelatinized starch (3–5 micron particle size) (thixotropic agent desirable, but not essential) | 4 |

The above mixture was processed at a beginning temperature of 340° F. and at an ending temperature of 300° F., as has been previously described in the utilization of the apparatus described in FIG. 6. The cellular product resulting was of a large rectangular cross section comprised of surface-active, interconnected cells approximately .02 inch in diameter. Surface activity of the cellular walls as related to the absorption of polar substances was the equivalent of 58 dynes per square centimeter of wall surface.

This cellular product is snow-white in color, resilient, and soft to touch and feel—not unlike high quality absorbent cotton in bulk form. The large cross section of cellular material described was cut, by band saw, into rectangular profiles approximately (15–18 ins.) long and 1½ inches in width. The profiles were ⅝ inch thick in the middle and tapered to ⅛ inch in thickness at the ends. Although light in weight, the material was very strong in tensile strength. Density was determined as 3.9 ounces per cubic foot for the bulk material of this example.

After preparation of the rectangular profiles from the cellular materials as described above, the thixotropic agents utilized may be added by various methods. For example, the thixotropics may be added by a flotation method similar in nature to that in which the primary surfactant has previously been placed in the cellular material, as described. The profiles are thus placed in a thin layer of thixotropic agent solution so as to fill the desired portion of cells with more hydroscopic gel material than the top portion of cells in the rectangular cellular profiles. We have found that this increases the drive of the impinged catamenial fluid to the bottom portion of these cellular receptacles after they are formed into catamenial articles. The effect is enhanced by the selection of viscous gel agents, which gradually spread toward the surface as the catamenial article is loaded with fluid. Vacuum drying is useful in efficiently loading these absorbent articles with these agents.

A light textured sheet metal die, of approximately rectangular shape and elongated for tabs at either end, was formed to transform these bulk profiles into a smooth, anatomical shape, comfortably fitting the vulvo-vaginal area, so that these catamenial articles can be worn comfortably without protruding. The die was heated to 750° F. and was brought down upon the profile described, so that the material of the exterior cells, contacting the heated die, were returned to thermoplasticity and caused to flow. This formed a soft but tough, fabric-textured and impermeable skin surrounding the absorbent bulk of the article on the non-absorbent sides of the smooth anatomically shaped article produced.

Thus, in one operation the entire catamenial article was formed, including texturing of the exterior, and sealing desired surface sides into a soft and pleasing textile pattern. The thin tabs at the extremities of the article also have a fabric-like pattern, with an excellent tensile strength exceeding 4500 p.s.i., thus providing secure support from belts.

The articles thus prepared have wet strength and wet form indistinguishable from the dry article. The face of the absorbent side of the article, over which a skin had not been formed, intentionally, was treated by electrical corona discharge to provide a highly polar, but very gentle and non-irritating surface in any contact with human tissue.

By contrast with catamenial articles of the prior art, made with short wood fibers or cotton fibers as the absorbent matrix, and which reveal saturation, flooding, and disintegration when less than 25% of absorbent volume provided is utilized, the subject article prepared by this example absorbed, immediately upon impingement, menstrual fluid in a quantity equal to more than 85% of the total volume of the article without any perceptive change in the strength or structural shape, or physical characteristics of the article. With the rapid drawing of the polar constituted menstrual fluid into the interior area of the article, contact with the particles of gelatinized starch impinged upon the cellular walls therein, caused thixotropic swelling of these particles, thus binding the fluid into the lattice of such gel-forming agents.

When loaded with menstrual fluid, the catamenial article was ready to be discarded as is customary, and for this purpose it was rolled into a cylinder 1¼ inches in thickness and 1½ inches long and restrained in that shape by an incorporated band which easily fits around the rolled pad, holding it to the dimensions described. The pad was dropped into a standard commode and flushed down the waste water passageway, through the soil lines, and into the sewage disposal phase of a municipal sewage ssytem. As previously described in detail, these articles are degradable in such sewage systems.

EXAMPLE 82

A catamenial absorbent article was prepared from the same base materials as in Example 81, with the exception that the resins utilized comprised 20% polypropylene and 80% polypropylene and 80% polyethylene polyallomer. The above product then comprised 100 parts by weight, including the proportions of oxygen and antioxidant described in Example 81 of the following mixture of resins and additives:

| | Parts by wt. |
|---|---|
| Product described above | 100 |
| Butane primary blowing agent | 50 |
| Second stage blowing agent as in Example 8 | 15 |
| Sodium nitrite (oxidizer) | .4 |
| Trialkoxy stearate (surfactant) | 8 |
| Ferrous sulfate (catalyst) | .002 |
| Potassium metasilicate (optional) | 1.5 |
| Tergitol 15–S–9 (optional) | .2 |
| Methylcellulose powder (thixotropic agent) | 8 |
| Hexachlorophene (deodorizer—optional) | .25 |

The above mixture was formed into our cellular material at a beginning temperature of 335° F. and an ending temperature of 295° F. The cellular product resulting was very similar to that of Example 81 and demonstrated a capacity to absorb, 92% of its volume in menstrual fluid, and to capture and hold the fluid with thixotropic thickening as previously described. The article was also commode disposable and self-degradable in either septic tanks or public sanitary systems.

EXAMPLE 83

The catamenial article described herein was prepared exactly as the article described in Example 82 preceding.

Difference is that trialkoxy stearate was omitted from the formulation, as was the methylcellulose described in that example.

After preparation of rectangular profiles from our cellular material, as has been previously described, the profile was floated in a saturated solution of calcium stearate and methylcellulose in the same parts by weight, so as to flood interconnecting cells with this mixture of surfactant and thixotropic agent. Articles were then dried in a vacuum chamber, at a pressure below the vapor pressure of water, with the result that the surfactant and thixotropic agent were deposited upon the interior walls of the interconnecting cells of the cellular structure. The die was placed over the sides of the profile that will constitute the fluid impermeable surfaces of the article. The exterior absorbent surface of the catamenial article was then treated with electrical corona discharge and the article was found to be highly effective in absorbing and holding impinged menstrual fluids.

Article was commode disposable and degradable in sanitary systems, as described in examples preceding.

CATAMENIAL ABSORBENT TAMPONS.—
EXAMPLE 84

Generally, we find that these extreme low density cellular materials, prepared from hydrocarbon derived polymers with an ordered stereospecific structure making up at least a small part of the polymers, advantageously replace absorbent matrices of wood fibers and short length cotton fibers commonly utilized in catamenial absorbent articles under the prior art. These synthetic materials which we have prepared are white in color, soft and resilient, and are without loose fibers of any kind. The extreme softness and lack of loose fibers in such articles is very much desired, as fibers separate or break off from the body of the catamenial products of the prior art and are thus a source of tissue irritation.

It is of basic importance to the utility of the article that the absorptive capacity for menstrual fluids be effective and represent a significant portion, in actual use, of the cubical mass of the absorbent article. This is of special importance with vaginal tampons, as they are small in size for insertion within the vagina.

In the past such articles were made of compressed fibers and result in a hard, rigid, and dry object which is inserted into the vagina. On contact with fluids, it does not expand to increase absorptive volume. Quite the contrary, as fibers become wet and lose dry strength, they also lose all structure, and the surrounding anatomical structures within the vagina compress such articles into soggy, shapeless masses, smaller in volumetric dimension than when dry.

We have found that tampons, prepared either from fibers of wood cellulose or cotton, give this poor result, when utilized in such articles as an absorbent matrix, since they are only capable of holding less than 40% of their volumetric capacity in menstrual fluids. Even at this level they are far past the point requiring discarding and replacement for hygienic reasons, as they are soggy masses of loose fibers. Under such conditions the incorporation of deodorants onto the surface of such fibers, as practiced under the prior art, is of little effect.

From the cellular material described in Example 81, tampon-shaped absorbent articles were machine-cut into cylinders approximately $7/16$ inch in diameter and 2 inches long. Additionally, the lower end of the cylindrical shapes had affixed thereto 2½ inches of the same cellular material cut into a profile ¼ inch by ¼ inch. By the use of a heated die, this was compressed into a soft, flexible withdrawal ribbon ¼ inch wide and .006 inch thick, thus strongly attached to the tampon and an integral part thereof, unlike the tied strings used for withdrawal under the prior art.

Being soft and flexible and presenting a gentle surface to the tissue within the vagina, necessary rigidity for insertion is provided by forming a $3/32$ inch semi-rigid core, provided by a hole up the middle of ¾ of the tampon. This is accomplished by heating to 700° F. a $3/32$ inch rod used to form this core. The formation of the described hole provides a skin, from the thermoplastic polymer, with semi-rigid properties, so the tampon may be inserted by the fingers only. Or, if so desired, the tampon may be slipped over an insertion device which fits into the hollow core described, and thus the tampon can be comfortably positioned.

After insertion, it has been found that the tampons of this example absorb, without impairment of their structure, as much as 90% or more of their cubical volume in menstrual fluid. Further, upon impingement, even when flowing intermittently, as is true with menstrual flow, there is relatively total freedom from odor by reason of containment of the fluid inside the cellular structure, rather than being spread over the surface of the tampon, as with fibrous articles. Also, the gelation from the contained thixotropic agents, as has been described, minimizes the hazard of odor or fluid emission from accidental pressure.

Unlike saturated fibrous articles, the subject tampon in place within the vagina presents a gentle and yielding, but resistant, face to the mucous membrane of the vagina for effective absorption. Upon withdrawal of the tampon by means of the ribbon described, the tampon, although containing large amounts of menstrual fluid, presents an essentially unstained and white surface.

All the articles of this example are commode disposable and self-degradable with the release of free oxygen, for the benefit of aerobic bacteria within either public or private sewage disposal systems.

EXAMPLE 85

As disclosed in Example 84 and by the same procedures, the following materials, in the combinations described, were utilized in preparing a bulk quantity of absorbent, cotton-like, disposable and self-degradable material for conversion into catamenial tampons:

50% amorphous polypropylene
50% stereospecific isotactic polystyrene
.009% of the weight of the above as combined oxygen
.04% of the weight of the above as 4,4′-butylidene-bis-(3-methyl-6-butylphenol)

| | Parts by wt. |
|---|---|
| As described above | 100 |
| 65% butane primary blowing agent, 35% propane primary blowing agent | 60 |
| Second stage blowing agent as in Example 12 | 30 |
| Potassium perchlorate | .9 |
| Sodium lauryl sulfate | 8 |
| Cuprous chloride | .09 |
| Sodium silicate (waterglass) | .2 |
| Tergitol 15–S–9 | .5 |
| Carboxy methyl cellulose powder (containing 10 parts by weight methyl benzethonium chloride) | 4 |

The large cross section of bulk material resulting from the utilization of the apparatus described in FIG. 6 was cut, by smooth edge bandsaw, into profiles approximating the 4½ inch long profile, including withdrawal ribbon, of the catamenial tampon described. A hot metal die, similar to that utilized in previous examples, was closed over the profile of the cellular material and it was thus quickly formed into a cylindrical tampon with attached ribbon, as the previous example. The skin covering the cylindrical portion of the tampon was removed by mechanical abrasion and the core, previously described, was made in the same manner.

The exterior absorbent surface of the tampon was treated by electrical corona discharge and the resulting article was found to be an excellent one, produced at low cost and high speed, and highly efficient in the control, by absorption, of menstrual fluid. This article is commode disposable and self-degradable, as before.

EXAMPLE 86

The catamenial tampon prepared in the subject example is identical to that of Example 85 preceding. Differences are the substituted use of equivalent weights of 98% isotactic polypropylene and 2% amorphous polypropylene for the base resins utilized in that example. The resulting cellular material is one of very high strength, although of low density, of the order of 2.2 ounces per cubic foot. This material was fabricated into catamenial tampons by the methods described in Example 84.

TOILET TISSUE.—EXAMPLE 87

By utilization of the following materials, as described, and processed by the apparatus of FIG. 6, a large quantity of bulk cellular material was prepared at the high speed characteristic of this process:

98% stereospecific isotactic polypropylene
2% amorphous polypropylene
.006% of the weight of the above as combined oxygen
.05% of the weight of the above as 4,4'-butylidene-bis-(3-methyl-6-butylphenol)

| | Parts by wt. |
|---|---|
| As described above | 100 |
| Butane primary blowing agent | 175 |
| Second stage blowing agent as in Example 10 | 35 |
| Potassium perchlorate | 1.5 |
| Sodium lauryl sulfate | 6 |
| Cuprous chloride | .06 |
| Tergitol 15-S-9 | .4 |

The subject material was prepared at a beginning temperature of 355° F. and an ending temperature of 295° F., with expansion into the 6-foot wide and 18 inch thick cross section produced by this apparatus. The 140-foot long sample, produced as described, was composed of very small interconnecting cells, with a cellular wall thickness of .00001 inch and a weight, or density, of .8 ounce a cubic foot. Material was soft, resilient, flexible, and white in color, in addition to being absorbent with no impairment in wet strength as compared to dry strength.

The bulk material was cut by smooth edge bandsaw into 1/16 inch thick sheets and cold rolled, under high pressure, by a series of 6 embossing rollers which imparted a fine textured, waffle-like pattern to both surfaces of the material, now .0059 inch in thickness in between the raised areas of the waffle pattern.

Our thin tissue material, thus prepared, is now of high tensile strength; hence, it was die-cut substantially through its cross section, at intervals of 4½ inches, and the wound 6 foot wide rolls were then cut into rolls of tissue 4½ inches wide. This non-cellulosic tissue showed a weight by weight comparison with cellulosic tissue of the order of 50% less. Dry strength tensile values were ten times as great, and wet strength values fifty-two times as great.

The tissue thus prepared was disposed of in the waste water bowls of standard sanitary commodes, wherein it floated as compared to cellulosic tissues commonly water saturated, thus obviating the possibility of waste line clogging from saturated accumulations of tissues as so often occurs. With transport through soil lines by waste water, as is common practice, self-degradation occurred in sewage disposal systems with release of free oxygen to the benefit of aerobic bacteria in such systems.

EXAMPLE 88

The toilet tissue prepared in this example was identical to that of Example 87 preceding, with the exception that additive colors were dry blended with the resinous materials to obtain the novelty effect of color in our toilet tissue.

In this example two layers of tissue, prepared in thicknesses of .0033 inch each, were laminated to each other by dielectric heating, so that bonds presented a diagonal pattern with 1½ inch square areas between the bonds nonlaminated. Or, to explain more fully, the sandwich construction described consisted of repeating areas 1½ inch square, wherein a void of this diameter existed between the sheets in contact with each other.

Additionally, the surfaces of the double layer of colored tissue thus prepared was treated mechanically to raise the fibrils of microscopic size upon the surface of the tissue, by abrasion at high speed. The resulting product then presented a surface of extraordinary softness and non-irritability, which resembled a soft, fur-like surface, although on a microscopic scale, of the tissue thus prepared.

The product of this example was deemed to be one of excellent quality, absorbency, and utility, although of extremely low cost.

EXAMPLE 89

The tissue prepared in the example described herein utilized the following materials and the processes described in Example 87:

10% stereospecific isotactic polypropylene
30% medium density polyethylene
20% isotactic polystyrene
30% amorphous polystyrene
10% high density polyethylene
.002% of the weight of the above as combined oxygen
.06% of the weight of the above as antioxidant 4,4'-butylidene-bis(3-methyl-6-butylphenol)

| | Parts by wt. |
|---|---|
| As described above | 100 |
| 30% butane primary blowing agent, 70% 1,2-dichlorotetrafluorethane primary blowing agent | 85 |
| Second stage blowing agent as in Example 8 | 40 |
| Sodium chlorate | .3 |
| Calcium stearate | 2 |
| Cuprous chloride | .02 |
| Potassium metasilicate | .2 |
| Sodium silicate | .2 |
| Colloidal silica | .05 |

The bulk stock prepared on the apparatus of FIG. 6 was formed at a piston pressure of 25,000 p.s.i. and resulting product had a density of .79 ounce per cubic foot. The resulting material in bulk form was soft and white. It was prepared into tissue as illustrated in Example 87 preceding.

HOUSEHOLD TISSUE.—EXAMPLE 90

It is readily apparent to those skilled in the art that the hydrocarbon based toilet tissues previously described contain parameters which, when simplified, are equally applicable to the preparation of household tissues and hygienic tissues comparable to the cellulosic tissues familiarly known as facial tissues.

By utilization of the following materials only, processed by the apparatus of FIG. 6, household tissues are prepared in this example:

| | Parts by wt. |
|---|---|
| 50% stereospecific isotactic polypropylene, 50% amorphous polypropylene | 100 |
| Butane primary blowing agent | 100 |
| Second stage blowing agent as in Example 7 | 40 |
| Sodium lauryl sulfate | 4 |
| Tergitol 15-S-9 | .4 |
| Colloidal silica | .09 |

In this example piston pressure utilized is 25,000 p.s.i. and beginning and ending processing temperatures are 350° F. and 290° F. Resulting product has very thin cellular walls by the process of this invention, which included preparation of the cellular material in a vacuum in order to achieve extreme low densities; herein, .65 ounce per cubic foot. The basic purpose of these extreme low densities is to achieve thin cellular structure with these strong basic materials, so that they can be prepared into very light and absorptive tissues after suitable cold rolling.

The use of colloidal silica is optional and is used as a surfacing material for the paper. By initial dispesrion, some of the silica appears on the surface of the tissue product. When used, 2–24% by weight of the polynee is sufficient.

In this example the conveyor system of FIG. 6 was operated at high speed, so that only a very thin deposit of expanded cellular material is presented upon the 6 foot wide surface of the belt, with the result that this thin sheet of expanded product is taken continuously from the belt at high speed and rolled into tissues as fast as it is received. Herein a series of 6 embossing rollers cold rolled the cellular product into thin tissue with a caliper of .0048 inch, at an approximate speed of 28 feet a second, deemed satisfactory for the purposes of this example.

As it was wound upon rollers, the surfaces of the tissue thus prepared were subjected to electrical corona discharge, permitting additional surface activation.

By conventional machine means the tissues thus prepared were cut into 12 inch squares and folded appropriately. The resulting product demonstrated absorbency at least twice that of cellulosic fiber tissues, by reason of its cellular structure, with the additional benefit of extraordinary wet strength, as compared to cellulosic tissues. The material thus prepared is so strong that it is not torn by ordinary finger pressures, unlike fibrous cellulosic materials of comparable thickness which tear easily ordinarily.

EXAMPLE 91

By utilization of the following base hydrocarbon polymers, and additives described, household tissues are prepared as follows:

| | Parts by wt. |
|---|---|
| 5% stereospecific isotactic polypropylene, 30% low density polyethylene, 20% isotactic polystyrene, 30% amorphous polystyrene, 5% high density polyethylene, 10% cellulose acetate | 100 |
| 50% butane primary blowing agent, 50% 1,2-dichlorotetrafluoroethane primary blowing agent | 40 |
| Second stage blowing agent as in Example 10 | 20 |
| Potassium metasilicate | .5 |
| Sodium lauryl sulphate | 4 |
| Colloidal silica | .1 |

Our cellular material thus prepared had a density of 1.8 ounces per cubic foot and was processed into household tissues 12 inches by 12 inches in size. These tissues are snow-white in color, soft, and highly absorbent, demonstrating a capacity to hold 28 times their own weight in fluid with wet strength indistinguishable from dry strength. Thicknesses of the tissues thus prepared were .0061 inch.

Processing methods and means utilized for preparing the subject tissues are identical to those described in Example 90 and are believed readily apparent to those skilled in this art, because of our previous descriptions.

EXAMPLE 92

In the subject example hand tissues were prepared as illustrated in Example 90 from the following base materials:

| | Parts by wt. |
|---|---|
| 98% stereospecific isotactic polypropylene, 2% amorphous polypropylene | 100 |
| Benzene primary blowing agent | 65 |

EXAMPLE 92—Continued

| | Parts by wt. |
|---|---|
| Second stage blowing agent as in Example 7 | 30 |
| Trialkoxy stearate | 3 |
| Tergitol 15–S–3A | .5 |

The processes previously described were utilized exactly as in Example 90 preceding, for the preparation of hand tissues in 10 inch squares and with a thickness of .0051 inch.

CLOTH-LIKE DISPOSABLE DIAPERS.—
EXAMPLE 93

By utilization of the apparatus described in FIG. 6, the following combination of resinous polymers and additives were expanded into an open-cell, soft and flexible, absorbent material, snow-white in color:

| | Parts by wt. |
|---|---|
| 98% stereospecific isotactic polypropylene, 2% amorphous polypropylene | 100 |
| Butane as primary blowing agent | 250 |
| Second stage blowing agent as in Example 8 | 60 |
| Union Carbide Tergitol 15–S–9 | .5 |
| Sodium metasilicate | .2 |
| Sodium lauryl sulfate | 2 |
| Gelatinized starch particles containing 20% by weight of methyl benzethonium chloride | 15 |

As previously described, beginning temperature of process was 365° F. and ending temperature was 310° F. Piston pressure was 18,000 p.s.i. and resulting cellular product was 95% open cell, with a density of 2.9 ounces per cubic foot, and a cellular count of 1,800,000 cells per cubic inch.

The cellular material thus prepared was sliced, by bandsaw, into sheets ⅜ of an inch in thickness and cut into the shape of diaper-sized articles, approximately 20 by 24 inches. With a heated embossing roller, a finely detailed quilted fabric design was embossed into the surface of the cellular material on both sides, and the result was a soft, fabric-like material with highly absorbent cells open to the surface between the detail of the embossed pattern described.

These articles may be fastened to infants in any manner identical to that of conventional cloth diapers, and high tear strength permits the utilization of safety pins; or, the diaper may be fastened by less conventional means, utilizing contact adhesive areas which are applied to the diaper for subsequent closure together.

Urine, when deposited upon the surface, spreads until finding open cellular structures which it enters by reason of the surface activation of the cellular walls. On contacting the gelling agent—thixotropic gelatinized starch particles—which protrude, for example, from the cellular walls, there is swelling of these particles and filling of the cellular structure with the lattice bonds of the resulting gel now containing absorbed urine, thus leaving dry the diaper surface contacting the skin of an infant. These gelling agent particles should be present in amounts from 1–100% by weight of polynee with 5–10% preferred.

Methyl benzethonium chloride, previously incorporated within the gel-forming agent, inhibits contained bacteria from breaking down related urea into free ammonia, commonly resulting in diaper rash. Utilization of diapers of this example with infants and babies disclosed no evidence of free ammonia.

The diapers of this example resemble cloth diapers in appearance and can be utilized with equal facility and more advantage. Diaper contact surfaces, although wet upon successively by urine, remain dry and provide efficient and automatic control of diaper rash. These diapers are very inexpensively prepared by the means described, permitting discard with one usage, thus obviating the necessity for storing and laundering soiled and odiferous cloth diapers.

Although the interconnecting cellular structure completely penetrates the cross sectional area of the diaper, the efficiency of the gel-forming structure is such that there is no penetration of fluid through the diaper, it being bound into the diaper by the gel structure provided. Also, the urine is so tightly bound into the structure by these mechanisms that the weight of the infant cannot cause any release of urine through to the outer side of the diaper. Thus, the urine received by the diaper is contained within the cross-sectional thickness of the diaper and spread throughout within this section only, leaving both contact and outer surfaces dry.

EXAMPLE 94

The combination of resinous polymers and additives utilized in Example 93 were used herein with the substitution of the following for the 98% stereospecific isotactic and 2% amorphous polypropylene described therein:

| | Parts by wt. |
|---|---|
| 90% isotactic polybutadiene, 10% amorphous polybutadiene | 100 |

In this example the preparation of low density cellular material from crystalline and sterically oriented polybutadiene required initial process temperatures, utilizing the apparatus described in FIG. 6, of 210° F., with these temperatures decreased to 195° F. at time of cellular expansion. Piston pressures utilized were 18,000 p.s.i. and cellular product was open, interconnecting cell, with a density of 4.5 ounces per cubic foot. Some cross links were introduced in this polymeric structure by reactions previously discussed, and the resulting product was soft and resilient in the low density ranges which have been described.

Fabricated into cloth-like diapers by the means described in Example 93, we carefully studied the reproduction of fabric-like detail by embossing rollers as described. Thus, the disposable diapers described herein had remarkable similarity to new cloth diapers, except for being far less expensive.

With the interconnecting cells passing through the cross-sectional area of the diaper, porosity allows the free exchange of moisture between the surface of the infant's skin and the atmosphere. This high degree of porosity remains until the cells are filled by the gel structure as occurs locally with activation by contact with received urine. Because the cellular structure has the capacity to hold relatively large quantities of urine utilizing only a fraction of the cellular reservoirs available, the benefits of the porosity described are available to the infant usually until the diaper is discarded and replaced with a new one.

EXAMPLE 95

In this example an excellent urea-binding disposable diaper was prepared by the substitution of 60% stereospecific isotatic polystyrene and 40% medium density polyethylene for the resinous polymers shown in Example 93, and the utilization of the processes of this invention as they have been disclosed and are now apparent to anyone skilled in this art.

Additional substitutions in this example include the replacement of the gelatinized starch shown with carboxy methyl cellulose powder, which has been prepared by conventional means to include ten parts by weight of copper sulphate diluted in proportions of 1:1000. The purpose of the copper sulphate, like the methyl benzethonium chloride is to prevent the bacteria in the urine from producing free ammonia from the urea contained within the lattice of the gell structures formed as previously described.

Unlike catamenial pads and tampons described, these diapers are not intended to be commode disposable. Although they are of such quality that they can be washed and reused, this is not intended, as this impairs the urea binding capabilities which have been described.

SPONGES.—EXAMPLE 96

With the apparatus described in FIG. 6, the following materials were utilized to fabricate household and industrial sponges:

| | Parts by wt. |
|---|---|
| 20% stereospecific isotatic polypropylene, 30% high density polyethylene, 50% low density polyethylene | 100 |
| Butane primary blowing agent | 250 |
| Second stage blowing agent as described in Example 8 | 30 |
| Calcium stearate | 12 |
| Tergitol 15–S–9 | .5 |
| Sodium silicate (waterglass) | .5 |

The resulting cellular material was prepared to have a density of 14 ounces per cubic foot to give the sponges, thus prepared, body and a feeling of weight. The large cross section of material resulting from the utilization of the apparatus of FIG. 6 was cut, by smooth edged bandsaw, into rectangular blocks 2 inches thick, 4 inches wide, and 8 inches long. The exterior surfaces of these sponges were further treated by electric corona discharge.

Polar fluids impinged upon the surfaces of the sponges of this example were instantly drawn within the cellular structure. These sponges demonstrated the capacity to hold 85% of their volume in polar fluids, whether the fluids were introduced by mere impingement upon the surface or were introduced by mechanically displacing air by squeezing, and achieving replacement with fluid by this means, usually utilized with sponges.

The surface of these sponges were found to be highly resistant to abrasion and long wear and durability is indicated.

Unlike cellulosic sponges, our cellular structure is even and uniform, as compared to being composed of large voids and fissures. Also, by contract with cellulosic sponges, our sponges are as soft and flexible when dry as when wet.

EXAMPLE 97

The domestic and industrial sponges of this example were prepared from the cellular material of Example 96 preceding. The large cross section of material previously described was cut into blocks 2 inches thick, 4 inches wide, and 8 inches long.

A sheet metal dies in this rectangular shape, but with rounded corners and tapered sides, was heated to a temperature of 700° F. and pressed over the rectangular block described. Thus, a tough and resilient skin was caused to form over five exterior sides of the absorbent, cellular material, and the sides of the sponge article thus prepared were indented to form convenient thumb and finger grips. The article resulting had one surface, consequently, that was composed of cell faces interconnected with the cellular reservoirs within these articles.

Thus provided with a tough and durable skin, the sponges of this example posses the benefit of structural integrity, so that they are adaptable to heavy duty scrubbing and scouring without degradation to the structure of the sponge.

SURGICAL SPONGES.—EXAMPLE 98

Example 96 was followed, except the following materials were utilized to fabricate surgical sponges:

| | Parts by wt. |
|---|---|
| 98% stereospecific isotactic propylene, 2% amorphous propylene | 100 |
| Butane primary blowing agent | 150 |
| Second stage blowing agent as described in Example 11 | 40 |
| Sodium lauryl sulphate | 3 |

The cellular product thus prepared had an open, interconnecting cellular structure and a density of 7.5 ounces per cubic foot. The large cross section resulting from the utilization of the apparatus described in FIG. 6, preceding, was cut by smooth edged bandsaw into rectangular shapes ¼ inch thick, 1 inch wide, and 2 inches long. These articles were then subjected to vacuum pressure to remove any loose particles or cuttings remaining attached to the sponge structure, and it is indicative of the integrity of the cellular material thus prepared that no particles were collected from the filter through which the exhaust stream utilized was passed.

These articles were then subjected to electric corona discharge on all six sides, which discharge largely penetrated the cellular structure by reason of the small thicknesses of these surgical sponges. Subsequently, the surgical sponge articles of this example were subject to vacuum sterilization at a temperature of 280° F. for a period of thirty minutes without any deleterious effect being noted.

Thus processed, the sponges of this example were tested as clinically sterile and were maintained in this condition, by the usual storage methods, until utilized in contact with exposed human tissue. Applied in this manner to human tissue, these sponges absorbed, upon impingement, quantities of body fluids equal to 85% of their exterior volume without the use of any mechanical pressure.

PAPER

The dynamic forces and high pressures of the processes of this invention stretch the very strong crystalline polymers utilized into very thin membranes comprising cellular walls of the order of $1/100,000$ of an inch in thickness, with great increase in tensile strength.

Also, these thin membranes are far below orders of thickness possible by familiar means of extruding film even with supplementary blown film apparatus, because pressures of these systems are in no way comparable to those utilized in these processes.

In this product application, cells of very thin walls are formed in making extremely low density materials and these thin cell walls are then pressed flat, one upon the other, to provide a very strong structure in tension, for a paper that is very thin and light, although with physical characteristics comparable to that of twenty pound bond paper, as an example for purposes of illustration.

EXAMPLE 99

|  | Parts by wt. |
|---|---|
| 20% isotactic polypropylene, 80% amorphous polypropylene | 100 |
| 50% propane blowing agent, 50% butane blowing agent | 175 |
| Tergitol 15–S–9 | .5 |
| Colloidal silica | .5 |

Beginning processing temperatures were 370° F. and ending temperatures were 320° F. Apparatus utilized was that illustrated in FIG. 6, and cellular material prepared was essentially of a closed cellular nature, with a density of .95 ounce per cubic foot. The apparatus of FIG. 6 was operated at high speed as in Example 90, so that cellular material was cold rolled into smooth sheets of a caliper of .0051 inch at a speed of 28 feet per second. The sheets thus prepared are 6 feet in width, pure white in color, and present a non-reflective surface.

After final cold rolling and prior to winding, the sheets are subject to electrical corona discharge which polarizes the surfaces, front and rear, so that printing inks and writing materials are readily received and held by the surface of the paper.

EXAMPLE 100

In the subject example paper was prepared as illustrated in Example 99, with the exception that constituent materials comprised the following:

|  | Parts by wt. |
|---|---|
| 5% isotactic polyproplyene, 60% amorphous polypropylene, 35% low density polyethylene | 100 |
| 80% benzene blowing agent, 20% butane blowing agent | 200 |
| Calcium stearate | .01 |
| Tergitol 15–S–9 | .2 |
| Colloidal silica | .4 |

The material was rolled to a caliper of .003 inch and the paper was utilized as second sheet office paper under conventional 20 pound bond cellulosic paper. On an electric typewriter it was found possible to produce as many as twelve excellent carbon copies, with the paper of this example utilized as second sheets, with greater sharpness to the carbon-reproduced images than when the second sheets utilized were cellulosic papers. Although the reasons for this observed result are not understood, it is believed to be as a result of more sharply defined translations of impact energy from sheet to sheet in spite of the comparatively high absorption of this energy.

EXAMPLE 101

The paper of the subject example was prepared in accordance with the disclosures of Example 99 preceding with the difference that finishing rollers were heated to a temperature of 900° F. and held to a uniform separation of 2 mm. The paper thus produced was characterized by smooth outer surfaces, with very high strength in tension, unlimited life in flexure, and with a cellular core between these surfaces described.

The surfaces as prepared were additionally treated by electric corona discharge to polarize them, as required for the retention of printing inks.

The paper thus prepared was found to have a thermal conductivity of .12 B.t.u. sq. ft./hr./F./ins., which we find to be astonishingly low.

By heat sealing the subject paper was easily fabricated into printed bags for the transport of frozen foods between locations of refrigeration, and also for the transport of perishable iced vegetables and greens, without significant loss of temperatures over substantial periods of time which, of course are relative to specific conditions.

We find this novel and inexpensive paper material useful for wide varieties of useful applications, because of its combination of properties of low weight and high strength, in addition to very low thermal conductivity.

It is contemplated that we will utilize the macroscopically sized cells, which we can produce within the matrices of these papers whenever desired, as reservoirs for various kinds of simple and novel inks which we have considered, thus contained withint he matrices of our cellular papers. By these means, which we have found practical with this unique non-fibrous and non-cellulosic paper, we can obtain multiplicities of duplicate copies from impact printing machines, such as office typewriters, without benefit of supplementary aids, such as carbon papers commonly utilized. Additionally, sharp and clear original or first sheets, of such typed or letter-printed sheets, are obtained without inked ribbons.

EXTREME HIGH-SPEED AND MULTI-COPY NON-IMPACT DATA PRINTING PAPER

The needs for new impact printing paper has greatly expanded in the last several years. Much of the national space and defense program is geared to high speed accumulation of information by computers and the translation of such information, necessarily, to paper for rapid study and evaluation. There is also increasing need of large corporations for better data control of inventory and personnel.

Currently the state of the art is dependent upon the strength and physical properties of cellulosic paper, such properties giving rise to problems in mechanical transport under electric styli at high rates of speed compatible with the electronic speeds of computers. Limiting printing speeds for various applications range from 360 lines per minute to more than 31,250 lines per minute, the approximate capabilities of the fastest non-impact printers now available. However, potential printing speed by electrical image forming methods is limited only by the ionization rate of gases. Higher speed paper transport systems are already known but are not utilized because of the restrictive properties of cellulosic papers. Additional difficulties are represented by the non-availability of equally rapid methods of preparing duplicate copies of printed data, even though just the printing segment of a computer system is large and complex. Such non-availability, due primarily to the inherent limitations of paper used, requires that printed data be delayed until original sheets are duplicated by electrostatic printing or other relatively slow duplicating methods. Relative information as to the state of this art is set forth in an article by Edward Webster in the publication, "Datamation," September 1963, pages 24–30.

Our cellular material described, especially prepared for these purposes, indicates novel utility and important usefulness in non-impact, high speed data printing. Inherent advantages are very great strength, which strength is translated as a substantial decrease in relative thicknesses. This, in turn, gives aditional printing footage per roll, with a net decrease of weight as compared to a roll of cellulosic papers of the same dimensions.

Inherent advantages of our paper material include the availability of hydrogen within the structure of the paper matrix, thus no hydrogen donors being required when aryl amines are utilized, in conjunction with electrical discharge, to produce images at high speed. It will also be readily apparent that the electrical non-conductivity of our paper is of extreme advantage in the reproduction of sharply defined images.

As desired, surface characteristics of the paper are adjusted by coatings of colloidal silica, which may have particle sizes ranging from 15 to 50 millimicrons, depending upon physical results desired.

It is contemplated that paper made from cellular materials, in accordance with the present invention, avoids the disadvantages of cellulosic paper, and in addition possesses a number of desirable characteristics which are uniquely adapted for reproducing images at high speed.

Essentially, the only materials that are required to be added are those which are (a) electrically conductive and (b) will produce a black image. A single metal, such as copper, silver, etc., would, for instance, be suitable, since these metals would be conductive and also produce a black oxide by oxidation from the air.

In practice, however, it may be desirable to utilize a number of additional materials to augment any electrically conductive constituent. Thus, aluminum, magnesium, beryllium, etc., may be used additionally as the conductive metal, even though not producing a black compound in the presence or absence of copper or silver.

Similarly, silver compounds can be used which will form a black image silver oxide, such silver compounds including the carbonate, phosphate, silver salts of organic acids such as the acetate, stearate, cumate, octoate, naphthenate, or silver compounds derived from phenols and mercaptans and 2-hydroxy-1,4-naphtho-quinone. Of these, the organic silver compounds are preferred.

It also may be desirable—though not essential—to utilize an oxidizing agent which is stable at resin melt temperatures, in order to form the black oxide. Such oxidizing agents may include sodium nitrite, dihydroperoxide, sodium chlorate, and others set forth in cols. 49–50 of this application.

It is to be understood that any other black image forming compound other than the oxides could be used in accordance with the present invention.

The amount of the additives that are added to the polymer melt is not critical, but it is found that the relative proportions of the metal, metal oxidizing agent, and silver compound each are 1 to 12% per weight of polymer, with 3 to 8% preferred. The closed cellular material formed is smooth rolled to various thicknesses, from .0025 to .0085 inch. The rolling is normally accomplished at high speed by cold rolling through a multiplicity of at least six smooth rollers preceding a winder.

Such paper as thus produced can be passed through electric image forming non-impact printing machines which produce electrical discharges from styli.

The high temperature of the electrical discharge causes dissociation of the oxidizing agent into molecular oxygen, which initiates free radical reactions degrading the polymer over very small local areas so as to permit good image formation. The heats of reaction degrade the silver compounds into black silver oxide which, in combination with the oxidized copper or other metal, forms black images tightly bound into the matrix formed by the synthetic cellular material.

Other materials utilizing the oxidative capacity of an electrical discharge to convert a white or colorless substance into a black or colored substance so as to form an image may be advantageously used with the hydrocarbon cellular product in accordance with the present invention.

Some of these have been set forth in U.S. Pat. No. 3,042,515. In accordance with this patent, primary, secondary and tertiary aryl means are mixed with organic halogen compounds and are used within photographic emulsions to produce colored images in the presence of a film former which is a hydrogen donor.

In accordance with the present invention, no film-forming hydrogen donor is required, due to the presence of the tertiary hydrogens on the polymer chain which, when subjected to electrical discharge, are easily given up.

It has been found that the following materials, when added to the resin of the polymer melt in accordance with the examples forming a closed cellular material, produce a paper which may be used for non-impact printing:

(a) A finely divided electrical conductive metal, such as aluminum in very fine discrete particle size of the order of one micron or less.

Other metals that may be used are copper, magnesium, beryllium;

(b) An aryl amine, such as set forth in Table II of Pat. No. 3,042,515.

Of this, particularly p,p' tetramethyldiamino diphenyl-4-anilina naphthylmethane and a halogenating compound such as in Tables III and IV of Pat. No. 3,042,515. Among these hexachloroethane has been found to be particularly suitable, and an oxidizing agent such as dihydroperoxide. Suitable oxidizing agents are as follows: sodium chlorate, sodium nitrate, and others set forth above. The amount of the quantity of these ingredients that may be added to the polymer melt is not critical and may range widely. However, the following ranges have been found desirable.

Conductive substances:
    4 to 15% weight of polymer
    3–7% preferred
Aryl amines:
    2 to 16% weight of polymer
    5–9% preferred
Halogenating compounds:
    2 to 10% weight of polymer
    3–5% preferred
Oxidizing agents:
    2 to 12% weight of polymer
    4–8% preferred The product so produced is again cold rolled, as previously described, to produce a thin sheet of paper which has a caliper range between .0025 inch to .0085 inch, or more.

It has been found that the cellular material produced, containing these ingredients dispersed throughout its mass, act as electrically conductive particles to an extent such that the point sources of electrical charges, emanating from the styli in non-impact printing machines in best usage, will print one through five or more copies simultaneously.

Preferably, the sheets are separated by rollers a short distance from the printing head to avoid the possibility of adherence of the sheets which are subjected to extremely high temperatures over very small areas for very small periods of time, as a result of the operation of forming an image under the electric styli. Characteristically, this material enters a solid state phase very rapidly, so there is no adherence of the same sheet to itself when wound on rollers.

Images will of course appear in positive form on the front of this high-speed non-impact printing paper, and wil aslo extend through to the back. Where this is objectionable, it is contemplated to coat the reverse sides of these sheets with a resinous layer containing conductive particles only, so there will be electrical discharge to the multiplicity of sheets, without the formation of images on the reverse side of these high speed non-impact printing sheets.

EXAMPLE 102

The apparatus as illustrated in FIG. 6, utilized as explained in Example 99 preceding, in the preparation of light weight, high strength, smooth surfaced high quality paper, is utilized in the subject example in the preparation of image-forming non-impact printing papers able to withstand the fastest known possible speeds of paper transport systems, without tearing or failure on the part of our paper described herein. It is contemplated that the paper described in this example will permit the printing of computer information at speeds in excess of 50,000 lines per minute, and much higher, commensurate with machine ability to translate information via its electric styli at these speeds or higher. This is also commensurate with the ability of paper transport systems, at these high speeds required. In any event, unlike cellulosic papers, the thin structure and high strength of the paper of this example does not require available paper transport systems to be operated at speeds slower than capabilities available, even currently.

The following materials are utilized in the preparation of the high speed non-impact printing paper, which forms images as a result of discharge from electric styli, which is the subject of this example.

| | Parts by wt. |
|---|---|
| 98% stereospecific isotactic polypropylene, 2% amorphous polypropylene | 100 |
| Butane blowing agent | 125 |
| Tergitol 15-S-9 | .5 |
| Colloidal silica | .5 |
| Powdered copper (.5 to 1 micron particle size) | 2 |
| Sodium nitrite | 2 |
| Silver phosphate | 3 |

The material described above is processed at a beginning temperature of 355° F. and an ending temperature of 310° F. Cellular material is prepared in a vacuum at a pressure of ⅛ atmosphere and is then cold rolled at high speed, as has been previously described in Example 99. Resulting paper is smoothed surface, on both sides, with this same surface being non-reflective. The 6 foot width prepared is cut to 24 inch wide rolls, or to smaller sizes, as required by the non-impact printing machine utilized. In this example the paper prepared was subjected to the conditions as would be encountered if utilized by a non-impact printer capable of producing 31,000 lines per minute.

As passed under the electric styli, the subject paper produced clean, sharp images from the electric discharge, because of additives within the paper, as has been described. The paper does not tear and winds smoothly and evenly, indicating capacity for extreme speeds of transport.

The size of the finished roll was calculated to be 43% smaller in diameter and ¼ the weight of a comparable roll of cellulosic paper.

The subject paper was then machine folded and demonstrated unlimited flexural life at creases, in addition to very high resistance to tearing, even with the expenditure of considerable effort to accomplish this. Images formed on the paper, as a result of oxidation of contained silver compounds when initiated electrically, are an integral part of the paper, rather than being merely an image adhered to a surface, and are thus permanent.

Non-impact printing papers prepared as described herein are found to be very economical and inexpensive in their preparation.

EXAMPLE 103

The electric image formation of the non-impact printing paper of this example utilizes aluminum particles for electrical conductivity, aryl amines mixed with organic halogen compounds, and oxidizing agents, such as dihydroperoxide. No hydrogen donor is required, due to the presence of the tertiary hydrogen on the polymer chain which, when subjected to electrical ionizing discharge, is easily given up and made available. Herein the oxidative capacity of an electrical discharge is utilized to convert a white or colorless substance into a black or colored one, depending on what amines and halogenating combinations are utilized, thus forming an image on paper as induced by discharges from electric styli.

The procedure for the preparation of the subject paper is the same as that for Example 102 preceding. Materials utilized are as follows:

| | Parts by wt. |
|---|---|
| 98% stereospecific isotactic polypropylene 2% amorphous polypropylene | 100 |
| Butane blowing agent | 115 |
| Tergitol 15-S-9 | .5 |
| Colloidal silica | .5 |
| p,p'-Tetramethyldiamino diphenyl-4-anilino naphthylmethane | 3 |
| Hexachloroethane | 2 |
| Dihydroperoxide | 3 |
| Aluminum powder (particle size .5 to 1 micron) | 3 |

The above material was processed into non-impact printing paper, as illustrated in the preceding example. Paper was processed so as to have a caliper of .0059 inch and produced clear, dark, solid number and letter images. Unlike cellulosic paper, the inexpensive paper of the subject invention is believed capable of meeting all requirements for extremely high data printing speeds.

The image produced in the subject example is an integral part of the matrix of the hydrocarbon derived paper described, and images produced, as explained, extend through the pape and are visible on the reverse of the paper with reversed lettering. In some instances this is believed objectionable, and in this example paper prepared as described was coated on the reverse with film forming methyl methacrylate containing 1% aluminum and ½ of 1% titanium oxide particles, so as not to lose electrical conductivity through the matrix of the paper.

EXAMPLE 104

The combination of excellent dielectric properties of hydrocarbon based paper, such as that described herein, with imbedded electrically conductive particles substantially insulated from one another, but able to transmit electrical discharges from the styli of non-impact printers through the paper, as has been illustrated, fulfills the need in this art, of ability to print multi-copies simultaneously, so that original information is not delayed while it is being duplicated by commonly known methods.

In this example, five copies can be prepared simultaneously at high printing speeds, because of the disadvantages of this novel paper.

Herein, the paper of Example 103 is made into five ply sheets, spooled, and the sheets held in close contact with each other by static electricity.

As processed, the electric discharge is conducted through the conductive particles of all five layers almost simultaneously, with the result of image formation in each of the sheets, as has been described. Immediately after image formation, the five plys described are separated by rollers and there is sufficient transport distance to allow the hot thermoplastic base material to be stabilized by cooling before winding, so there is no adherence as these sheets are wound upon themselves.

To our best knowledge, there has not been previously, with cellulosic papers, any satisfactory means for making more than one printed copy from any type of non-impact printer, or printing data computer, thus causing serious delay in the usage of critical information, when this information must be duplicated, as is often required.

GASEOUS, ABSORBENCY, ADSORBENCY AND FILTRATION

In gaseous filtration elements being separated are so small that they cannot be seen with the microscope. Separation being achieved by momentary contact with surfaces emphasizes the importance of large surface area within a minimum volume.

Because of its flat sided cellular construction, with interconnecting cells and its extremely thin walls, the subject synthetic material provides an extremely large matrix for the support of very finely divided substances as described herein, capable of both adsorbing and absorbing selectively, any gaseous fraction desired, and additionally permitting mainstream passage of the gas or smoke without perceptible pressure drop. It is not the purpose of these filters to absorb particles or impurities completely, permitting only the passage of a desired gas such as air, but to completely and efficiently absorb any desired fraction, selectively The large absorptive matrix-like surface and induced spherical-venturi-effect of the present cellular material increases the velocity, and thus the turbulence of the gaseous stream, to expose the gaseous stream to 2.86 times the absorptive surfaces available otherwise.

Additionally, such surfaces having very finely divided coatings of both adsorptive and absorptive substances, such as activated charcoal and crystalline zeolites (known as molecular sieves and polar when desired), greatly increase the filtering out of undesired materials. This absorption is increased as a function of "rate" or speed of absorption is increased as a function of "rate" or speed of absorption on contact with a gas and increases logarithmically with reduction in size of the absorptive particles.

Activated charcoal and molecular sieves are known to have interior absorptive surfaces, totalling as much as 900 to 1000 square yards of surface area per gram of material. When distributed in finely divided form and fully exposed to mainstream gases such as smoke being drawn through the cellular matrix, separation results both from physical scrubbing and absorption.

With the addition of chelating agents and ion exchange resins to be described, there is selective separation as desired, of any fractions of the mainstream of gas or smoke.

Filters incorporating the means described above are novel as compared to those of the prior art, providing filtration surfaces with an effective surface area much greater than filter matrices known hithertofore.

Smokes are usually made up of particles of solid dispersed in a gaseous medium, and there may be liquid or water vapor, additionally, dispersed in the gaseous medium. Usually, such systems are two-phase systems, with each dispersed particle having a surface at which characteristic interfacial properties permit absorption, which might be attributed to electrical double-layers or other complex mechanics. Thus selective absorption can be made over wide parameters, providing sufficient absorptive area is available, as by these means described herein.

By contrast with the prior art, typical cigarette filters, as found in popular brand packs, are composed of fibers averaging about 15,800 per filter totalling a surface area of approximately 25.6 square inches per filter. The addition of activated charcoal to such filters of the prior art is largely ineffective, even in .1 gram quantities for two basic reasons:

(A) To prevent being drawn through the filter, particles are necessarily very large, thus sharply reducing absorption "rate."

(B) The average smoke particle is .5 micron in diameter and the majority of the pores within activated charcoal, which were formed by driving off natural organic solids as gases, are .2% the size of the smoke particles from which they are supposed to absorb constituent gases. Thus, obviously, surface contact is very difficult and improbable. To generalize, activated charcoal as it is commonly used under the prior art is less than $\frac{1}{2}$ of 1% effective in removing known noxious smoke constituents.

The use of cellular material for filtration is known under the prior art. This requires open cell material, best represented by thermosetting urethane and plastisol-cast polyvinyl chloride. Urethanes are potentially toxic because of isocvanate content and do not have a large surface area, although extremely porous, because of a lenticular, as opposed to cellular structure. Polyvinyl cellular structures are relatively dense and of the order of five pounds or more per cubic foot, which is reflected in terms of high material expanse and relatively small surface area available for absorptive purposes.

The parameters described herein may be used for many kinds of single and two-phase disperse systems and their filtration. These include industrial filtration, air conditioning air stream filtration, gas and liquid chromatography and separation, and tobacco smoke filtration.

Activated charcoal, reduced to micro-sized particles surfacing the cellular walls of this novel filter matrix, is efficiently utilized herein, because these bonded particles of small size effect adsorption on their exterior surfaces by "scrubbing." In addition, all possible absorption is accomplished on interior surfaces at a high "rate," unlike the much larger sizes 20 x 40 mesh or more, necessarily used under the prior art in cigarette filters. The amounts of charcoal used should be 3 to 65% per weight of polymer, with 8 to 12% preferred.

Molecular sieves or crystalline aluminosilicates are well known synthetic or artificially prepared absorption media. As contrasted with activated charcoal, their interior absorptive surfaces are characterized by pre-designed pores of large and regular size, thus permitting more selective filtration over larger ranges of particle sizes. Herein they are used in combination with activated charcoal and are also impinged on cellular walls, to achieve selective filtration. Crystalline aluminosilicates are described in detail in the following publication: Molecular Sieves, by Charles K. Hersh, Reinhold Publishing Company, 1962. The amounts of such sieves or aluminosilicates used should be 2 to 60% per weight of polymer, with 4 to 15% preferred.

We also accomplish selective filtration by incorporating ion exchange resins within the porous structures of activated charcoal and crystalline aluminosilicates. They can also be added to the polymeric mixture at time of processing of the cellular material, and generally procedures and amounts for the addition of surfactants, as has been described, apply for ion-exchange resins.

Ranges of the ion exchange resins that may be incorporated are from 2 to 100% or more of the weight of the polymer, and preferably about 6 to 10%. Examples of resins that may be used include:

Sulfonated phenol
Polystyrene nuclear sulfonic acid
Polystyrene dimethyl ethanol benzyl ammonium
Polystyrene polyamine
Acrylic carboxylic acid
Phenolic secondary amine
Phenolic tertiary amine
Aliphatic amine tertiary and quaternary
Ion exchange celluloses such as diethylaminoethyl cellulose
Methacrylic carboxylic acid Although ion exchange usually is considered as defining the exchange of ions that occurs on contacting an ionic solid with an electrolyte solution, this phenomenon also occurs in heterogeneous systems, such as ours herein, with the filtration of two or more phase gaseous smokes, with the interchange taking place at the interfaces.

Although ion exchange resins lack crystallinity, the mechanism of ion exchange in these gaseous filters is analogous to the exchange of crystal lattice ions. The cation-exchange resins owe their capacity for exchanging ions to such functional groups as the phenolic, carboxylic, and sulfonic acid groups. The anion-exchange resins are polymeric primary, secondary, tertiary, and quaternary amines. The exchange capacity of these resins corresponds quite closely to the quantity of ionic groups present, which indicates that the exchange of ions takes place throughout the whole gel structure, and is not limited merely to surface effects. There is ion exchange, additionally, in the crystalline aluminosilicates described above, and ions readily penetrate the crystal lattice of these silicates.

In combination with the very large absorptive and "scrubbing" surface of our filters and within the limited dimension of a typical cigarette filter, we have found that chelating agents are effective and invaluable in achieving selective filtration in order to remove the radio-active isotopes found in tobacco plants, such as polonium 210. A smoker, according to published research data, can be subjected over a period of 25 years to radiation and a localization of radioactivity amounting to 1000 rem. or more, emphasizing the need for selective filtration.

Chelating agents in amounts between .5 to 55% per weight of polymer, and preferably 3 to 4%, can be incorporated within the structure of the cellular filter, so as to accomplish maximum effectiveness, by the means that we utilize with surfactants and ion exchange resins. These means are flexible and various and their usage with chelating compounds will be illustrated in the filter examples following.

We have learned that chelating agents such as the sodium, potassium, lithium salts of citric acids, ammonia triacetic acid, and especially ethylenediaminetetraacetic acid, are effective in the removal of radioactive isotopes found in the gaseous main stream of cigarette smoke being drawn through our novel filters.

In analogous terms these and similar chelate coordination compounds are preferred for selective filtration because they either already have, or we can make them have, a molecular structure into which the radioactive ion fits neatly and where it is held firmly until the filter itself is discarded.

Ethylenediaminetetraacetic acid is already excellently constructed for our purpose, at this time, and many more such coordination compounds are possible with increasing knowledge of chelate compounds.

Chelate compounds are regarded as invaluable to highly efficient selective filtration of gaseous smoke, as from tobacco, and to filtration for a wide variety of other useful purposes. The chelates are well-known and may be said to be the result of a metal ion combining with an electron donor with the resulting substance being a complex or coordination compound. When the substance combining with the metal contains two or more donor groups so that one or more rings are formed, the resulting structure is said to be a chelate compound, or metal chelate, and the donor is said to be a chelating agent. Ethylenediaminetetraacetic acid, for example, can chelate a plutonium ion, on contact, by coordinating it into its own molecular structure, thus separating it, for example, from cigarette smoke and holding it out from the mainstream so it is thus harmless to the smoker.

The increasing usefulness of chelates in applied chemistry and the separation of radioactive metals such as plutonium 210 will be readily apparent with an evaluation of the methods by which these chelate compounds are coordinated, so that they may combine with a definite maximum number of other atoms, molecules, or radicals. Reference is made to the following: Chemistry of the Metal Chelate Compounds, Martel and Calvin, Prentiss Hall, Inc., N.Y.

We have also learned that surfactants have usage herein as a source of electromagnetic energy or polar groups to activate the surface of our synthetic cellular material and are also effective in sequestering metals, especially those which are radioactive.

As an example, sodium hexametaphosphate from 1–70% per weight of polymer, and preferably 7–15%, is especially effective for a multiplicity of purposes in connection with cigarette smoke filtration, and this will be readily apparent from the examples of filters in detail, which follow.

The means of incorporating into the cellular matrix all the filtration and sorbing aids which are used for this aspect of the invention are the same as that set forth previously for surfactants. Following are specific examples of the practical utility of the usage of ion-exchange resins which we use to accomplish selective filtration. Also, preferred means of utilizing activated charcoal and molecular sieves, both singly and in combination, and impregnated with chelating agents and ion-exchange resins, is also described.

BIOLOGICAL FILTER

Our biological filters are illustrated in the following examples. With interior walls of cells coated with finely divided absorbent materials, there results a highly effective absorbent surface area contained within a very small volume. Turbulence of the gases drawn through millions of spherical venturis per cubic inch, when desired, result in the additional benefits of "scrubbing," previously discussed.

The cellular material utilized for these biological filters in the first, second and third examples following is the same as that described in Examples 40, 41 and 45 respectively.

In the first and third examples following, filter elements were machine-cut from the large cellular masses prepared on the apparatus of FIG. 6, while cylindrical dimensions of test elements are .75 cm. in diameter by 2 cm. in length, in all three examples.

In the second example, because diameter of cross section required is very small, the formulation described was extruded, under identical parameters of temperature, through a $\frac{1}{32}$ inch orifice at the rate of 50 pounds per hour on a 3-inch single screw extruder. Thermoelastic strains, encountered even with this small cross section, were prevented from distorting the cellular extrudate into uselessness by forcing the expanded product through a metal sleeve with an interior diameter of .75 cm. and a length of 4.5 inches, with the sleeve maintained at the same heat as the resinous melt at time of extrusion. This restriction increased the density of the cellular material prepared approximately 200%, which is not objectionable in this particular instance. Thus, herein only, filter elements were prepared continuously in this small diameter and then cut into elements with a length of 2 cm.

We characterize biological filtration by separating from the air substances that are radioactive to an extent greater than the normal background of the bronchial epithelium; or by the separation from air that is breathed or inhaled, classes of chemicals such as the polycyclic hydrocarbons and the azo dyes that have potentially harmful physiological effects. Also, since much data concerning cigarette smoke is readily available, reference is made thereto for examples of application. This application is quite convenient as sample filters are of small size and convenient for usage in the laboratory. It should be stated, however, that the scope of biological filtration is intended to be limited only to the definition of the words and not to any one application used as an example or for illustrative purposes.

All the materials filtered herein are those comprising air as it is normally breathed or inhaled, but contaminated by the classes of substances just described. They can be described as gases containing particles too small to be seen, or particles of a larger size which can be seen, such as smoke particles having a mean diameter of .5 micron although these may be much smaller or much larger.

The volumes of air, and their representative compositions, which were filtered in the following examples, were classified in the following categories for the sake of convenience:

(A) Air containing fine dust particles. Three cubic meters of this air had been contaminated by th radioactive isotopes $Pu^{239}$, $Sr^{90}$, and Po (polonium)$^{210}$, by their adherence to these dust particles. Thus, in addition to beta particle activity, alpha particle radioactivity at least more than twice that usual to the bronchial epithelial envirnoment is clearly evidenced.

The alpha emitting isotopes described above are of special interest because they are absorbed by plant roots. Also, this absorption is concluded to be supplemented by foliar absorption of "natural fallout" from decay of $Rn^{222}$ in the atmosphere. Thus, via plants in various ways, there is translocation of alpha-emitting radio-isotopes to the human bronchi.

These alpha-emitting isotopes are known to bind rapidly and strongly to surfaces such as dust particles. In addition, polonium$^{210}$ is especially effective in binding itself to smoke particles and being carried thereon. It is in this regard that the "scrubbing" effect of our cellular filter material is so effective in accomplishing separation.

(B) Air containing smelter gases such as the polycyclic hydrocarbons. Smelter gases are found in mines, and also as a result of smelter and various industrial processes, and as a constituent of smoke whether or not from industrial processes. Three cubic meters of air containing these gases were used.

(C) Air containing ordinary tobacco smoke. Three cubic meters of air and tobacco smoke provided a convenient source of radioactive polonium and polycyclic hydrocarbons such as those mentioned above. Herein the necessary volumes of air laden with smoke, as a source of these materials to be filtered, were prepared by utilizing a standard smoking machine and cigarettes, available commercially, and collected indiscriminately and intermingled. The smoke-laden air was filtered in the following examples and, where quantitative results were obtained, they were calculated on the basis of the number of cigarettes utilized in producing the smoke that was filtered.

As a standard of reference for evaluation of efficacy of our biological cellular filters, a laboratory test filter was prepared in a cyclindrical section .75 cm. in diameter and 2 cm. in length. It was of fine glass fibers so compressed and compacted that a full atmosphere of vacuum was necessary to draw the three cubic meters of contaminated air, in each test example, through the structure of the filter.

The efficiency of this test fiber filter in stopping the passage of solid particles was 99.9% for particles with a diameter larger than .04 angstrom and 93% for particles larger than 0.01 angstrom. Thus it is especially effective in stopping alpha-bearing dust and smoke particles so that their cumulative quantity could be measured by proportional counters. These fiber filters were also saturated with the same chelating agents utilized in the cellular filters, and the same ion-exchange resins. In other words, every effort was made to have these fiber filters collect, totally, all of the substances contained within the three cubic meter samples of contaminated air, passed through the filter. Where, especially with smelter gases and contained polycyclic gases, it failed to do this because the physical construction of fibers in compression, which is common with fiber filters, is not conducive to efficient absorption, the total content of the mainstream of gas when pulled under a full vacuum as in this test example was determined by supplemental calculation and analysis.

Thus, the contents of the fiber test filter, so described, is concluded to be the total contaminants of the filtered samples of air, removed from the air and collected within the filter for measurement as a standard of reference. With radioactivity, the results are regarded as accurate and representative by actual measurement. With polycyclic gases, the results are regarded as representative both by measurement by the means of standard quantitative analysis of the filtrate contained within the filter, and by supplementation by calculation, as has been explained.

For each class of filtration described, filterate contained within the fiber filters is believed to be all of that contained within the contaminated air being filtered, either by actual determination or by calculation. A value of 100 represents this maximum possible quantity of filtrate so contained.

Identical samples of air were then filtered through our cellular biological filters under conditions of normal usage with pressure drops of less than 2.5 inches of water, in all instances. Smoke particles were thus passed completely, and alpha-emitting isotopes were "scrubbed" from carrier particles by this passage, as will be evident from the following examples.

After passage of identical samples of air, residual filtrate quantities within the cellular filter, as compared to the total filtration of the test filter, indicate efficiency of these biological filters in normal usage.

The radioactivity of the polonium and other alpha-emitting isotopes collected in the comparative filters was counted on a proportional counter constructed of standard components as supplied by Philips Gloeilampenfabrieken, Eindhoven, Netherlands. This type of counter is provided with a means of monitoring both alpha and beta contamination thus providing a linear relationship in the activities of the daughter products in the deposits of these naturally occurring radioactive substances.

It will be apparent that the cellular filter is effective in "scrubbing" both dust and smoke particles, thereby separating, for chelation, the isotopes carried upon these particles. Effectiveness is demonstrated with beta particles, or with particles carrying alpha emmission such as those of polonium$^{210}$.

The comparative results of testing three types of our biological filters, prepared by the means described, is as follows.

EXAMPLE 105
Biological Filter Prepared from Cellular Material as in Example 40

| Test gas filtered | Size of filter, cm. | Filter type | Pressure drop | Filtrate, 100=100% | Residual, after filtration | Residual content, after filtration |
|---|---|---|---|---|---|---|
| Air, contaminated, $Pu^{239}$, $Sr^{90}$, $Po^{210}$ | .75 x 2 | Fiber | 1 atmos | Alpha-quantity (100) | Air only | Trace—alpha, beta; less than 1% normal background bronchial epithelium. |
| Do | .75 x 2 | Cellular | 2.2 in. of water. | Alpha-quantity (98) | do | Trace—as above. |
| Air, contaminated, smelter gas | .75 x 2 | Fiber | 1 atmos | Polycyclic gas (100) | Air only | Trace—.01% original content polycyclic gas. |
| Do | .75 x 2 | Cellular | 2.2 in. of water. | do | do | Trace—as above. |
| Air, contaminated, tobacco smoke | .75 x 2 | Fiber | 1 atmos | $Po^{210}$ alpha (100) | Air only | Trace—alpha; less than 1% normal background bronchial epithelium. |
| Do | .75 x 2 | Cellular | 2.2 in. of water. | $Po^{210}$ alpha (99) | Smoke | Trace—as above. |
| Air, contaminated, tobacco smoke | .75 x 2 | Fiber | 1 atmos | Polycy. gas and nicotine (100) | Air only | Trace—.009% original content gas and nicotine. |
| Do | .75 x 2 | Cellular | 2.2 in. of water. | Polycy. gas and nicotine (94) | Smoke | Calculated: Polycy. gas—.2 mg. per cigarette. Nicotine—.0016 mg. per cigarette. |

EXAMPLE 106
Biological Filter Prepared from Cellular Material as in Example 41

| Test gas filtered | Size of filter, cm. | Filter type | Pressure drop | Filtrate, 100=100% | Residual, after filtration | Residual content, after filtration |
|---|---|---|---|---|---|---|
| Air contaminated, $Pu^{239}$, $Sr^{90}$, $Po^{210}$ | .75 x 2 | Fiber | 1 atmos | Alpha-quantity (100) | Air only | Trace—alpha, beta; less than 1% normal background bronchial epithelium. |
| Do | .75 x 2 | Cellular | 2.0 in. of water. | Alpha-quantity (91) | do | Trace—as above. |
| Air, contaminated, smelter gas | .75 x 2 | Fiber | 1 atmos | Polycyclic gas (100) | Air only | Trance—.01% original content polycyclic gas. |
| Do | .75 x 2 | Cellular | 2.0 in. of water. | Polycyclic gas (93.5) | do | Trace—as above. |
| Air, contaminated, tobacco smoke | .75 x 2 | Fiber | 1 atmos | $Po^{210}$ alpha (100) | Air only | Trace-alpha; less than 1% normal background bronchial epithelium. |
| Do | .75 x 2 | Cellular | 2.0 in. of water. | $Po^{210}$ alpha (94) | Smoke | Trace—as above. |
| Air, contaminated, tobacco smoke | .75 x 2 | Fiber | 1 atmos | Polycy. gas and nicotine (100) | Air only | Trace—.009% original content gas and nicotine. |
| Do | .75 x 2 | Cellular | 2.0 in. of water. | Polycy. gas and nicotine (87.5) | Smoke | Calculated: Polycy. gas—.25 mg. per cigarette. Nicotine—.0031 mg. per cigarette. |

EXAMPLE 107
Biological Filter Prepared from Cellular Material as in Example 45

| Test gas filtered | Size of filter, cm. | Filter type | Pressure drop | Filtrate, 100=100% | Residual, after filtration | Residual content, after filtration |
|---|---|---|---|---|---|---|
| Air, contaminated, $Pu^{239}$, $Sr^{90}$, $Po^{210}$ | .75 x 2 | Fiber | 1 atmos | Alpha-quantity (100) | Air only | Trace-alpha, beta; less than 1% normal background bronchial epithelium. |
| Do | .75 x 2 | Cellular | 1.7 in. of water. | Alpha-quantity (95) | do | Trace—as above. |
| Air, contaminated, smelter gas | .75 x 2 | Fiber | 1 atmos | Polycyclic gas— (100) | Air only | Trace—.01% original content polycyclic gas. |
| Do | .75 x 2 | Cellular | 1.7 in. of water. | Polycyclic gas— (100) | do | Trace—as above. |
| Air, contaminated, tobacco smoke | .75 x 2 | Fiber | 1 atmos | $Po^{210}$ alpha (100) | Air only | Trace—alpha; less than 1% normal background bronchial epithelium. |
| Do | .75 x 2 | Cellular | 1.7 in. of water. | $Po^{210}$ alpha (97) | Smoke | Trace—as above. |
| Air, contaminated, tobacco smoke | .75 x 2 | Fiber | 1 atmos | Polycy. gas and nicotine (100) | Air only | Trace—.009% original content gas and nicotine. |
| Do | .75 x 2 | Cellular | 1.7 in. of | Polycy. gas and nicotine (80) | Smoke | Calculated: Polycy. gas—.3 mg. per cigarette. Nicotine—.004 mg. per cigarette. |

DISPOSABLE NON-WOVEN FABRICS

Another application of the products of the present invention is that of non-woven fabrics which for special applications are superior to woven fabrics, and in most instances, far more economical. More specifically, many articles from non-woven fabrics of our invention are designed to permit disposal when soiled, rather than incur the cost of cleaning or laundering.

Specific articles will follow, as examples.

When hospital surgical gowns and linens are exposed to contamination by bacteria, it is far more preferable to dispose of the articles than to launder them in order to prevent the spread of contagion and the fostering of air-borne bacteria. It is an object of this invention that hospital garments or linens made from this fabric can merely be discarded after usage, and replaced with new garments or linens at a cost comparable to that of laundering.

Generally, the drape, the hand, the feel of woven fabrics are admirably suited to articles such as garments or linens into which they are made. Whereas, at this point we know of no one thermoplastic material that can be formed into a non-woven fabric with these same desirable mechanical properties, we find that the processes of this invention make it possible to combine widely dissimilar materials, with only the common denominator of being thermoplastic, so that the desired physical properties of a woven fabric are achieved in a non-woven fabric.

As an example, while no cellular structures of thermoplastic polyvinylchloride are known to us under the prior art, except in small cross section and high density, we find that thermosetting plastisol prepared cellular structures of polyvinyl chloride are soft and resilient, and have applicable physical properties that might be said to be at least partially similar to the drape, feel, and hand of cloth. We say this is only partially true, because the predominant physical characteristics of such vinyl materials still remain those of a polymeric plastic material.

To further describe cellular structures prepared from polyvinyl chloride, we are describing thermosetting plastisol pepared cellular structures, although it should be understood that thermoplastic cellular materials, and not thermosetting cellular materials, are within the scope or interest of this invention. Polyvinyl chloride cellular structures are relatively dense, ordinarily, and of the order of eight pounds per cubic foot, as an example, because the structure must depend upon the "mass" of polymers held together only by weak van der Waals to hold itself up in a structural sense.

With polyvinyl chloride, because of architectural weaknesses on a molecular scale, since high densities are required just to maintain a cellular structure without it collapsing, we find it necessary to combine it with a high strength stereospecific polymer.

We have also concluded that polymeric films, although embossed to look like cloth, have remote possibility of being made to have the satisfactory drape, hand, and feel of fabrics, due to the dense concentration of polymers within films, whether extruded, cast, or calendered.

On the other hand, in our low density cellular structures of high strength, polymers are utilized with such high efficiency, and thus so sparingly, that there is approach to the mechanical properties of drape of cloth when this material is in thin sections. Unlike film, the material will drape and hang, very much like cloth, although not completely so, which is a distinction which has to be made.

Summarly, then, when we combine the properties of our preferred stereospecific hydrocarbon polymers with vinyl chloride polymers which lack relative strength, fabrication of novel low density cellular structures is possible. These dissimilar polymeric systems, common only in that they are both thermoplastic, are combined to make a cellular material that is then embossed and otherwise treated to have the familiar and satisfactory appearance of cloth.

Such cloth, made at very high speeds by the processes of this invention, is of course actually a non-woven fabric made from hydrocarbon gases, now often wasted into the atmosphere, or burned for want of application. Because these cloths are made without the necessity of first making yarn, then weaving yarns into cloth, these cloths or fabrics are extremely economical, both as to their base materials and to their method of manufacture, which is unique with our simple, high speed process, as illustrated by the apparatus of FIG. 6.

In making non-woven fabrics under the closely controlled temperatures of the high speed processes of this invention, it is readily apparent that such widely differing materials such as stereospecific polypropylene, for example, and polyvinyl chloride, have widely differing melt and viscosity temperatures and other properties, which must be brought into proximity with each other, because they are processed simultaneously through the apparatus of FIG. 6.

We have found that we can induce almost identical properties, as required to meet processing conditions, in widely dissimilar thermoplastic polymeric systems, when they are combined as illustrated in this example. A high molecular weight long chain stereospecific polymer of polypropylene has a high melting point. By various processes of free radical reactions known in the art, or the utilization of principles of polymerization shortstopping, or by known principles of achieving chain scission, we can shorten the length of these highly stereoregulated polymeric chains and thus adjust their melt temperatures and viscosities to those of the dissimilar thermoplastic material with which it is being processed simultaneously.

Also, during the procedure of preparing cellular material on the apparatus of FIG. 6, we can induce graft polymerization or block polymerization from monomeric units introduced into the process by the utilization of organo-metallic catalysts, known in the art of polymerization. Occasionally, to obtain special effect in preparing these disposable non-woven fabrics described in this example, this is desirable. Generally, however, we find that the structural strength imparted to these low density cellular materials, by the incorporation of very small percentages of the stereospecific and highly ordered hydrocarbon polymers we prefer, is so great that any additional parameters of strength achieved by graft copolymerization is of no practical consequence.

EXAMPLE 108

As an example of the preparation of non-woven fabrics, we utilized the following materials:

| | Parts by wt. |
|---|---|
| 20% isotactic polypropylene, 40% amorphous polypropylene, 40% polyvinyl chloride | 100 |
| Benzene blowing agent, 60% | 60 |
| Celogen (p,p'-oxybis-(benzene-sulfonyl hydrazide), percent | 40 |
| Secondary blowing agent, as in Example 11 | 10 |
| Sodium lauryl sulfate | .5 |
| Tergitol 15–S–9 | .2 |

The melting point of the isotactic polypropylene, by chain scission, was adjusted so as to provide a viscosity compatible with that of the polyvinyl chloride at a temperature of 310° F. The mixture was introduced into the apparatus of FIG. 6, by means which have been explained and is now readily apparent. The cellular material was prepared under an orifice piston pressure of 21,000 p.s.i. and had a resulting density of 2.9 ounces per cubic foot.

The lenticulated sides of the apparatus of FIG. 6 had been removed and replaced with sides ¼ inch in height, and the conveyor system was operated at a speed of 28 feet per second. The material received from the conveyor 6 feet in width and similar to that in making paper which has been described, was cold rolled at high speed through a series of six embossing rollers, which additionally needled the material mechanically. Thus, fine penetrations were provided through the material for the exchange of water vapor from the body to the atmosphere, as is characteristic of the porosity of cloth. The material is also provided with a textured surface identical to that of woven cotton sheeting.

The resulting non-woven fabric was white, porous, strong, and flexible. Additionally, it possessed the characteristics of cotton sheeting, with remarkable similarity in terms of drape, hand, and feel, which is an object of this invention, even though the subject material represented a non-woven fabric. The material was processed through repeated laundry washing and drying cycles without deleterious effect being apparent, although this is not an object of this invention.

By methods utilizing both sewing and heat sealing, the non-woven sheeting was processed into examples of hospital articles as previously referred to, including surgical suite apparel, surgical drapes, packs, bandages and gauze, linens, and articles of a similar nature easily made contagious by bacteria and requiring extension laundering and sterilization in hospitals.

In this instance these low cost articles were merely discarded after usage, and replaced, wihh proportionate reduction of labor costs. Forced draft incineration in a standard hospital incinerator was the means of disposal utilized, and was found convenient.

EXAMPLE 109

As will be apparent to those skilled in the art, the processes of preparing non-woven fabrics by the means disclosed herein, are readily applicable to wide combinations of dissimilar thermoplastic polymeric systems, in order to obtain the familiar properties of woven fabrics.

In the subject example we merely utilized the following substitutions, again with satisfactory result, in the place of the polymeric materials utilized in the preceding example:

| | Parts by wt. |
|---|---|
| 10% isotactic polypropylene, 30% amorphous polypropylene, 20% low density polyethylene, 40% polyvinyl chloride | 100 |

Cellular material was prepared at a temperature of 310° F. and presented a density of 3.2 ounces per cubic foot before rolling into fabric, as previously described. The apparatus of FIG. 6 was adjusted to produce the described material at the rate of 18 square yards per second, which appeared to be a minimum rate, because of the high speeds necessary to preparing our cellular materials of a highly stereospecific nature.

EXAMPLE 110

To further illustrate the range of substitutions possible, in preparing non-woven fabrics given the speeds and pressures of the apparatus of FIG. 6, in the following example the base resins utilized, blowing agents and additives, are those following:

| | Parts by wt. |
|---|---|
| 10% isotactic polypropylene, 40% amorphous polypropylene, 50% hydroxyalkyl-diamine cross-linked nylon polyamide (subjected to polymerization shortstopping) | 100 |
| 30% butane primary blowing agent, 40% suberic acid octamethylene diamine primary blowing agent | 55 |
| 30% Freon 11 primary blowing agent, secondary blowing agent, as in Example 13, magnesium sulphate heptahydrate | 10 |
| Tergitol 15–S–9 | .2 |

The above material, in cellular form, presented a density of 3.3 ounces per cubic foot and possessed excellent fabric-like characteristics when prepared into linens. It should be carefully noted, however, that due to electrostatic qualities of nylon, incorporated herein, the non-woven fabric of this example should not be used when it would be in contact with explosive anesthesia.

The utilization of our novel process for preparing economically large cross sections of bulk thermoplastic cellular materials at high speed, and our technique in utilizing this process in structurally combining wide classes of thermoplastic polymeric materials, makes advantageous product applications of a wide range.

In areas of sound insulation, effectiveness of these structures in absorbing sound energy is excellent. Economic and useful application is strongly indicated in building construction of partition walls where modular units of these materials, in rigid form, are laid in mastic and utilized as a keyed structural surface for ordinary lime plaster. They may also be utilized as 4 x 4 foot ceiling tiles which can span these large modules without additional support except edge suspension, because of relative freedom from cold flow distortion with very light weights demonstrated. Other applications, such as vehicles of transportation, wherein weight is a major consideration of soundproofing, are also indicated.

It is also readily apparent that with characteristics of extremely high thermal insulation efficiency combined with low cost and extremely light weight, thermal insulation panels of our cellular material have useful application in building construction, machine and pipe insulation, and in supersonic aircraft where light weight and high performance is desirable. The material is easily treated by halogenation so that it is self-extinguishing when in contact with direct flame, and is easily treated for resistance to special conditions where its high thermal insulation efficiency makes it useful.

Outstanding characteristics of water impenetrability in conjunction with high strength and very low specific gravity in our novel polygonal closed cell structures, make possible the preparation of excellent articles of a flotation nature such as waterproof boat cushions, life preservers, boat and dock flotation, and so forth.

Padding for garments, both for desired contours and for thermal insulation; packaging, both as containers and as bulk impact-resistant material for articles in transit; and cushioning for articles of support and comfort, are other areas of obvious applications.

The present invention may be regarded as the first step in the art of producing crystalline high performance thermoplastic cellular structures, continuously and with both open and closed cellular structures, in large cross section, with resulting high volume and speeds of production making them widely available for useful articles. This is an art, which in the sense of the present invention, has hithertofore been non-existent.

In addition to the high pressure drops we utilize in the preparation of our cellular material from stereospecific high polymers, and means to achieve such high pressures economically, we also divide the polymeric material so as to permit particulate cell formation in space so that competition between cells to occupy an identical point is alleviated, thus preventing the stressing of the cross section of the cellular material, of which they are a part, into a twisted and uneconomic mass.

We establish various degrees of crystallographic order and resulting intermolecular forces dependent upon specific technical objectives in preparing various classes of cellular materials from stereospecific high polymers. The accomplishment of every technical objective, in preparing such cellular materials, requires recognition of the magnitude of inherent forces of thermoelastic stress over periods of time and temperature. These forces are advantageously utilized in the final cellular product, but circumvented in our process of preparing the cellular product from stereospecific high polymers, by largely isolating them from each other at speeds faster than those at which they establish themselves.

Although these intermolecular forces are very complex and are confounded by heats of crystallization additionally, the amount of necessary division in finite periods of time in microseconds, appears to be uniform for uniform classes of conditions. We expect that these values are capable of being plotted and projected mathematically. Temporarily, and for convenience, we call these values, DITS (distance isolation time/temp. speed). These are our measurements of related physiochemical forces in terms of how they must be superseded, for very brief periods of time, by our process.

We claim:

1. A process of making large cross sections of homogeneous unsupported expanded cellular material comprising: heating a thermoplastic polymer to plasticity, distributing a blowing agent therein, pressurizing the resulting material in a zone terminating in an orifice to at least 500 pds./sq. in., ejecting the material through an orifice by said pressure at an orifice velocity sufficient to particulate the material into a multiplicity of discrete particles and into an environment of lesser pressure, distributing the multiplicity of discrete expanding particles on a surface, and coalescing the particles while the particles are in their initial state of expansion, removing the coalesced particles from said surface to produce said homogeneous unsupported expanded cellular material.

2. The process of claim 1, wherein the particles are deposited at isolated points on the surface and the coalescing forms a laminar sheet within a fan shaped area.

3. The process of producing cellular material of claim 1, wherein the thermoplastic polymer is an unrefined mixture of at least .5% stereospecific, and the remainder amorphous polymer and hydrocarbon gases produced during polymerization of said polymer.

4. The process of claim 1 including ejecting said mixture into an evacuated environment.

5. The process of claim 4 wherein said environment is evacuated down to ⅛ atmopshere.

6. The process of claim 1 including rapidly cooling said particles.

7. The process of claim 1 wherein said blowing agent is a two-stage blowing system for use in forming open cellular thermoplastic material comprising a primary gas-producing blowing agent and a secondary blowing agent, said secondary blowing agent comprising a secondary gas encapsulated to retard expansion of said secondary gas under reduced pressure until initial expansion of said primary gas from said primary blowing agent.

8. The process of claim 7 including ejecting said mixture into an evacuated environment.

9. The process of claim 8 including rapidly cooling said particles.

10. The process of claim 1 wherein the ejecting is a speed greater than the speed of sound.

11. The process of claim 10 including ejecting said mixture into an evacuated environment.

12. The process of claim 10 including forming a plurality of discrete particles after said ejecting and coalescing said particles.

13. The process of claim 10 including rapidly cooling said mixture after ejection and before coalescing.

14. The process of claim 1 including distributing in the polymer a two-stage blowing system to form a mixture prior to ejection.

15. The process of claim 1 including distributing in the polymer a two-stage blowing system containing a primary and a secondary agent to form a mixture, and expanding a primary gas from said primary agent to form cells of said polymer, and expanding a secondry gas from said secondary agent to interconnect cells of said polymer.

16. The proceses of claim 15 including the step of incorporating with the secondary agent a chelating agent.

17. The process of claim 15 including the step of incorporating with the secondary agent a surface active agent.

18. The process of claim 15 including the step of incorporating with the secondary agent a sorbing agent.

19. The process of claim 15 including the step of incorporating with the secondary agent an ion-exchange resin.

20. The process of claim 15 including the step of incorporating with the secondary agent a sequestering agent.

21. The process of claim 1 including admixing at least 0.5 percent stereospecific polymer, pressurizing the mixture to exceed 20,000 ft. pds./min./pd. polymer and expanding the polymer to a multiplicity of cells, said polymer having greater molecular weight than the initial molecular weight of said polymer.

22. The process of claim 1 including admixing at least 0.5 percent stereospecific polymer, ejecting the mixture at greater than the speed of sound, and establishing a shock front and expanding the polymer to a multiplicity of cells, said polymer having greater average molecular weight than the initial average molecular weight of said polymer.

23. The process of claim 1 including admixing a two-stage blowing agent and incorporating a source of sulfonyl chloride in said blowing agent prior to ejection.

24. The process of claim 11, including the step of encapsulating the secondary gas to form the secondary agent in order to retard expansion of the secondary gas.

25. The process of claim 15, wherein the secondary gas is retarded in expansion by being chemically bound as a crystalline or glassy complex or hydrate.

References Cited

UNITED STATES PATENTS

| | | | |
|---|---|---|---|
| 2,797,201 | 6/1957 | Veatch et al. | 260—2.5(B) |
| 3,278,466 | 10/1966 | Cram et al. | 260—2.5 |
| 3,371,053 | 2/1968 | Raskin | 260—2.5(B) |
| 2,941,965 | 6/1960 | Ingram | 260—2.5(E) |
| 3,177,109 | 4/1965 | Zieglar | 264—41 |
| 3,227,664 | 1/1966 | Blades et al. | 260—2.5(E) |
| 3,227,784 | 1/1966 | Blades et al. | 260—2.5(E) |

MURRAY TILLMAN, Primary Examiner

W. J. BRIGGS, Sr., Assistant Examiner

U.S. Cl. X.R.

128—156, 284, 290; 260—17.4, 23, 77.5, 78, 80.7, 93.1, 93.5, 94.9, 889, 897; 264—51, 53